United States Patent
Morichau-Beauchant et al.

(10) Patent No.: US 10,456,675 B2
(45) Date of Patent: *Oct. 29, 2019

(54) INTELLIGENT BOARD GAME SYSTEM WITH VISUAL MARKER BASED GAME OBJECT TRACKING AND IDENTIFICATION

(71) Applicant: TWEEDLETECH, LLC, Ann Arbor, MI (US)

(72) Inventors: Theodore Morichau-Beauchant, Sevres (FR); Michel Martin Maharbiz, El Cerrito, CA (US)

(73) Assignee: Tweedletech, LLC, Ann Arbor, MI (US)

( * ) Notice: Subject to any disclaimer, the term of this patent is extended or adjusted under 35 U.S.C. 154(b) by 665 days.

This patent is subject to a terminal disclaimer.

(21) Appl. No.: 14/642,657

(22) Filed: Mar. 9, 2015

(65) Prior Publication Data

US 2015/0174476 A1  Jun. 25, 2015

Related U.S. Application Data

(60) Continuation of application No. 14/072,706, filed on Nov. 5, 2013, now Pat. No. 9,028,315, which is a
(Continued)

(51) Int. Cl.
A63F 9/24      (2006.01)
A63F 13/42     (2014.01)
(Continued)

(52) U.S. Cl.
CPC .......... *A63F 13/42* (2014.09); *A63F 3/00214* (2013.01); *A63F 3/00643* (2013.01);
(Continued)

(58) Field of Classification Search
None
See application file for complete search history.

(56) References Cited

U.S. PATENT DOCUMENTS 3,843,132 A   10/1974  Ferguson
4,337,948 A    7/1982  Breslow et al.
(Continued)

FOREIGN PATENT DOCUMENTS

CN   2423935 Y    3/2001
DE   4039315 A1  12/1990
(Continued)

OTHER PUBLICATIONS

Steve Hinski et al.., "An RFID-based Infrastructure for Automatically Determining the Position of Orientation of Game Objects in Tabletop Games".
(Continued)

*Primary Examiner* — Robert K Carpenter
(74) *Attorney, Agent, or Firm* — Haverstock & Owens LLP

(57) ABSTRACT

A board game system comprises one or more game objects, a processing device, a memory device and one or more cameras. Each of the game objects comprise a unique visual marker positioned on a top surface of the game object, wherein the unique visual marker comprises a series of concentric rings that represent data that uniquely identifies the game object. As a result, during the course of game play, the location and identification of the game objects are able to be determined by the processing device by analyzing images captured by the one or more cameras of the visual markers of the game objects on the game board. The processing device is able to compare the data of the visual markers to a table stored in the memory device that associates the data with a specific game object.

21 Claims, 33 Drawing Sheets

Related U.S. Application Data division of application No. 13/233,935, filed on Sep. 15, 2011, now Pat. No. 8,602,857, which is a continuation of application No. 12/878,876, filed on Sep. 9, 2010, now Pat. No. 8,974,295, which is a continuation-in-part of application No. 12/476,888, filed on Jun. 2, 2009, now Pat. No. 10,265,609.

(60) Provisional application No. 61/130,878, filed on Jun. 3, 2008.

(51) Int. Cl.
*A63F 13/213* (2014.01)
*A63F 3/00* (2006.01)
*A63F 13/20* (2014.01)
*A63F 13/40* (2014.01)

(52) U.S. Cl.
CPC ............... *A63F 9/24* (2013.01); *A63F 13/06* (2013.01); *A63F 13/10* (2013.01); *A63F 13/213* (2014.09); *A63F 2003/00223* (2013.01); *A63F 2003/00258* (2013.01); *A63F 2003/00394* (2013.01); *A63F 2003/00662* (2013.01); *A63F 2003/00668* (2013.01); *A63F 2009/242* (2013.01); *A63F 2009/247* (2013.01); *A63F 2009/2419* (2013.01); *A63F 2009/2435* (2013.01); *A63F 2009/2467* (2013.01); *A63F 2009/2486* (2013.01); *A63F 2009/2489* (2013.01); *A63F 2300/1093* (2013.01); *A63F 2300/203* (2013.01); *A63F 2300/308* (2013.01); *A63F 2300/6045* (2013.01)

(56) References Cited

U.S. PATENT DOCUMENTS

| | | |
|---|---|---|
| 4,348,191 A | 9/1982 | Lipsitz et al. |
| 4,489,946 A | 12/1984 | Ortiz Burgos |
| 4,492,581 A | 1/1985 | Arai et al. |
| 4,515,371 A | 5/1985 | Basevi |
| 4,527,800 A | 7/1985 | Samanasky |
| 4,534,565 A | 8/1985 | Hube |
| 4,569,526 A | 2/1986 | Hamilton |
| 4,666,160 A | 5/1987 | Hamilton |
| 4,736,954 A | 4/1988 | Haney et al. |
| 4,883,443 A | 11/1989 | Chase |
| 4,964,249 A | 10/1990 | Payne |
| 4,964,643 A | 10/1990 | Hass |
| 4,969,650 A | 11/1990 | Magara et al. |
| 4,981,300 A | 1/1991 | Wrinkler |
| 5,013,047 A | 5/1991 | Schwab |
| 5,082,286 A | 1/1992 | Ryan et al. |
| 5,096,204 A | 3/1992 | Lippman |
| 5,125,867 A | 6/1992 | Solomon |
| 5,188,368 A | 2/1993 | Ryan |
| 5,190,285 A | 3/1993 | Levy et al. |
| 5,397,133 A | 3/1995 | Penzais |
| 5,460,381 A | 10/1995 | Smith et al. |
| 5,460,382 A | 10/1995 | Loritz |
| 5,544,882 A | 8/1996 | Sarkar |
| 5,662,508 A | 9/1997 | Smith |
| 5,791,988 A | 8/1998 | Nomi |
| 5,853,327 A | 12/1998 | Giboa |
| 5,864,346 A | 1/1999 | Yokoi et al. |
| 5,906,369 A | 5/1999 | Brennan et al. |
| 5,919,073 A | 7/1999 | Shinoda et al. |
| 5,951,015 A | 9/1999 | Smith et al. |
| 6,001,014 A | 12/1999 | Ogata et al. |
| 6,009,458 A | 12/1999 | Hawkins et al. |
| 6,012,961 A | 1/2000 | Sharpe, III et al. |
| 6,036,188 A | 3/2000 | Gomez |
| 6,102,397 A | 8/2000 | Lee et al. |
| 6,167,353 A | 12/2000 | Piernot |
| 6,203,017 B1 | 3/2001 | Schlutz |
| 6,227,931 B1 | 5/2001 | Shackeiford |
| 6,278,418 B1 | 8/2001 | Doi |
| 6,335,686 B1 | 1/2002 | Goff et al. |
| 6,443,796 B1 | 9/2002 | Shackeilford |
| 6,460,851 B1 | 9/2002 | Lee et al. |
| 6,525,731 B1 | 2/2003 | Suits et al. |
| 6,526,375 B1 | 2/2003 | Frankel et al. |
| 6,545,682 B1 | 4/2003 | Ventrella et al. |
| 6,556,722 B1 | 4/2003 | Bussell et al. |
| 6,581,822 B1 | 6/2003 | Garran |
| 6,682,392 B2 | 1/2004 | Chan |
| 6,690,156 B1 | 2/2004 | Weiner et al. |
| 6,690,357 B1 | 2/2004 | Dunton et al. |
| 6,745,236 B1 | 6/2004 | Hawkins |
| 6,761,634 B1 | 7/2004 | Peterson et al. |
| 6,835,131 B1 | 12/2004 | White et al. |
| 6,842,175 B1 | 1/2005 | Schmalstieg et al. |
| 6,937,152 B2 | 8/2005 | Small |
| 7,008,316 B1 | 3/2006 | Pugh |
| 7,050,754 B1 | 5/2006 | Marcus |
| 7,059,934 B2 | 6/2006 | Whitehead |
| 7,081,033 B1 | 7/2006 | Mawie et al. |
| 7,204,428 B2 * | 4/2007 | Wilson ............ G06K 19/06009 235/462.1 |
| 7,218,230 B2 | 5/2007 | Wu et al. |
| 7,394,459 B2 | 7/2008 | Battiche et al. |
| 7,397,464 B1 | 7/2008 | Robbins |
| 7,474,983 B2 | 1/2009 | Mazalek et al. |
| 7,704,146 B2 | 4/2010 | Ellis |
| 7,775,883 B2 | 8/2010 | Smoot |
| 7,843,429 B2 | 11/2010 | Pryor |
| 7,843,471 B2 | 11/2010 | Doan et al. |
| 8,257,157 B2 | 9/2012 | Polchin |
| 8,303,369 B2 | 11/2012 | Smith et al. |
| 8,313,377 B2 | 11/2012 | Zalewski |
| 8,608,529 B2 | 12/2013 | Smith et al. |
| 8,690,631 B2 | 4/2014 | Nag |
| 8,753,164 B2 | 6/2014 | Hansen et al. |
| 9,329,469 B2 | 5/2016 | Benko |
| 2002/0036652 A1 | 3/2002 | Masumotot |
| 2002/0071127 A1 | 6/2002 | Takano et al. |
| 2002/0082065 A1 | 6/2002 | Fogel |
| 2002/0128068 A1 | 9/2002 | Whitten et al. |
| 2002/0158751 A1 | 10/2002 | Bormaster |
| 2002/0167129 A1 | 11/2002 | Staton |
| 2002/0193047 A1 | 12/2002 | Weston |
| 2002/0196250 A1 | 12/2002 | Anderson et al. |
| 2003/0124954 A1 | 7/2003 | Lui |
| 2003/0141962 A1 | 7/2003 | Barink |
| 2003/0171142 A1 | 9/2003 | Kaji et al. |
| 2003/0232649 A1 | 12/2003 | Gizis et al. |
| 2004/0142751 A1 | 7/2004 | Yamagami |
| 2004/0189701 A1 | 9/2004 | Badt, Jr. |
| 2004/0203317 A1 | 10/2004 | Small |
| 2004/0224741 A1 | 11/2004 | Jen et al. |
| 2004/0248650 A1 | 12/2004 | Colbert et al. |
| 2004/0259465 A1 | 12/2004 | Wright et al. |
| 2005/0043089 A1 | 2/2005 | Nguyen |
| 2005/0059479 A1 | 3/2005 | Solttys et al. |
| 2005/0137004 A1 | 3/2005 | Wood et al. |
| 2005/0149865 A1 | 7/2005 | Wang et al. |
| 2005/0162381 A1 | 7/2005 | Bell et al. |
| 2005/0245302 A1 | 11/2005 | Bathiche et al. |
| 2005/0247782 A1 | 11/2005 | Ambartsoumian |
| 2005/0277464 A1 | 12/2005 | Whitten et al. |
| 2006/0001933 A1 | 1/2006 | Page |
| 2006/0030410 A1 * | 2/2006 | Stenton ............ A63F 13/02 463/43 |
| 2006/0061035 A1 | 3/2006 | Collibns |
| 2006/0139314 A1 | 6/2006 | Bell |
| 2006/0149495 A1 | 7/2006 | Mazalek et al. |
| 2006/0175753 A1 | 8/2006 | Macvier et al. |
| 2006/0197669 A1 | 9/2006 | Wu et al. |
| 2006/0246403 A1 | 11/2006 | Monpouet et al. |
| 2006/0252554 A1 | 11/2006 | Gururajan et al. |
| 2006/0254369 A1 | 11/2006 | Yoon et al. |
| 2007/0015588 A1 | 1/2007 | Matsumoto et al. |

(56) References Cited

U.S. PATENT DOCUMENTS

| | | |
|---|---|---|
| 2007/0057469 A1 | 3/2007 | Grauzer et al. |
| 2007/0098234 A1 | 5/2007 | Fiala |
| 2007/0111795 A1 | 5/2007 | Choi et al. |
| 2007/0171199 A1 | 7/2007 | Gosselin |
| 2007/0201863 A1 | 8/2007 | Wilson et al. |
| 2007/0216095 A1 | 8/2007 | Jacobs |
| 2007/0238530 A1 | 10/2007 | Okada |
| 2007/0262984 A1 | 11/2007 | Pruss |
| 2007/0275634 A1 | 11/2007 | Wright et al. |
| 2007/0293289 A1 | 12/2007 | Loeb |
| 2008/0004093 A1 | 1/2008 | Van Luchene et al. |
| 2008/0020814 A1 | 1/2008 | Kernene |
| 2008/0045340 A1 | 2/2008 | Kim |
| 2008/0068173 A1 | 3/2008 | Alexis et al. |
| 2008/0085773 A1 | 4/2008 | Wood |
| 2008/0122805 A1 | 5/2008 | Smith et al. |
| 2008/0125217 A1 | 5/2008 | Pavlovski |
| 2008/0126533 A1 | 5/2008 | Klein |
| 2008/0131850 A1 | 6/2008 | Danenberg |
| 2008/0166926 A1 | 7/2008 | Seymour et al. |
| 2008/0172361 A1 | 7/2008 | Wong et al. |
| 2008/0180581 A1 | 7/2008 | Slobodin |
| 2008/0186174 A1 | 8/2008 | Alexis et al. |
| 2008/0192300 A1 | 8/2008 | Kenji |
| 2008/0220690 A1 | 9/2008 | Munch |
| 2008/0248847 A1 | 10/2008 | Nakano et al. |
| 2008/0267450 A1 | 10/2008 | Sugimoto |
| 2008/0280682 A1 | 11/2008 | Brunner et al. |
| 2008/0280684 A1 | 11/2008 | McBride |
| 2008/0315772 A1 | 12/2008 | Knibbe |
| 2009/0017908 A1 | 1/2009 | Miyamoto |
| 2009/0023487 A1 | 1/2009 | Gilson et al. |
| 2009/0044113 A1 | 2/2009 | Jones et al. |
| 2009/0069084 A1 | 3/2009 | Reece et al. |
| 2009/0082105 A1 | 3/2009 | Hegstorm |
| 2009/0089565 A1 | 4/2009 | Buchanan et al. |
| 2009/0075733 A1 | 5/2009 | Anderson et al. |
| 2009/0115133 A1 | 5/2009 | Kelly |
| 2009/0117994 A1 | 5/2009 | Kelly et al. |
| 2009/0137323 A1 | 5/2009 | Fiegener et al. |
| 2009/0158210 A1 | 6/2009 | Cheng et al. |
| 2009/0197658 A1 | 8/2009 | Polchin |
| 2009/0227368 A1 | 9/2009 | Wyatt |
| 2009/0309303 A1 | 12/2009 | Wallace et al. |
| 2009/0315258 A1 | 12/2009 | Wallace et al. |
| 2009/0322352 A1 | 12/2009 | Zachut et al. |
| 2009/0325690 A1 | 12/2009 | Zhou et al. |
| 2010/0001923 A1 | 1/2010 | Zilber |
| 2010/0004062 A1 | 1/2010 | Maharbiz et al. |
| 2010/0007798 A1 | 1/2010 | Togawa |
| 2010/0032900 A1 | 2/2010 | Wilm |
| 2010/0130280 A1 | 5/2010 | Arezina |
| 2010/0141780 A1 | 6/2010 | Tan |
| 2010/0151940 A1 | 6/2010 | Borge |
| 2010/0164862 A1 | 7/2010 | Sullivan et al. |
| 2010/0167623 A1 | 7/2010 | Eyzaguirre et al. |
| 2010/0234094 A1 | 9/2010 | Gagner |
| 2010/0247060 A1 | 9/2010 | Gay |
| 2010/0253700 A1 | 10/2010 | Bergeron |
| 2010/0291993 A1 | 11/2010 | Gagner et al. |
| 2010/0311300 A1 | 12/2010 | Hansen et al. |
| 2010/0331083 A1 | 12/2010 | Maharbiz et al. |
| 2011/0015920 A1 | 1/2011 | How |
| 2011/0074833 A1 | 3/2011 | Murayarna et al. |
| 2011/0089635 A1 | 4/2011 | Miller |
| 2011/0111840 A1 | 5/2011 | Gagner et al. |
| 2011/0159963 A1 | 6/2011 | Link |
| 2011/0173587 A1 | 7/2011 | Detwiller |
| 2011/0211175 A1 | 9/2011 | Stehle |
| 2011/0250967 A1 | 10/2011 | Kulas |
| 2011/0254832 A1 | 10/2011 | Wilson et al. |
| 2011/0256927 A1 | 10/2011 | Davis et al. |
| 2011/0269547 A1 | 11/2011 | Harris |
| 2011/0312420 A1 | 12/2011 | Portin |
| 2012/0032394 A1 | 2/2012 | Levine |
| 2012/0038739 A1 | 2/2012 | Welch et al. |
| 2012/0049448 A1 | 3/2012 | Agamawi |
| 2012/0049453 A1 | 3/2012 | Maharbiz et al. |
| 2012/0052931 A1 | 3/2012 | Jaqua et al. |
| 2012/0052934 A1 | 3/2012 | Maharbiz et al. |
| 2012/0056717 A1 | 3/2012 | Maharbiz et al. |
| 2012/0157206 A1 | 6/2012 | Crevin et al. |
| 2012/0295703 A1 | 11/2012 | Reiche et al. |
| 2012/0295714 A1 | 11/2012 | Reiche et al. |
| 2012/0320033 A1 | 12/2012 | Papaefstahiou |
| 2013/0032999 A1 | 2/2013 | Hildebrand |

FOREIGN PATENT DOCUMENTS

| | | |
|---|---|---|
| JP | 538228 A | 1/1978 |
| JP | 08103534 A | 4/1996 |
| JP | 2001228963 A | 8/2001 |
| JP | 2002135258 A | 5/2002 |
| JP | 2002156896 A | 5/2002 |
| JP | 2003117245 A | 4/2003 |
| JP | 2003230761 A | 8/2003 |
| JP | 2005-317032 | 11/2005 |
| JP | 200614265 | 6/2006 |
| JP | 2008-501490 | 1/2008 |
| JP | 200877411 A | 4/2008 |
| JP | 2008528119 A | 7/2008 |
| WO | 9931569 A1 | 6/1999 |
| WO | 0210791 A2 | 2/2002 |
| WO | 2005078562 A1 | 8/2005 |
| WO | 2006033036 A2 | 3/2006 |
| WO | 2006136322 A2 | 12/2006 |
| WO | 2007017848 A2 | 2/2007 |
| WO | 2007104693 A1 | 9/2007 |
| WO | 2012028827 A1 | 3/2012 |

OTHER PUBLICATIONS

Saskai Bakker et al.., "Interactive tangible Objects as play pieces in a digital tabletop game", pp. 155-156, 2007.

Ragan L. Mandryk et al., "False Prophets: Exploring Hybrid Board/Video Games".

Lopez De Ipina et al., "Trip : a Low-Cost vision Based Location System for Ubiquitous Computing", vol. 6, Issue 3, May 2002, pp. 206-2019, Journal Personal and Ubiquitous Computing, and http://dl.acm.org/citations.cfm?id=594357.

http://www.disgntaxi.com/news/32764/iPhone-Game-Goes_beyond-the-Touchscreen/.

* cited by examiner

| Register | Mnemonic | Description | Example value |
|---|---|---|---|
| 0 | UID-H | Unique identifier - high word | 0x0000..0xFFFF |
| 1 | UID-L | Unique identifier - low word | 0x0000..0xFFFF |
| 2 | ADDR | Sensor identifier | 0x0000..0xFFFF |
| ... | | | |
| 10 | LName | Long name (up to 30 characters) | "Zoltar" |
| ... | ... | ... | |
| 25 | Class | Class of character (e.g. Profession) | 1=Warrior |
| 26 | Race | Fictional race identifier | 2=Morlok |
| 27 | Stamina | Rate of recharge, points/min. | 5 |
| 28 | Experience | Experience points | 5,000 |
| 29 | Level | Power level 1..5, 5=highest | 2 |
| 30 | Hitpoints | Hitpoints (0=dead) | 0x0000...0xFFFF |
| 31 | WeaponCount | Count of weapons | 3 |
| 32 | WeaponID-1 | Weapon 1 identifier | 1=Sword |
| 33 | WeaponWT-1 | Weapon 1 weight, lbs. | 8 |
| ... | | | ... |
| 43 | Armor Count | Count of Armor | 2 |
| 44 | ArmorID-1 | Armor 1 identifier | 1=Shield |
| 45 | ArmorStrength-1 | Strength of armor (0..100) | 60 |
| ... | | | |
| 53 | AcessoryCount | Count of accessories | 1 |
| 54 | AccessoryID-1 | Accessory identifier | 1=Weapons belt |
| ... | | | |
| 127 | CKSUM | Checksum value (integrity check) | |

Fig. 7A

| Register | Mnemonic | Description | Example value |
|---|---|---|---|
| 0 | UID-H | Unique identifier - high word | 0x0000..0xFFFF |
| 1 | UID-L | Unique identifier - low word | 0x0000..0xFFFF |
| 2 | ADDR | Sensor identifier | 0x0000..0xFFFF |
| ... | | | |
| 10 | LName | Long name (up to 30 characters) | "Pawn" |
| ... | ... | ... | |
| 25 | Class | Class of chess piece | 0=Pawn |
| 26 | Player | Player side color: Black/White | 0=White, 1=Black |
| ... | | | |
| 127 | CKSUM | Checksum value (integrity check) | |

Fig. 7B

| Register | Mnemonic | Description | Example value |
|---|---|---|---|
| 0 | UID-H | Unique identifier - high word | 0x0000..0xFFFF |
| 1 | UID-L | Unique identifier - low word | 0x0000..0xFFFF |
| 2 | ADDR | Sensor identifier | 0x0000..0xFFFF |
| ... | | | |
| 10 | LName | Long name (up to 30 characters) | "King" |
| ... | ... | ... | |
| 25 | Class | Class of chess piece | 5=King |
| 26 | Player | Player side color: Black/White | 0=White, 1=Black |
| ... | | | |
| 127 | CKSUM | Checksum value (integrity check) | |

Fig. 7C

| Register | Mnemonic | Description | Example value |
|---|---|---|---|
| 0 | UID-H | Unique identifier - high word | 0x0000..0xFFFF |
| 1 | UID-L | Unique identifier - low word | 0x0000..0xFFFF |
| 2 | ADDR | Sensor identifier | 0x0000..0xFFFF |
| ... | | | |
| 10 | LName | Long name (up to 30 characters) | "Shoe" |
| ... | ... | ... | |
| 25 | Class | Class of Monopoly piece | 1=Token |
| 26 | Player | Player having this piece | 2=Player 2 |
| 27 | Value-H | Amount of money assoc. w/token | 0x0000-0xFFFF |
| 28 | Value-L | | 0x0000-0xFFFF |
| ... | | | |
| 127 | CKSUM | Checksum value (integrity check) | |

Fig. 7D

| Register | Mnemonic | Description | Example value |
|---|---|---|---|
| 0 | UID-H | Unique identifier - high word | 0x0000..0xFFFF |
| 1 | UID-L | Unique identifier - low word | 0x0000..0xFFFF |
| 2 | ADDR | Sensor identifier | 0x0000..0xFFFF |
| ... | | | |
| 10 | LName | Long name (up to 30 characters) | "Hotel" |
| ... | ... | ... | |
| 25 | Class | Class of Monopoly piece | 2=Hotel |
| 26 | Player | Player having this piece | 2=Player 2 |
| 27 | Value-H | Rent value associated w/ hotel | 0x0000-0xFFFF |
| 28 | Value-L | | 0x0000-0xFFFF |
| ... | | | |
| 127 | CKSUM | Checksum value (integrity check) | |

Fig. 7E

INTELLIGENT BOARD GAME SYSTEM WITH VISUAL MARKER BASED GAME OBJECT TRACKING AND IDENTIFICATION

CROSS-REFERENCE TO RELATED APPLICATIONS

This application is a continuation application of U.S. patent application Ser. No. 14/072,706, filed Nov. 5, 2013 and entitled "INTELLIGENT BOARD GAME SYSTEM WITH VISUAL MARKER BASED GAME OBJECT TRACKING AND IDENTIFICATION," which is a divisional application of U.S. patent application Ser. No. 13/233,936, filed Sep. 15, 2011 and entitled "INTELLIGENT BOARD GAME SYSTEM WITH VISUAL MARKER BASED GAME OBJECT TRACKING AND IDENTIFICATION," now issued as U.S. Pat. No. 8,602,857, which is a continuation in part of U.S. patent application Ser. No. 12/878,876, filed Sep. 9, 2010 and entitled "AN INTELLIGENT GAME SYSTEM INCLUDING INTELLIGENT FOLDABLE THREE-DIMENSIONAL TERRAIN," which is a continuation in part of U.S. patent application Ser. No. 12/476,888, filed Jun. 2, 2009 and entitled "AN INTELLIGENT GAME SYSTEM FOR PUTTING INTELLIGENCE INTO BOARD AND TABLETOP GAMES INCLUDING MINIATURES," which claims the benefit of U.S. Provisional Patent Application Ser. No. 61/130,878, filed Jun. 3, 2008 and entitled "PUTTING INTELLIGENCE INTO MINIATURES GAMES", all of which are hereby incorporated by reference in their entirety for all purposes.

FIELD OF THE INVENTION

The present invention relates to the field of board and tabletop games including dynamic game object tracking. More specifically, the present invention relates to a board or tabletop game wherein game objects have unique visual markers for tracking the location of the game objects.

BACKGROUND OF THE INVENTION

Miniatures games are typically played on a board or tabletop on which players control dozens to hundreds of individual miniature figures (usually ranging from ½" to 10"+ in base diameter) in some form of tactical combat simulation. The detail of the tabletop environment, the intricacy of the miniatures and the complexity of the tactical game vary widely between the different games currently available.

All of these games have historically used dice to determine combat outcomes and pen and paper to record the progress, such as how wounded a particular figure is. The emergence of large online worlds like World of Warcraft and Everquest, with complex simulation-level physics and realism, has generated a steady pressure to make these games more sophisticated. However, this has been largely limited by players' reluctance to have to do lots of math on paper. In other words, there is no good way to reproduce the complexity of the combat of online worlds without ruining the feel of tabletop games. Some manufacturers have developed miniatures that have a "decoder-ring"-like base which is moved as the figure becomes wounded. Thus, each miniature keeps track of its own damage, movement, and other game piece information with a simple mechanical system. A window on the base shows the figure's current status and rotating the wheel changes the status as the game progresses. Although the base tracks many items of information, the information is only available as a physical state of the rotational base. Further, updating of the status of the figure is manual, as is scoring. The greater the number of players or game pieces, the more difficult it is to update player status information and scoring. But, game play, particularly for historical re-enactment games is more robust and realistic with a higher number of game pieces. Thus, the very aspect that makes miniatures games exciting to play—diverse and numerous pieces—limits the enjoyment of the game by requiring detailed updates of individual game piece information and scoring.

The recent decline in prices of cameras and processing devices coupled with the need to simplify and facilitate the logistic portion of game play has sparked interest in increasing the interactivity of game play through computer-enhanced interactivity. However, the existing computer-enhanced board games require expensive hardware that is not easily upgraded after installation. This both limits the life span of the games as well as dramatically increasing the initial cost and cost of maintenance of the games. Further, the complexity of the games often results in the performance of the computing components severely lacking due to the increased processing requirements.

SUMMARY OF THE INVENTION

An intelligent board game system including visual marker tracking comprises one or more game objects, a processing device, a memory device and one or more cameras. Each of the game objects comprise a unique visual marker positioned on a top surface of the game object, wherein the unique visual marker comprises a series of concentric rings that represent data that uniquely identifies the game object. As a result, during the course of game play, the location and identification of the game objects are able to be determined by the processing device by analyzing images captured by the one or more cameras of the visual markers of the game objects on the game board. The processing device is able to compare the data of the visual markers to a table stored in the memory device that associates the data with a specific game object. As a result, the system is able to provide a low cost interactive board game requiring minimal hardware. Further, due to the minimal hardware, the game is able to be updated with software updates to expand the life span of the system. Moreover, the simple design of the game system enables pinpoint location resolution of the game objects and with reduced processing demands for faster performance.

One aspect of the present application is directed to a game system for playing a board game. The game system comprises one or more game objects positioned on a game board, wherein each of the game objects has a unique visual marker representing data that uniquely identifies the game object, a memory device for storing a table that associates the identity of the game objects with the data represented on the unique visual markers located on each game object, one or more cameras that capture one or more images of the game board and a processing device that determines the location and identity of the one or more game objects on the game board by locating the visual marker of each game object within the images and determining the game object identity associated with the data on each located the visual marker using the table. In some embodiments, the location of the one or more game objects is determined relative to the position of one or more other game objects. In some embodiments, the location of the one or more game objects is determined relative to the game board. In some embodiments, the visual markers each comprise one or more inner rings representing the data and an outer ring that surrounds the inner rings and enables the processing device to determine the location of the one or more game objects. In some embodiments, the processing device locates the outer ring of each game object using a edge detection algorithm on the image of the game board followed by a circle detection algorithm. In some embodiments, one of the inner rings of each visual marker indicates the angle of the visual marker relative to the camera inputting the visual marker, wherein the processing device determines the starting point of the data represented in the inner rings of the visual marker based on the angle. In some embodiments, the processing device determines the orientation of the game object at the determined location based on the angle. In some embodiments, one or more of the game objects comprise a plurality of visual markers such that a first visual marker is able to represent the location of a first portion of the game objects and a second visual marker is able to represent the location of a second portion of the game objects. In some embodiments, the game objects are selected from a group consisting of a game piece, a terrain piece and a game board. In some embodiments, the unique identification of the game objects provided by the data is global such that each of the game objects are able to be distinguished from all other game objects associated with the board game.

Another aspect of the present application is directed to a game object for playing a board game. The game object comprises a body having a top surface and a unique visual marker positioned on the top surface, wherein the unique visual marker comprises a series of concentric rings that represent data that uniquely identifies the game object. In some embodiments, the visual marker comprises one or more inner rings representing the data and an outer ring that surrounds the inner rings and enables a processing device to locate and identify the game object on a game board. In some embodiments, one of the inner rings of the visual marker indicates a preselected side of the game object such that the orientation of the game object is able to be determined based on the angle of the one of the inner rings relative to the cameras. In some embodiments, the one of the inner rings of the visual marker indicate the starting point of the data represented in the inner rings of the visual marker. In some embodiments, the game object comprises one or more additional visual markers such that the visual marker is positioned on the top surface of a first portion of the body and the additional visual markers are able to be positioned on one or more second portions of the body. In some embodiments, the body comprises one or more appendages comprising the second portions of the body such that a processing device is able to locate and identify the appendages of the body based on the location of the additional visual markers. In some embodiments, at least one of the appendages is able to move with respect to the remainder of the body such that the processing device is able to track the movement of the at least one of the appendages based on the location of the additional visual marker on the appendage. In some embodiments, the game object is selected from a group consisting of a game piece, a terrain piece and a game board. In some embodiments, the data is associated with characteristic values of the game object that affect the way the board game is played with the game object. In some embodiments, the unique identification of the game object provided by the data is global such that the game object is able to be distinguished from all other game objects associated with the board game.

Yet another aspect of the present application is directed to a method of locating and identifying game objects on a game board. The method comprises positioning one or more game objects on the game board, wherein each of the game objects has a unique visual marker representing data that uniquely identifies the game object, storing the data in a table on one or more memory devices, where the table associates the identity of the game objects with the data represented on the unique visual markers located on each game object, capturing one or more images of the game board with one or more cameras and determining the location and identity of the one or more game objects on the game board with a processing device by locating the visual marker of each game object within the images and determining the game object identity associated with the data on each located the visual marker using the table. In some embodiments, the location of the one or more game objects is determined relative to the position of one or more other game objects. In some embodiments, the location of the one or more game objects is determined relative to the game board. In some embodiments, the visual markers each comprise one or more inner rings representing the data and an outer ring that surrounds the inner rings and enables the processing device to determine the location of the one or more game objects. In some embodiments, the processing device locates the outer ring of each game object using a edge detection algorithm on the images of the game board followed by a circle detection algorithm. In some embodiments, one of the inner rings of each visual marker indicates the angle of the visual marker relative to the camera inputting the visual marker, wherein the processing device determines the starting point of the data represented in the inner rings of the visual marker based on the angle. In some embodiments, the method further comprises determining the orientation of the game object at the determined location based on the angle. In some embodiments, the method further comprises determining the location and identity of one or more second visual markers on one or more of the game objects, wherein the second visual markers represent the location and identity of a second portion of the one or more of the game objects. In some embodiments, the second portion is able to move with respect to the remainder of the game object such that the processing device is able to track the movement of the second portion based on the location of the second visual marker on the second portion. In some embodiments, the game objects are selected from a group consisting of a game piece, a terrain piece and a game board. In some embodiments, the unique identification of the game objects provided by the data is global such that each of the game objects are able to be distinguished from all other game objects associated with the board game.

BRIEF DESCRIPTION OF THE DRAWINGS

FIG. 7A illustrates a memory map of nonvolatile memory within an intelligence game piece object for a combat game.

FIGS. 7B and 7C illustrate a memory map of nonvolatile memory within an intelligent game piece object for a chess game.

FIGS. 7D and 7E illustrate a memory map of nonvolatile memory within an intelligent game piece object for a Monopoly® game.

DETAILED DESCRIPTION OF THE DRAWINGS

Figure 1A:
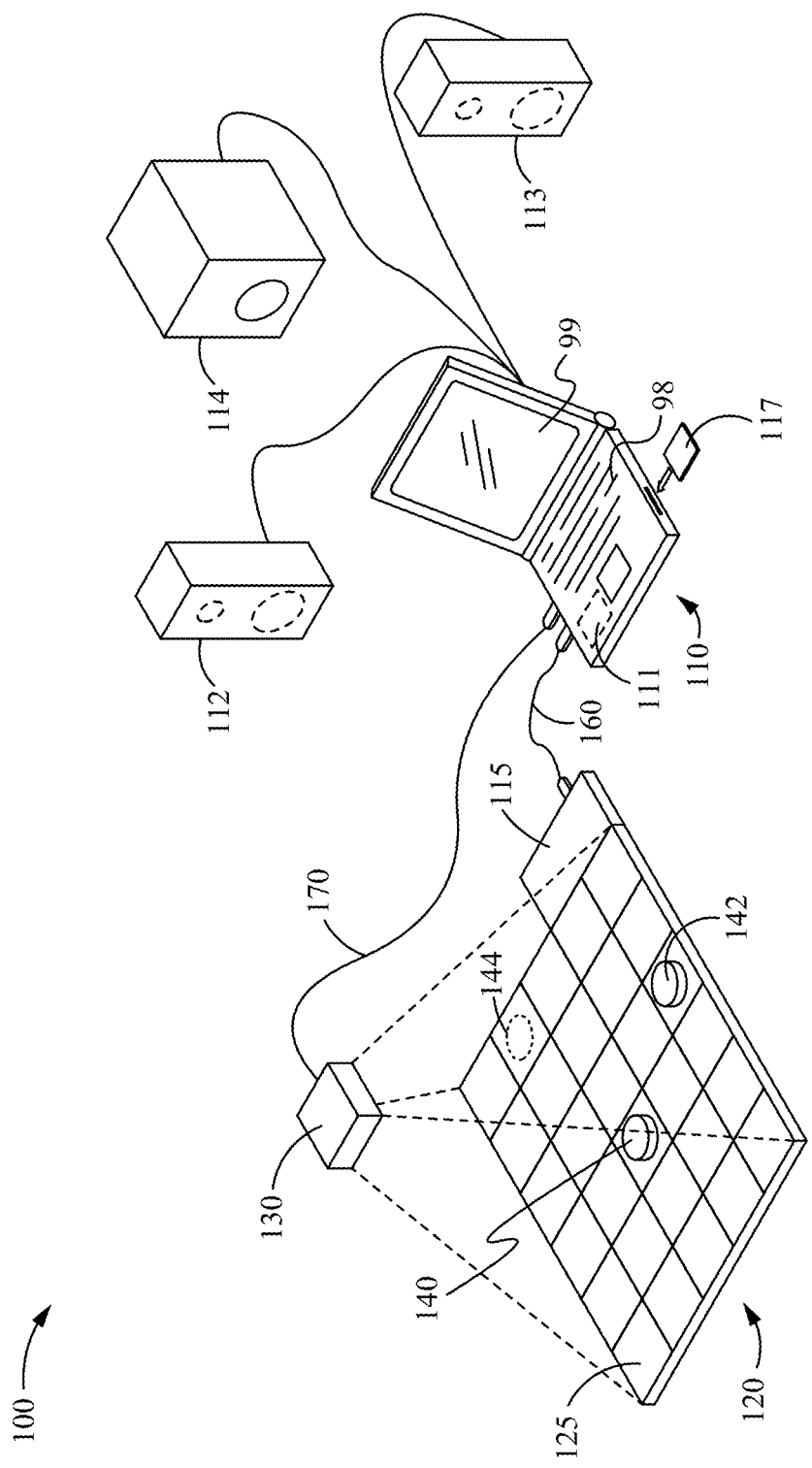
FIG. 1A illustrates a diagram of an intelligent game system for putting intelligence into board and tabletop games including miniatures according to some embodiments.

An intelligent board game system and a multi-dimensional game system that are able to utilize RFID game object tracking, visual marker game object tracking and/or dynamic characteristic tracking is described herein. When utilizing visual marker based tracking, the board game system is able to comprise one or more game objects, one or more cameras, at least one memory device and at least one processing device. Each of the one or more game objects has a visual marker that includes data that uniquely identifies the game object (e.g. globally unique identifier) and enables the processor to locate and identify the game object by analyzing images captured by the cameras. As a result, during the course of game play, the location and identification of the game objects is able to be continuously updated and used to enhance the game play of the board game system. Accordingly, the system is able to provide a low cost interactive board game requiring minimal hardware. Further, due to the minimal hardware, the game is able to be updated with software updates to expand the life span of the system. Moreover, the simple design of the game system enables pinpoint location resolution of the game objects and with reduced processing demands for faster performance.

As described above, each of the game objects comprise a globally unique identifier and dynamic characteristic values associated with the unique identifier, stored in the memory, that define the characteristics/attributes of the corresponding game object when used in the game. For example, the characteristic values are able to include a game object's strength value, a speed value, and/or an injury value, wherein each of these values affect what the game object is able to do in the game. A user is able to play the game by utilizing the game objects according to their characteristic values. During the course of game play, the events of the game are able to dynamically change the characteristic values of each game object affected by the event. For example, a game event such as a fire is able to change the injury value of a game object such that the game object is hindered within the game as if it was burned by the fire. Similarly, outside of game play, external events are also able to dynamically change the characteristic values of a game object. For example, an external event such as the passage of time is able to change the injury value of a game object such that the game object is stronger as if it has healed from an injury. These characteristic values are able to be kept and updated during and in between games. As a result, the dynamic characteristic tracking board game, system and method provides the benefit of enabling each user's game objects gain characteristic values unique to their experiences and become one-of-a-kind game objects that the user can develop, trade and compare to other unique game objects owned by other users.

The description below discusses an intelligent board game system and a multi-dimensional game system that are able to utilize RFID game object tracking, visual marker game object tracking and/or dynamic characteristic tracking.

Intelligent Game System

A system for putting intelligence into board and tabletop games including miniatures comprises one or more sensors to read object information from a game object. The object information comprises a unique identifier specific to the game object and one or more characteristic values associated with the unique identifier. In some embodiments, each sensor has an address. In some embodiments, the sensors are identified by names, or time slots, or are mapped to input ports of a controller. Interface electronics receive the object information from each sensor, a controller receives the object information and the sensor address for each sensor, and associates the object information with the sensor address. In some embodiments, the controller associates the object information with a portion of an image. A computer readable media is programmed with instructions for implementing a game, and is read by the controller. The system further comprises a projector which receives image information from the controller, and projects the image information. The controller processes the object information to update a changing image, and to transmit image information to the projector. In some embodiments, the system further comprises a game object having object information. In some embodiments, the system further comprises speakers, and a removable computer readable media. The removable computer readable media is able to be any appropriate memory device, such as a flash memory stick, SIMM memory card, a compact disk, a magnetic disk, digital video disk, or a game cartridge.

FIG. 1A illustrates a system for putting intelligence into board and tabletop games including miniatures 100 comprising a game board 120, one or more sensors 125, a display device 99, an input/output (I/O) device 98, interface electronics 115, a controller 110, a computer readable media 111, a removable computer readable media 117, a projector 130, speakers 112, 113, and 114, interconnection cables 160 and 170, intelligent game piece objects 140 and 142, and a virtual game piece object 144 according to some embodiments. As the embodiment is explained, below, it will be clear to one skilled in the art that any number and type of intelligent game piece objects are able to be used, depending upon such variables as the actual game being played and the number of game players.

The game board 120 comprises one or more sensors such as sensor 125. In some embodiments, each sensor 125 comprises a single type of sensor. In some embodiments, each sensor 125 comprises a plurality of different sensor types. Although all of the illustrations, FIG. 1A through 1F, show the sensors 125 of the game board 120 organized as a rectangular array of sensors 125, the sensors 125 are able to be arranged in any physical arrangement. The identifier of each sensor 125 is decoded within the interface electronics 115. Each sensor corresponds to a portion of an image to be projected by the projector 130. The interface electronics 115 are coupled to the controller 110 via the sensor interface cable 160. The interface electronics 115 create a high level interface between the sensors 125 and the controller 110. The interface electronics 115 manage the sensors 125 such that any object information related to the intelligent game piece objects, 140 and 142, sensed by a sensor 125, is transmitted to the controller 110 via the sensor interface cable 160. In some embodiments, the sensor interconnect cable 160 is an industry-standard USB cable utilizing communications messages which conform to any of the applicable standards such as USB 1.1, 2.0 or the emerging USB 3.0.

In some embodiments, the controller 110 is any commercially available personal computer. In some embodiments, the controller 110 is able to be any combination of a single board computer, a personal computer, a networked computer, a server, a cell phone, a personal digital assistant, a gaming console, a portable electronic entertainment device or a portable electronic gaming device. The controller 110 contains a computer readable media 111 programmed with instructions to respond to changes in the object information of an object 140, sensed by a sensor 125. In some embodiments, game state and/or game event information is able to be transferred to intelligent game piece objects 600 such that the controller 110 is able to adjust the object information based on the game state and/or game event information. One skilled in the art will recognize that programmed instructions comprise a software application which contains the logic, game rules, scoring, sound, graphics, and other attributes of game play for playing an interactive game with intelligence as disclosed herein. The application software processes the object information received from the interface electronics 115 and transmits image information of a changing image to the projector 130. In some embodiments, the intelligent game piece objects 600 transmit their object information to the controller 110 via a wireless router 150 or directly to the controller 110 equipped with a wireless interface 116.

In some embodiments, the projector 130 projects an image onto the entire surface area of the game board 120. In some embodiments, the projector 130 projects an image representing an object 140, along with other game images, onto any surface. In some embodiments, the projector further projects an image of one or more virtual game piece objects 144. In some embodiments, the projector 130 projects the image onto a portion of the surface area of the game board 120. In some embodiments, the projector 130 is a DLP® (Texas Instruments) projector. In other embodiments, the projector 130 is any projection device capable of receiving image information and projecting an image onto the surface area of the game board 120, such as any of the commercially available LCD projectors. The application software further provides sound via the speakers 112, 113, and 114 which are coupled to the controller 110. As described further below, in some embodiments the controller 110 is able to communicate directly, or indirectly, with the intelligent game piece objects 600 via an interface to implement the functionality within the intelligent game piece objects 600. In some embodiments, game state and/or game event information is able to be stored on the removable computer readable media 117 or on the computer readable media 111 within the controller 110, thereby enabling resumption of a game in progress at a later date on the same intelligent game system or on a different intelligent game system. In some embodiments, as described below with reference to FIG. 21, the storage of the game state and/or game event information also enables the adjusting of object information on the game objects 140 base on the information. One skilled in the art would recognize that such game state and/or game event information is able to be conveyed to other intelligent game systems 100 by, for example, transfer via the internet, through email, or by uncoupling and transporting the controller 110 to another location for coupling to another intelligent game system 100. In the case of powered intelligent game piece objects 600, game state information may further be stored within and transferred from the powered intelligent game piece objects 600.

Figure 1B:
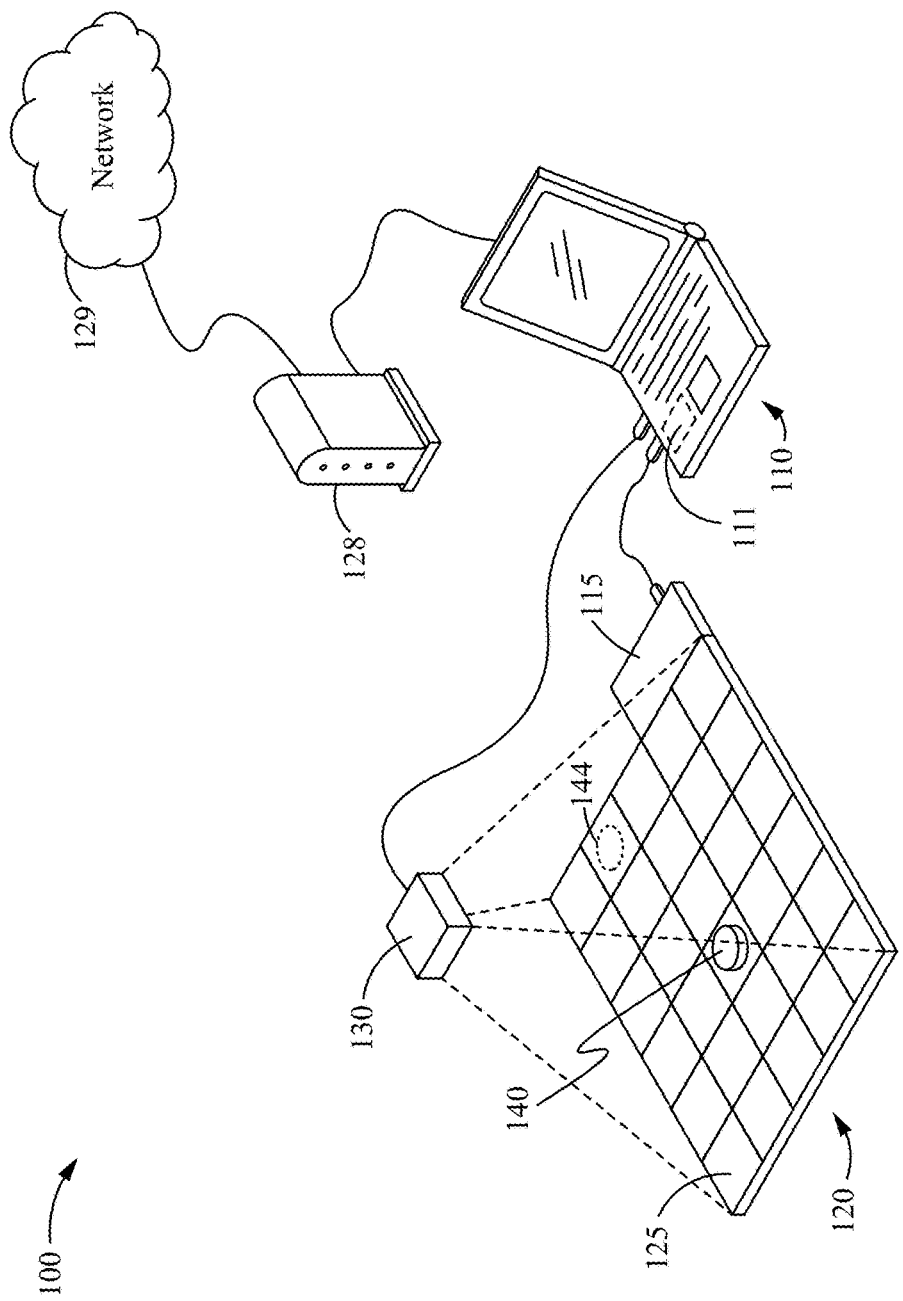
FIG. 1B illustrates a diagram of an intelligent game system for putting intelligence into board and tabletop games including miniatures according to some embodiments.

FIG. 1B illustrates a diagram of a system for putting intelligence into board and tabletop games including miniatures supporting remote play of an intelligent game system according to some embodiments. A network access device 128, such as a cable modem or DSL modem, is operably coupled to the controller 110 and to a network 129. Remote player game pieces are able to appear as virtual game piece objects 144, projected onto the surface area of the game board 120.

Figure 1C:
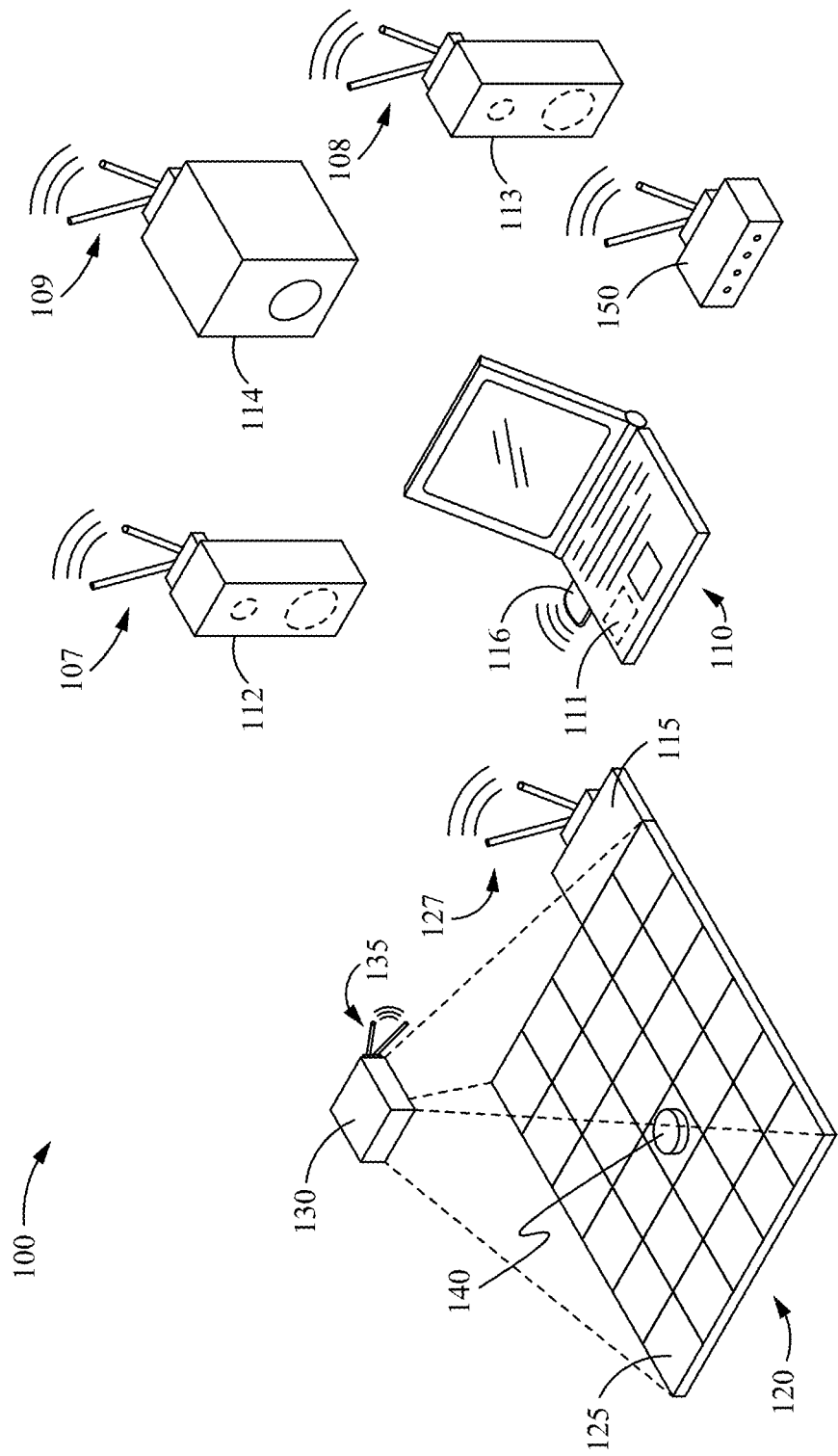
FIG. 1C illustrates a diagram of an intelligent game system for putting intelligence into board and tabletop games including miniatures according to some embodiments.

FIG. 1C illustrates a diagram of a system for putting intelligence into board and tabletop games including miniatures supporting wireless interconnection of system elements according to some embodiments. The game board 120 with interface electronics 115 further comprises a wireless adapter 127. The speakers 112, 113, and 114 further comprise wireless adapters 107, 108 and 109 respectively. The controller 110 further comprises a wireless adapter 116 for receiving object information from the sensors 125. Alternatively, the game object 140 further comprise a wireless adapter (not shown) such that the game objects 140 area able to directly transmit their object information to the controller 110 and the controller 110 is able to directly adjust the object information based on any game state and/or game event information. The wireless adapter 116 also enables the controller 110 to transmit image information of a changing image to the projector 130 having a wireless adapter 135. Each wireless adapter 107, 108, 109, 116, 127, and 135 is further able to communicate via a wireless router 150. In some embodiments, the controller 110 is able to transmit sound information to speakers 112 through 114 via one or more wireless adapters.

Figure 1D:
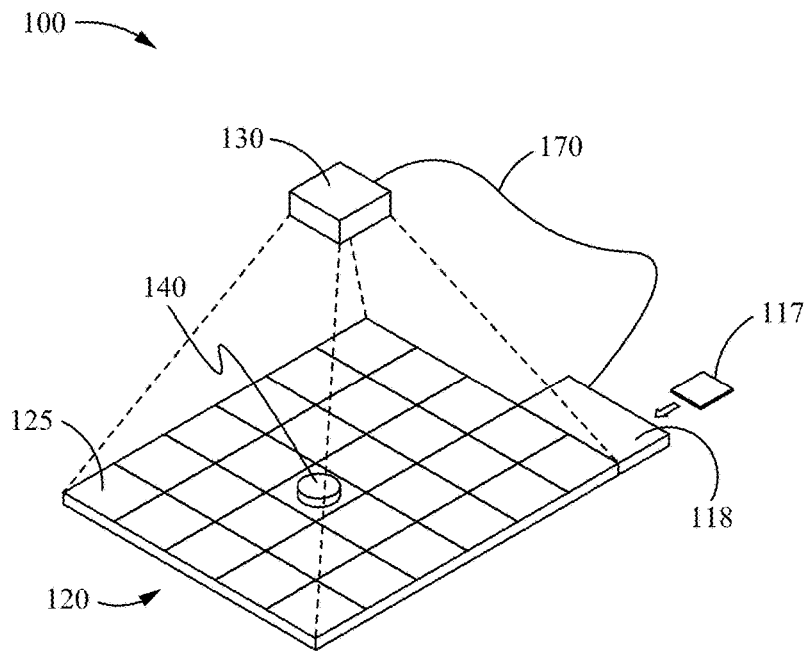
FIG. 1D illustrates a diagram of an intelligent game system for putting intelligence into board and tabletop games including miniatures according to some embodiments.

FIG. 1D illustrates a diagram of a system for putting intelligence into board and tabletop games including miniatures wherein the controller and the interface electronics are merged onto a single controller 118 according to some embodiments. The single controller 118 is able to be physically integrated with the game board 120 or is able to be physically separate from the game board 120. The interface controller 118 is able to further comprise a removable computer readable media 117 such as a SIMM card or a USB memory stick, game cartridge, magnetic disk, digital video disk, compact disk or other portable removable media. In these embodiments, the interface controller 118 receives object information from the sensors 125 or directly from the game object 140 via interface electronics integrated with the controller 118. The game application software is able to be resident on the computer readable media 111 within the controller 118, or on a removable computer readable media 117. The game application software processes the object information received and transmits the image information of a changing image to the projector 130.

Figure 1E:
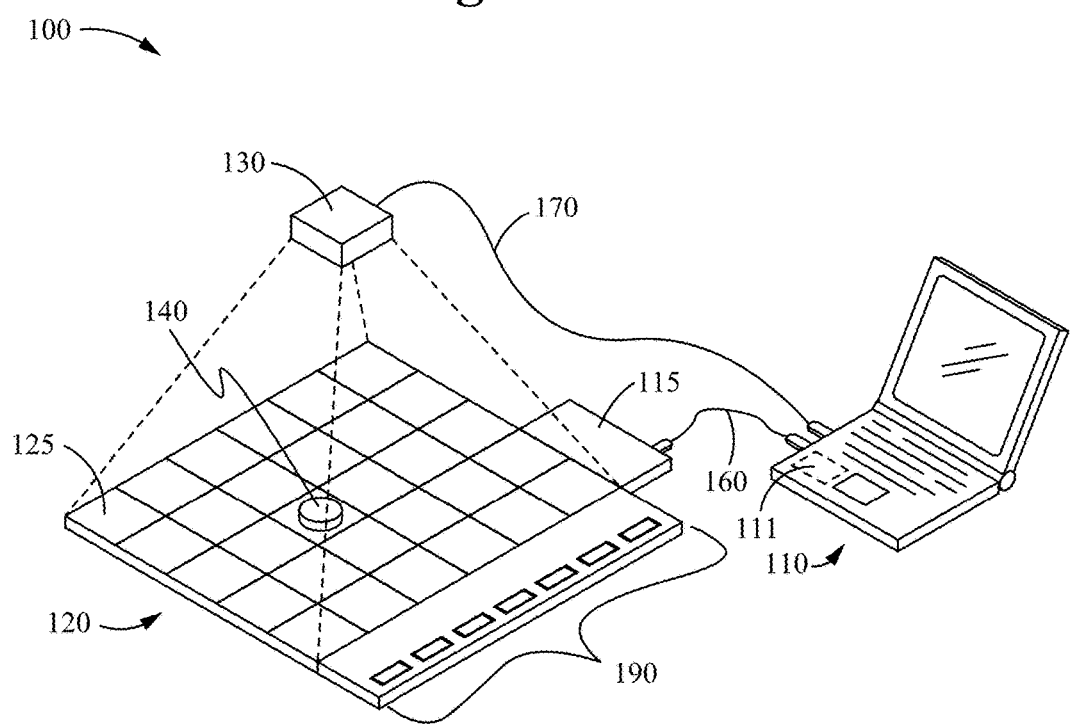
FIG. 1E illustrates a diagram of an intelligent game system for putting intelligence into board and tabletop games including miniatures according to some embodiments.

FIG. 1E illustrates a diagram of a system for putting intelligence into board and tabletop games including miniatures comprising one or more switches or buttons 190 according to some embodiments. The switches or buttons 190 are able to include dedicated functionality, such as a "Start" or "Reset" button, and switches or buttons 190 are further able to include programmable functionality such as programmable function keys F1 through F4. One skilled in the art will recognize that the switches or buttons are able to be implemented in a variety of technologies such as mechanical switches, capacitive switches, membrane switches, and the like. The switches or buttons 190 are able to be physically a part of the structure of the game board 120 or the switches or buttons 190 are able to be a separate physical structure from the game board 120. The switches or buttons 190 are interfaced to the interface electronics 115 and received by the controller 110 via the sensors interface cable 160.

Figure 1F:
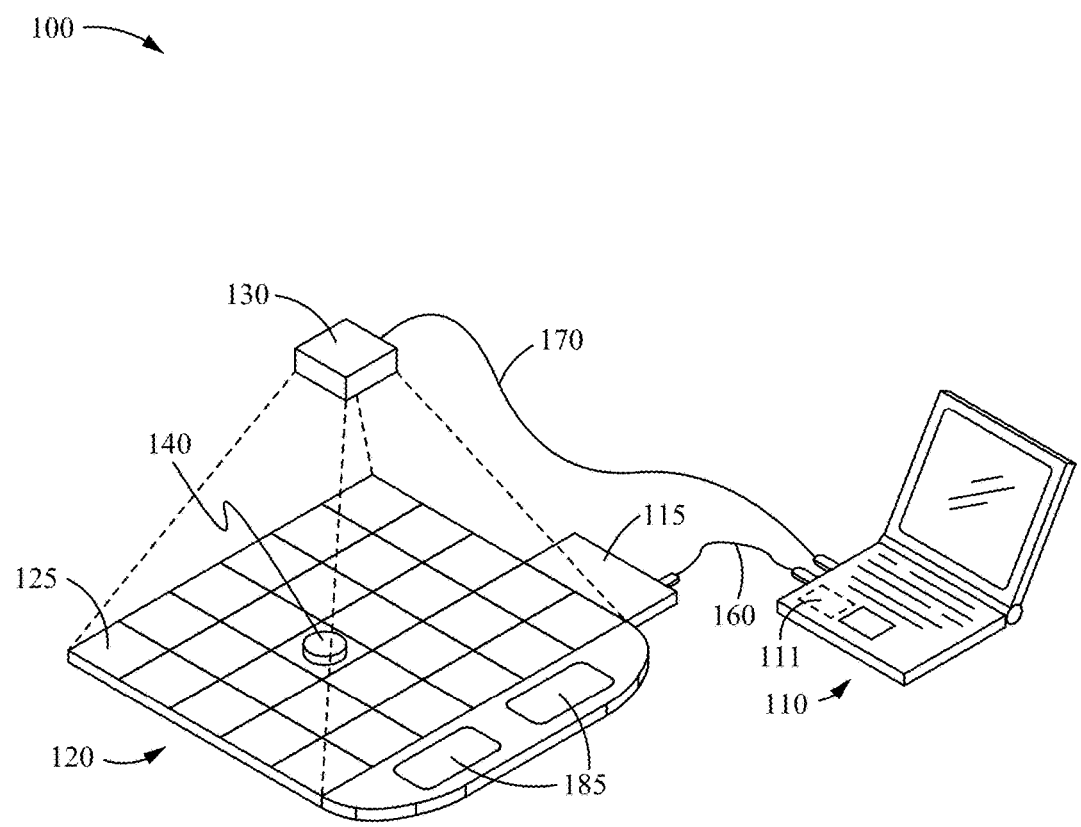
FIG. 1F illustrates a diagram of an intelligent game system for putting intelligence into board and tabletop games including miniatures according to some embodiments.

FIG. 1F illustrates a diagram of a system for putting intelligence into board and tabletop games including miniatures comprising one or more touch screens 185 according to some embodiments. Touch screens 185 are able to be physically a part of the structure of the game board 120 or a separate physical structure from the game board 120. The controller 110 transmits information to a touch screen 185, and receives information from a touch screen 185, via the electronics interface 115.

Figure 1G:
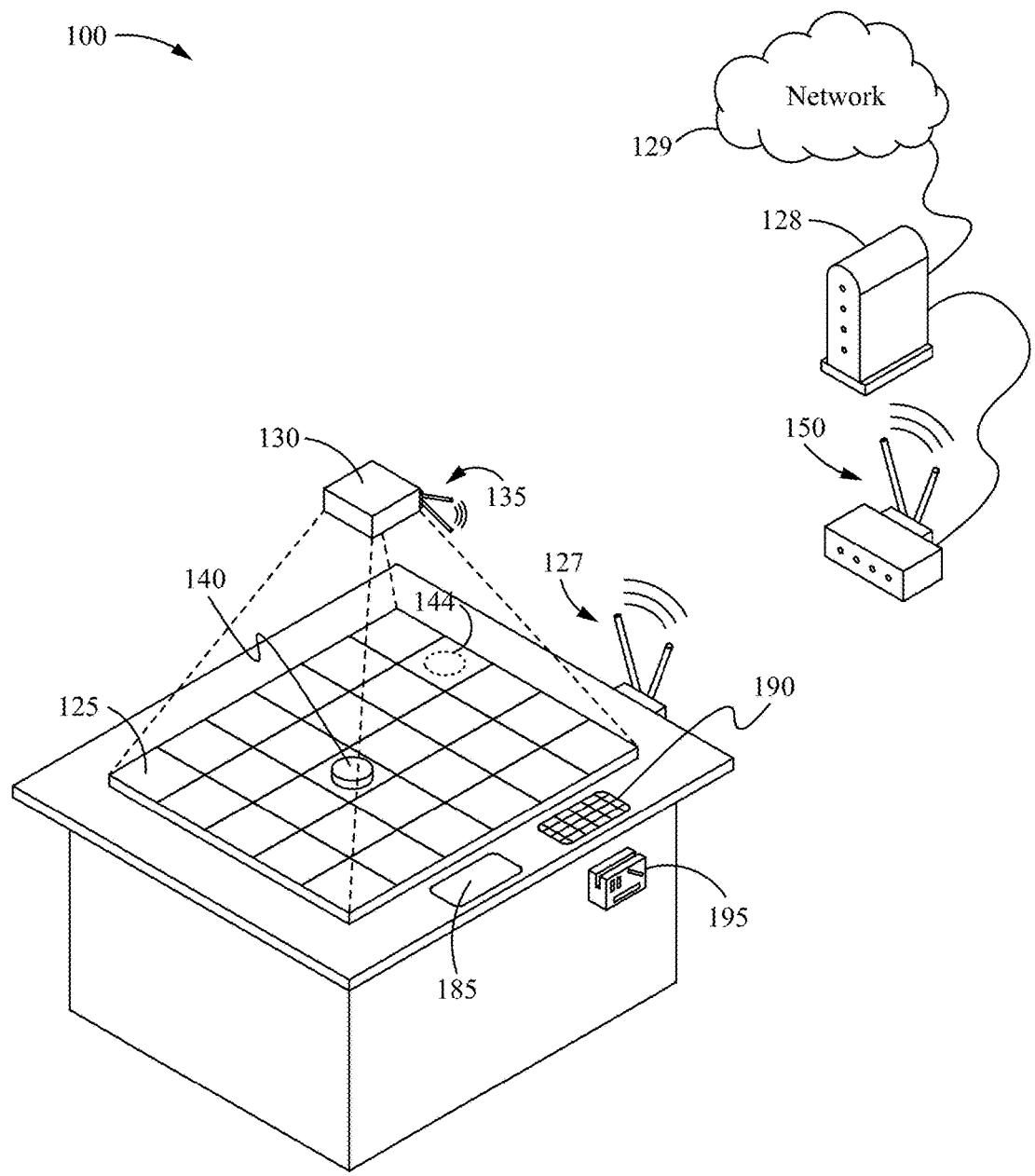
FIG. 1G illustrates a diagram of an intelligent game system for putting intelligence into board and tabletop games including miniatures according to some embodiments, configured for use in amusement or arcade environments.

FIG. 1G illustrates a diagram of a system for putting intelligence into board and tabletop games including miniatures comprising a payment system 195 according to some embodiments. FIG. 1G is exemplary of an arcade or amusement configuration. Payment system 195 comprises a magnetic swipe card slot, a cash reader/scanner, token accepting slots and a return button. One skilled in the art will recognize that any combination of the listed payment methods may be available commercially as an add-on module to the intelligent game system. Additional switches or buttons 190 are able to be used to check login credentials by logging on to a remote system to enable payment by an account or with micro-cash. Touch screen 185 may be used to display login keystrokes. In addition, touch screen 185 is able to be used as a login input device instead of additional switches or buttons 190. In some embodiments, system components are coupled via wireless communications devices 135 (projector), 150 (router) and 127 (sensors and controller). Wireless router 150 is able to be further coupled to a DSL or cable modem 128 and further coupled to a network 129, such as the Internet, enabling electronic payment features and remote game play.

Figure 2A:
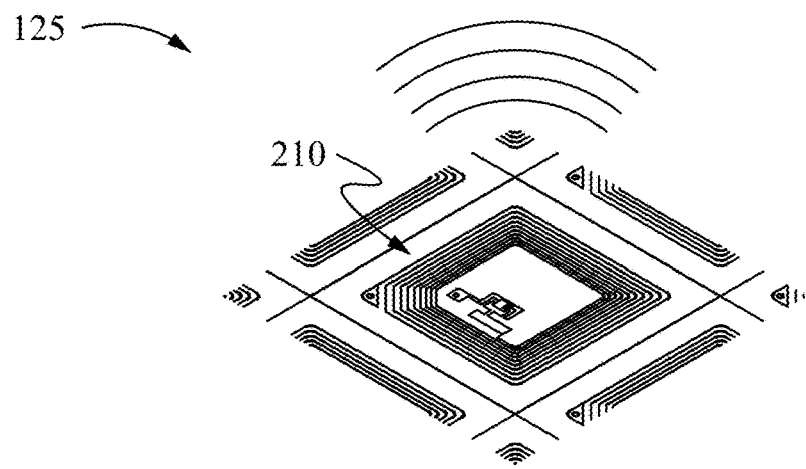
FIG. 2A illustrates a diagram of a RFID reader as a sensor in the one or more sensors according to some embodiments.
Figure 2B:
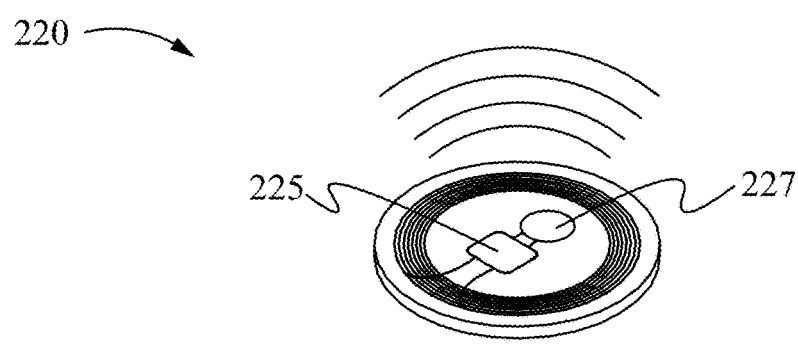
FIG. 2B illustrates a diagram of an object containing an active RFID tag according to some embodiments.
Figure 2C:
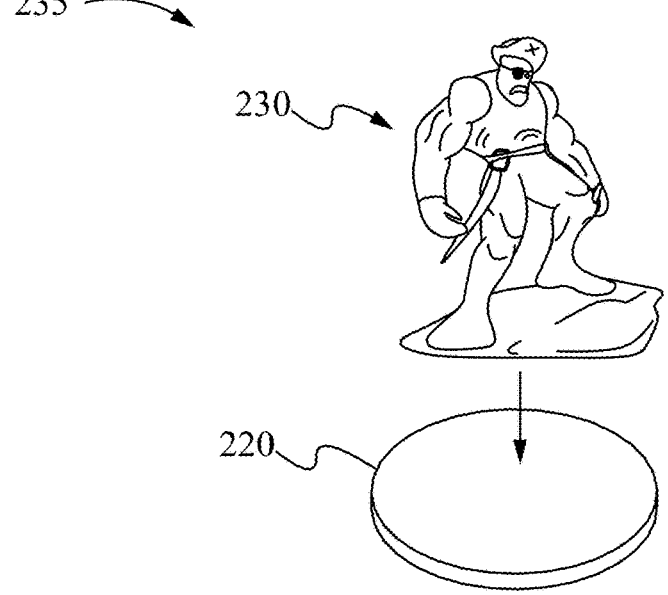
FIG. 2C illustrates a diagram of an existing game piece mounted on an object containing an RFID tag according to some embodiments.
Figure 9A:
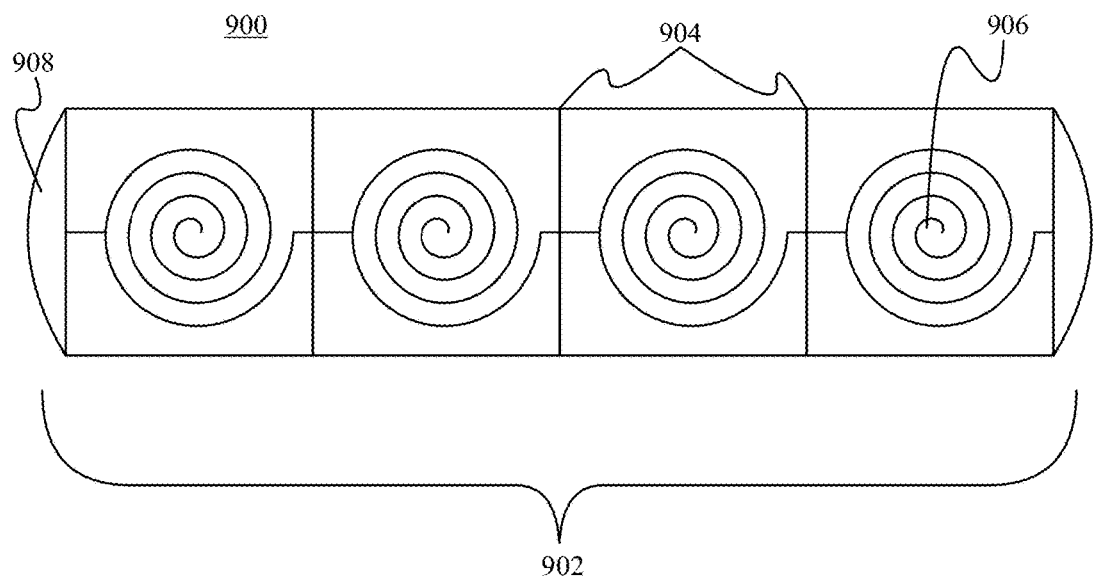
FIG. 9A illustrates a top view of a foldable three-dimensional terrain piece in accordance with some embodiments.
Figure 15A:
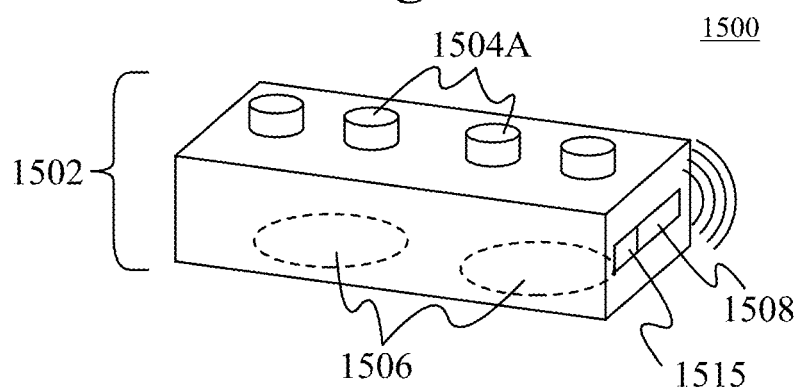
FIG. 15A illustrates a top perspective view of a block element in accordance with some embodiments.

FIG. 2A illustrates a sensor 125 according to some embodiments. The sensor comprises a RFID reader 210 with associated antenna. In some embodiments, low voltage electrical power is available within the sensors 125. FIG. 2B illustrates an object 220 according to some embodiments comprising an inexpensive, commercially available RFID tag 225 wherein the tag is passive. In some embodiments, the RFID tag 225 is an active tag, and optional battery 227 is included in the object 220. In some embodiments, an active RFID tag comprises, for example, an Atmel® Asset Identification EEPROM part number AT24RF08C. The Atmel part has 1K bytes of on-board EEPROM, a nonvolatile memory, with which to store object information in addition to the RFID tag. FIG. 2C illustrates affixing the object 220 to an existing game piece miniature 230 to create an intelligent game piece object 235. The object 220 is lightweight, and thus any readily available adhesive, such as Elmer's Glue™, two-sided tape, rubber cement, model glue, or epoxy, will serve to affix the object 220 to the existing game piece miniature 230. It will be clear to one of skill in the art that the RFID tag is also able to be mechanically coupled to the existing game piece. In some embodiments, the object 220 is able to be affixed to the game board such that the game board becomes an intelligent game object 140 with an RFID tag 225 storing object information. Alternatively, an object 220 is able to be affixed to terrain 900 as shown in FIG. 9A, game blocks 1500 as shown in FIG. 15A, and/or other objects such that the objects become intelligent objects with RFID tags 225 storing object information.

Figure 2D:
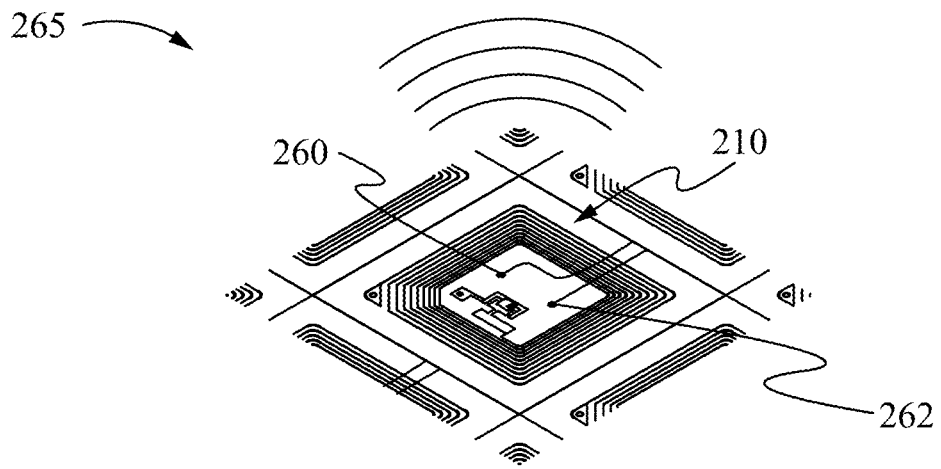
FIG. 2D illustrates an active RFID reader and electrical contacts according to some embodiments.
Figure 2E:
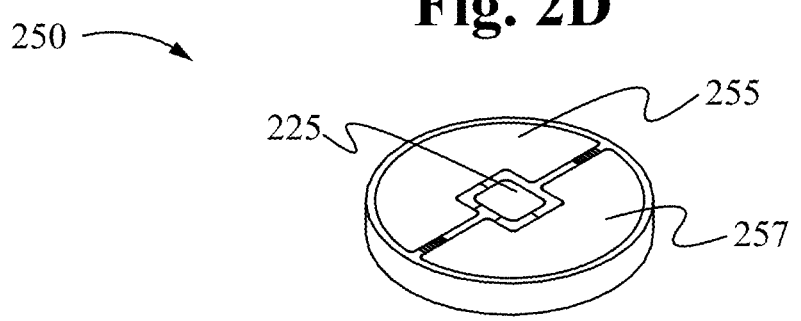
FIG. 2E illustrates an object with an RFID tag and electrical contacts according to some embodiments.
Figure 2F:
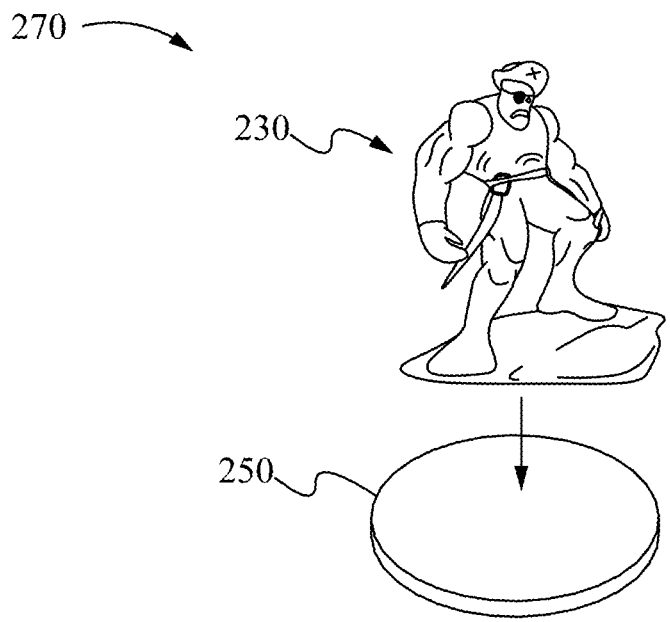
FIG. 2F illustrates an existing game piece mounted on an object containing an RFID tag with electrical supply contacts to the object according to some embodiments.

FIG. 2D illustrates a sensor with a power supply 265 according to some embodiments. A sensor with a power supply 265 comprises a RFID reader 210 and positive and negative electrical contacts 260 and 262. According to some embodiments, FIG. 2E illustrates a powered object 250 comprising either a passive or active RFID tag 225, and hemispherically shaped electrical contact plates 255 and 257. The exact shape of the electrical contact plates 255 and 257 is able to vary, so long as the electrical contact plate shape accommodates a substantial variability in orientation of the powered object 250 placed on the powered sensor 265 electrical contacts 260 and 262. FIG. 2F illustrates affixing the powered object 250 to an existing game piece miniature 230 to create a powered intelligent game piece object 270 according to some embodiments. The powered object 250 is lightweight, and thus any readily available adhesive will serve to affix the powered object 250 to the existing game piece miniature 230. Also, similar to the unpowered object 220, the powered object 250 is able to be affixed to a game board, terrain 900, game blocks 1500 and/or other objects.

Figure 2G:
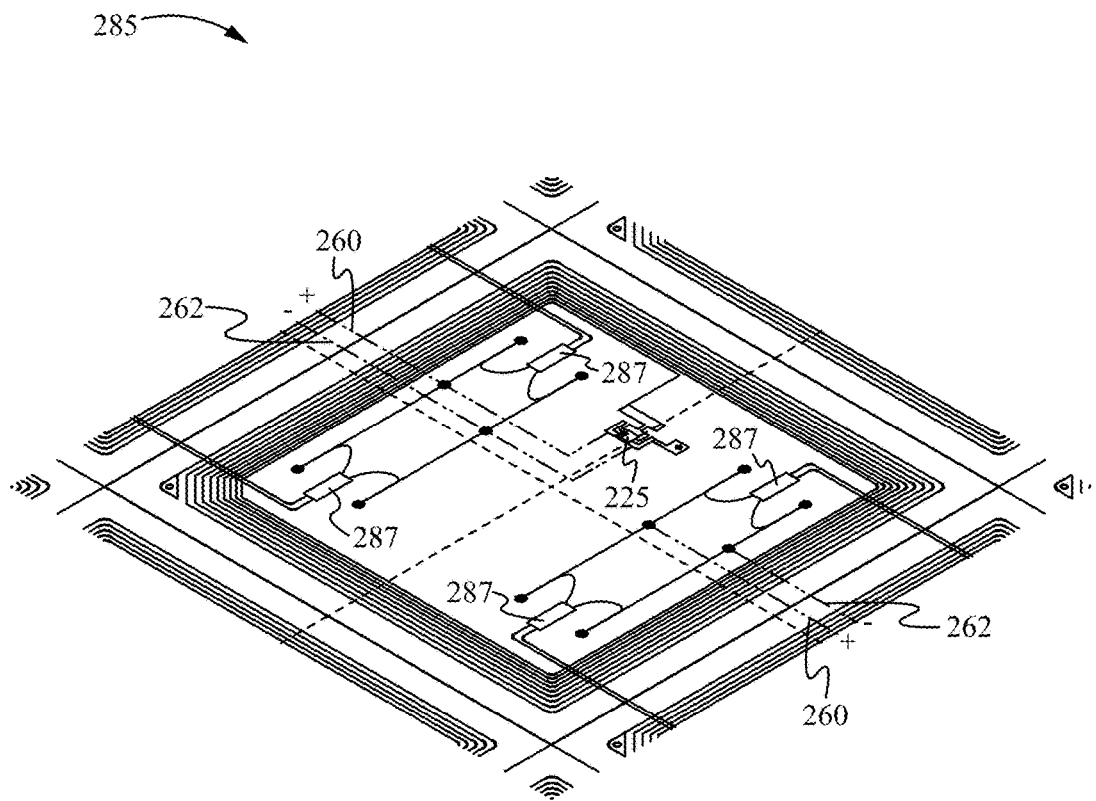
FIG. 2G illustrates an object containing an active RFID reader and Hall-effect sensors with electrical supply contacts according to some embodiments.

FIG. 2G illustrates one or more sensors according to some embodiments. The sensors comprise one or more sensors of a first type and one or more sensors of a second type. The functionality of the sensors of the first type and the sensors the second type are able to differ. In some embodiments, sensors of the first type are sensors which detect at least the presence of an object, such as a Hall-effect sensor, an opto-detector, a mechanical switch such as a pogo-pin, or an electrical contact such as making or breaking a circuit. Sensors of the second type are, for example, RFID readers, or bar code scanners. Embodiments of this type use the sensors of the first type to detect the presence of an intelligent game piece object and use the sensors of the second type to obtain object information. In some embodiments, one or more sensors comprise a sensor of the first type for each location for which detection of an object's presence is desired, and subsequently apply power to the powered intelligent game piece object to enable transfer of its object information to a single sensor of the second type. Sensors of the second type include RF transceivers, wireless 802G receivers, pulsed infra-red light receptors and serial communications modules.

Figure 2H:
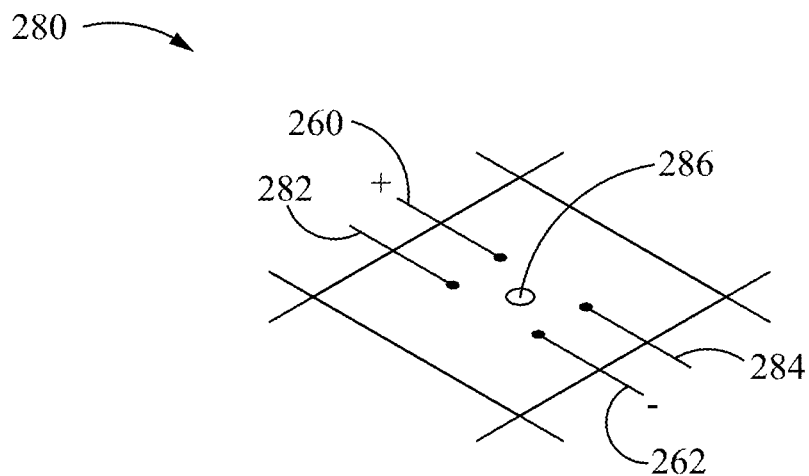
FIG. 2H illustrates a sensor with an optical detector, electrical supply contacts and communication contacts according to some embodiments.
Figure 2I:
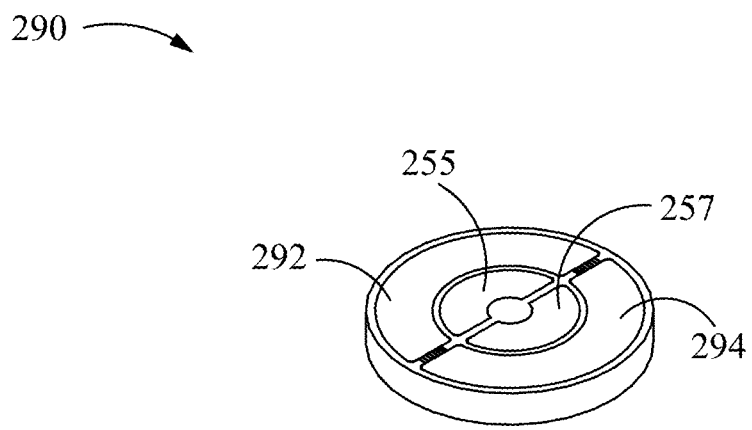
FIG. 2I illustrates an object with electrical contacts and communication contacts according to some embodiments.

FIG. 2H illustrates a diagram of a sensor according to some embodiments. An optical powered sensor 280 comprises electrical contacts 260 and 262, communications contacts 282 and 284, and an opto-detector 286. The opto-detector 286 is a sensor of the first type, as described above. The opto-detector 286 detects the presence of a powered object 290 by occlusion of light when a powered object 290 is placed on a sensor 280. Power is then applied to the powered object 250 via the electrical contacts 260 and 262. On "wake-up" of the processor or controller 610 on the intelligent game piece object 600, or by polling by the interface electronics 115 or by the controller 110, the processor or controller 610 (FIGS. 6B and 6C) drives a message onto the communication pin 292 thereby transmitting object information to a sensor of the second type. In some embodiments, a sensor of the second type is able to be a single serial communications circuit. FIG. 2I illustrates a diagram of a powered intelligent game piece object 290 according to some embodiments. The powered object 290 is able to be used with sensors of two types as described above. One skilled in the art would recognize that a wide variety of sensors of the second type (communication) are contemplated. Further, one skilled in the art would recognize that a wide variety of sensors of the first type (presence) are also contemplated.

In the description which follows, the term "sensor" will refer to a sensor 125 or powered sensor 265, 280 or 285, unless a distinction is noted. The term "object" will refer to an object 220 or a powered object 250 or 290 unless a distinction is noted. The term "intelligent game piece object" will refer to an intelligent game piece object 235 or powered intelligent game piece object 270, unless a distinction is noted.

Figure 3:
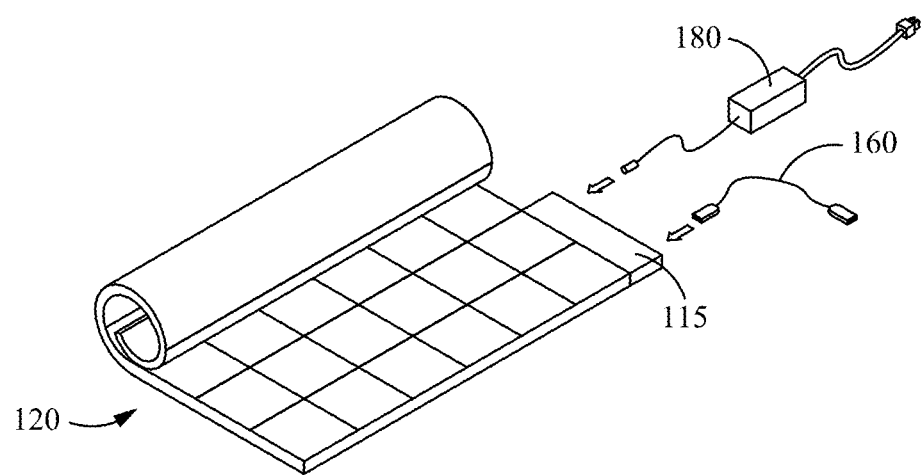
FIG. 3 illustrates a flexible version of the one or more sensors according to some embodiments.

FIG. 3 illustrates one or more sensors according to some embodiments. The sensors are able to be encased in a flexible, portable structure enabling the sensors to be conveniently rolled up for easy transportation. In some embodiments, an AC power adapter 180 supplies low voltage power to the sensors and to the interface electronics 115. In other embodiments, a battery or power storage system is used to provide power to the sensors and to the interface electronics 115. The sensor interface cable 160 couples the interface electronics 115 to the controller 110.

Figure 4:
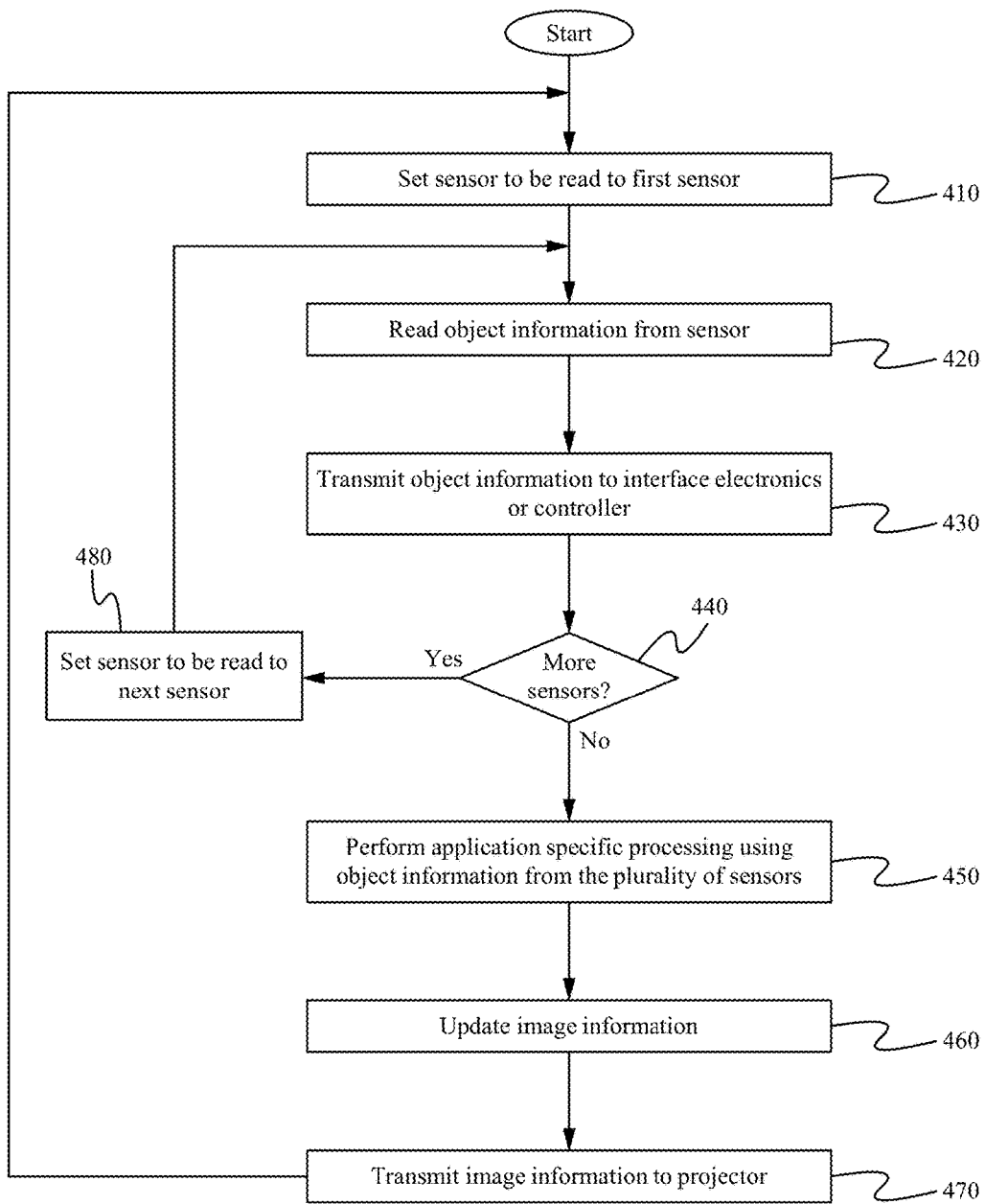
FIG. 4 illustrates a process to update a changing image in response to changes in an object's location based on object information obtained from the sensors.

FIG. 4 illustrates a method of updating a changing image and transmitting the image to a projector 130 according to some embodiments, using sensors of only one type. It will be recognized by one skilled in the art, that the method described below is able to be implemented within the controller 110, the interface electronics 115, or the combined interface electronics and controller 118. At step 410, the sensor to be read is set to the first sensor. In some embodiments, the sensor to be read is determined by a sensor address. In some embodiments, the sensor to be read is determined by other identification methods, such as a name, time slot, or mapping of the sensor to an input port of the controller. Object information is read from the sensor at step 420. The object information is then transmitted to the interface electronics or controller at step 430. At step 440, if there are more sensors to read, then the method branches to step 480 to set the sensor to be read to the next sensor, then the method continues at step 420. If there are no more sensors to read at step 440, then the application software processes the object information at step 430, and updates the image at step 460. The controller then transmits the image to the projector at step 470. The core game features of an intelligent game system are performed in the application software. Such features include producing graphics and sound, scoring points for game play, adjusting the object information characteristic values and executing the game in accordance with the game rules.

Figure 5:
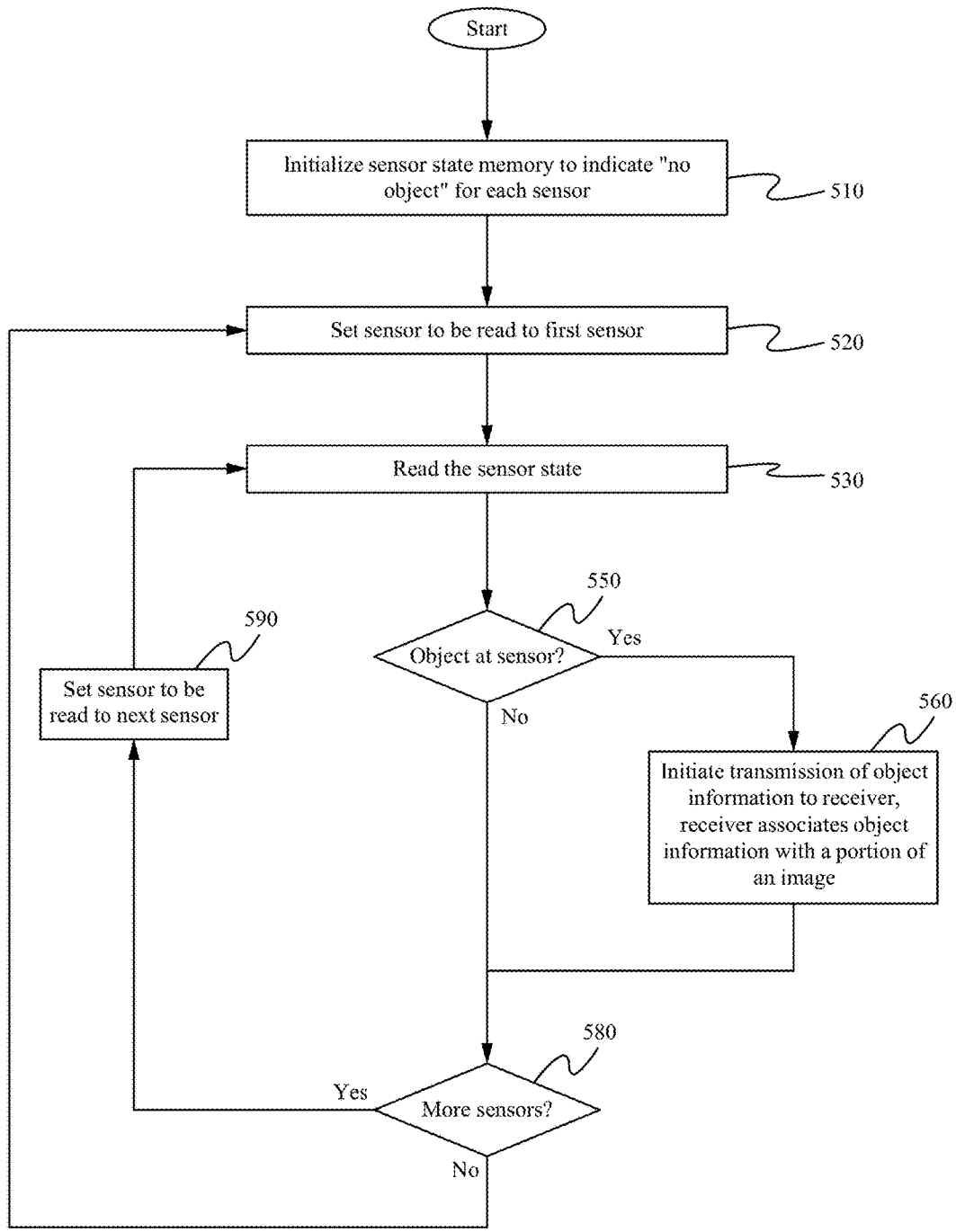
FIG. 5 illustrates a process to associate object information with a portion of an image using one or more sensors.

FIG. 5 illustrates a method of obtaining object information using sensors of two types according to some embodiments. At step 510, a memory to store the state of sensors of the first type is initialized to indicate that "no object" is present at each sensor. At step 520, the sensor to be read is set to the first sensor of the first type. The sensor is read at step 530. If the sensor state has changed at step 540, if an object is detected at the sensor of the first type in step 550, then the object at the sensor initiates transmission of its object information to a sensor of the second type at step 560. The receiver associates the object information with a portion of an image. If no object is at the sensor, then any object information stored for the sensor is deleted at step 570. At step 580, a check is made as to whether there are more sensors. If there are more sensors to check, the sensor to be read is set to the next sensor of the first type, and the sensor is read at step 530. If there are no more sensors to read at step 580, the method continues at step 520 where the sensor to be read is set to the first sensor of the first type.

Intelligent Game Piece Object

Figure 6A:
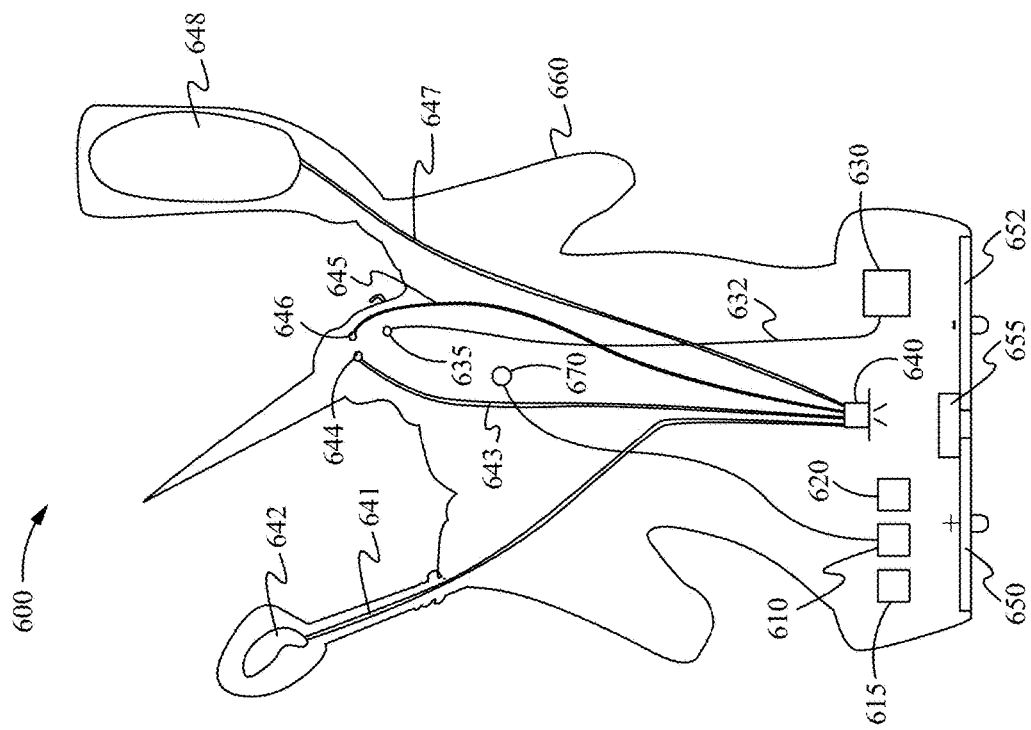
FIG. 6A illustrates a game piece character.
Figure 6B:
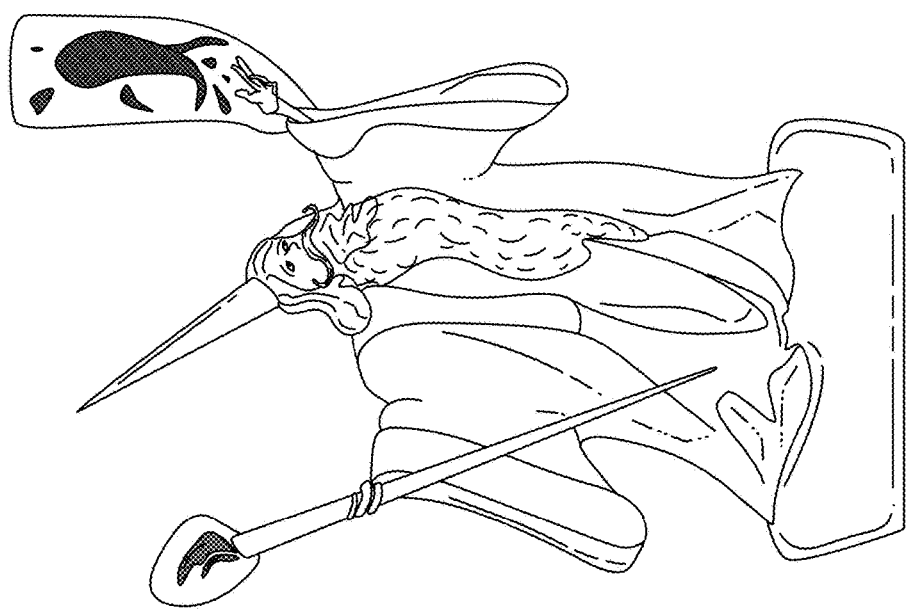
FIG. 6B illustrates an intelligent game piece object according to some embodiments.

FIG. 6A illustrates an external view of an intelligent game piece object 600. FIG. 6B illustrates internal elements of an intelligent game piece object in accordance with some embodiments. Internal elements of an intelligent game piece object 600 comprise a processor or controller 610. In some embodiments, the intelligent game piece object 600 further comprises one or more of a nonvolatile memory 615, a transceiver 620, an audio processor 630, audio distribution equipment 632 and 635, a light emitting source 640, one or more light transmitters 641, 643, 645 and 647, and light diffusers 642, 644, 646 and 648. An intelligent game piece object 600 is able to further comprise an opto-detector 670. In some embodiments, the intelligent game piece object 600 further comprises power source contacts 650 and 652. In some embodiments, all components inside the intelligent game piece which require a power source are electrically coupled to the power source contacts 650 and 652. In other embodiments, one or more components of the intelligent game piece object 600 which require a power source are electrically coupled to a battery 655. The processor or controller 610 implements the intelligence of the intelligent game piece object 600. The external features of the intelligent game piece object are embodied in the external skin 660.

Processor/Controller

The processor or controller 610 advantageously coordinates the functionality in the intelligent game piece object 600. In some embodiments, the transceiver 620 is operably coupled to the processor or controller 610 to manage transmission and reception of messages. In some embodiments, the audio processor 630 is operably coupled to the processor or controller 610 so that processor or controller 610 is able to configure the audio processor 630 and send the audio processor content and effects for audio processing. In some embodiments, the light emitting source 640 is operably coupled to processor or controller 610 to control the delivery of light.

In some embodiments, the processor or controller 610 comprises a memory store for storing the executable instructions and program variables required to implement the functionality of the intelligent game piece object 600. For example, the executable instructions and/or program variables are able to define algorithms used by the controller 610 to adjust the characteristic values of the object information stored in the nonvolatile memory 615 of the game piece object 600 based on game event and/or game state information.

Communications

In some embodiments, an intelligent game piece object 600 comprises an interface 620 such as a communications transceiver. Alternatively, the interface 620 is able to be selected from a group comprising a universal serial bus (USB) interface, a blue tooth interface, or other types of interfaces for remote communication as are well known in the art. The transceiver 620 implements communications between the intelligent game piece object 600 and a receiver of intelligent game piece object information. In some embodiments, a corresponding transceiver is located within the sensors as a sensor of the second type. In other embodiments, the corresponding transceiver is located within the controller 110 (FIG. 1C). The corresponding transceiver is also able to be a wireless router 150 (FIG. 1C) such that the game piece object 600 is able to communicate with devices such as a server over the internet or other networks. It will be clear to one skilled in the art that the transceiver 620 is able to be a subsystem of the processor or controller 610, or of other elements within the intelligent game piece object 600.

Light Feature

In some embodiments, the intelligent game piece object 600 further comprises a light emitting source 640. The light emitting source 640 comprises, for example, a broadband light bulb, a single wavelength LED or a multi-wavelength LED. In some embodiments, the wavelengths include one or more non-visible wavelengths. The light emitting source 640 is optically coupled to one or more optical transmitters 641, 643, 645, and 647 to distribute light throughout the intelligent game piece object 600. In some embodiments, the optical transmitters include optical fiber of material type and diameter as appropriate for the application and the wavelength transmitted. In some embodiments, the optical transmitters include one or more mirrors. The mirrors are able to be conventional mirrors, precision optics, or micro-mirror arrays. In some embodiments, the one or more optical diffusers 642, 644, 646 or 648 include an opaque or diffusive material of any type such as a polymer resin, frosted glass, or plastic. An optical diffuser is able to be a micro-mirror array for distributing light in a programmable manner.

In some embodiments, the processor or controller 610 selects the wavelength of a multi-wavelength light source 640, or selects from the plurality of light transmitters 641, 643, 645, or 647, determines the on/off time of the light emitting source 640, or provides a pulse train to pulsewidth modulate the light emitting source 640. In some embodiments, the opto-detector 670 is managed by the processor or controller 610 to coordinate with other features of the intelligent game piece object 600 to implement unique game functionality. For example, an intelligent game piece object 600 with an 800 nm (non-visible) light emitting source and an opto-detector 670 which is sensitive to 800 nm light is able to cooperate with the processor or controller 610 to rotate the intelligent game piece object 600 while emitting 800 nm light from the light emitting source 640, and monitoring the opto-detector 670 for reflection of 800 nm light to determine when to stop rotating the intelligent game piece object 600 such that it is facing an opponent's intelligent game piece object.

Sound Feature

In some embodiments, an intelligent game piece object 600 comprises an audio processor 630 which is operably coupled to an audio speaker 635. An audio speaker 635 is able to be a piezo-electric transducer, a conventional cone speaker with magnet and diaphragm, or other suitable audio delivery equipment. Although FIG. 6B shows a single audio speaker 630, located at the mouth of the character of the intelligent game piece object 600, additional or alternate audio configurations would be contemplated by one skilled in the art. In some embodiments, the audio speaker 635 is located in the base, and the audio distribution equipment 632 comprises a hollow tube directed to the location where the audio is to be delivered. In some embodiments, the audio distribution equipment 632 comprises an electrical cable pair, distributing audio to one or more audio speakers 635. In some embodiments, the processor or controller 610 generates audio within the intelligent game object incident to the movement and optical sensing. In some embodiments, the audio processing comprises audio effects such as echo, reverb, phase shifting. In some embodiments, audio processing techniques are implemented in the processor or controller 610 where the processor or controller 610 comprises digital signal processing functionality.

Movement Feature

Figure 6C:
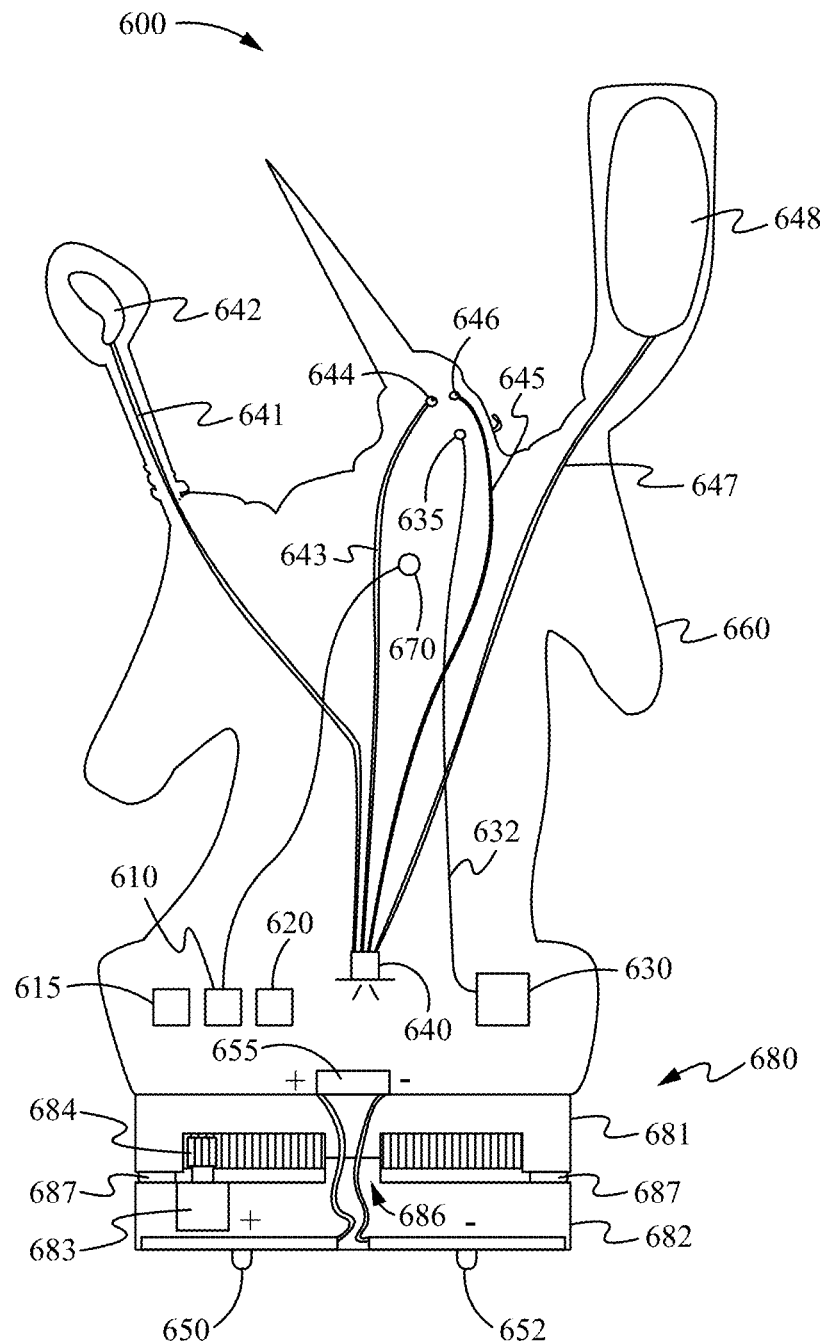
FIG. 6C illustrates a rotating base for a powered intelligent game piece object according to some embodiments.

FIG. 6C illustrates a rotating base for a powered intelligent game piece object according to some embodiments. The rotating base 680 comprises a top half of the base 681 and a bottom half of the base 682, rotatably coupled via a pivot 686. The top half of the base 681 is driven by a motor 683 in the bottom half of the base 682. The motor has a driving gear head or friction capstan drive 684 which drives the top half of the base 681. The top half of the base 681 has ring gear teeth corresponding to the driving gear head, or a friction surface to mate to the friction capstan drive. In some embodiments, the top and bottom halves of the rotating base further comprise a plurality of support bearing surfaces 687. Power is supplied via the electrical contacts 650 and 652, as described above.

Nonvolatile Memory

In some embodiments, an intelligent game piece object comprises a nonvolatile memory 615. The nonvolatile memory 615 stores persistent object information such as a unique identifier and associated attribute/characteristic values such as an object name, strength, speed, special powers, score count, injury statistics, light and/or audio processing algorithms and other object information. In some embodiments, the unique identifier is a globally unique identifier such as a unique address or other identifying data wherein each intelligent game piece object is able to be distinguished from any other intelligent game piece object by identifying the unique identifier of the desired object. FIGS. 7A through 7E illustrate partial memory maps of the object information stored in the nonvolatile memory 615, assuming 128 registers of 16-bits each. The memory maps and characteristic values are merely illustrative. It will be recognized by one skilled in the art that a wide variety of memory maps are able to be used, so long as minimum functionality includes a unique identifier for each intelligent game piece object. Further, it will be recognized by one skilled in the art that the nonvolatile memory is able to be a subsystem of the processor or controller 610, or a subsystem of another integrating circuit, such as the audio processor 630 or transceiver 620.

Methods of Intelligent Game System Play

Figure 8A:
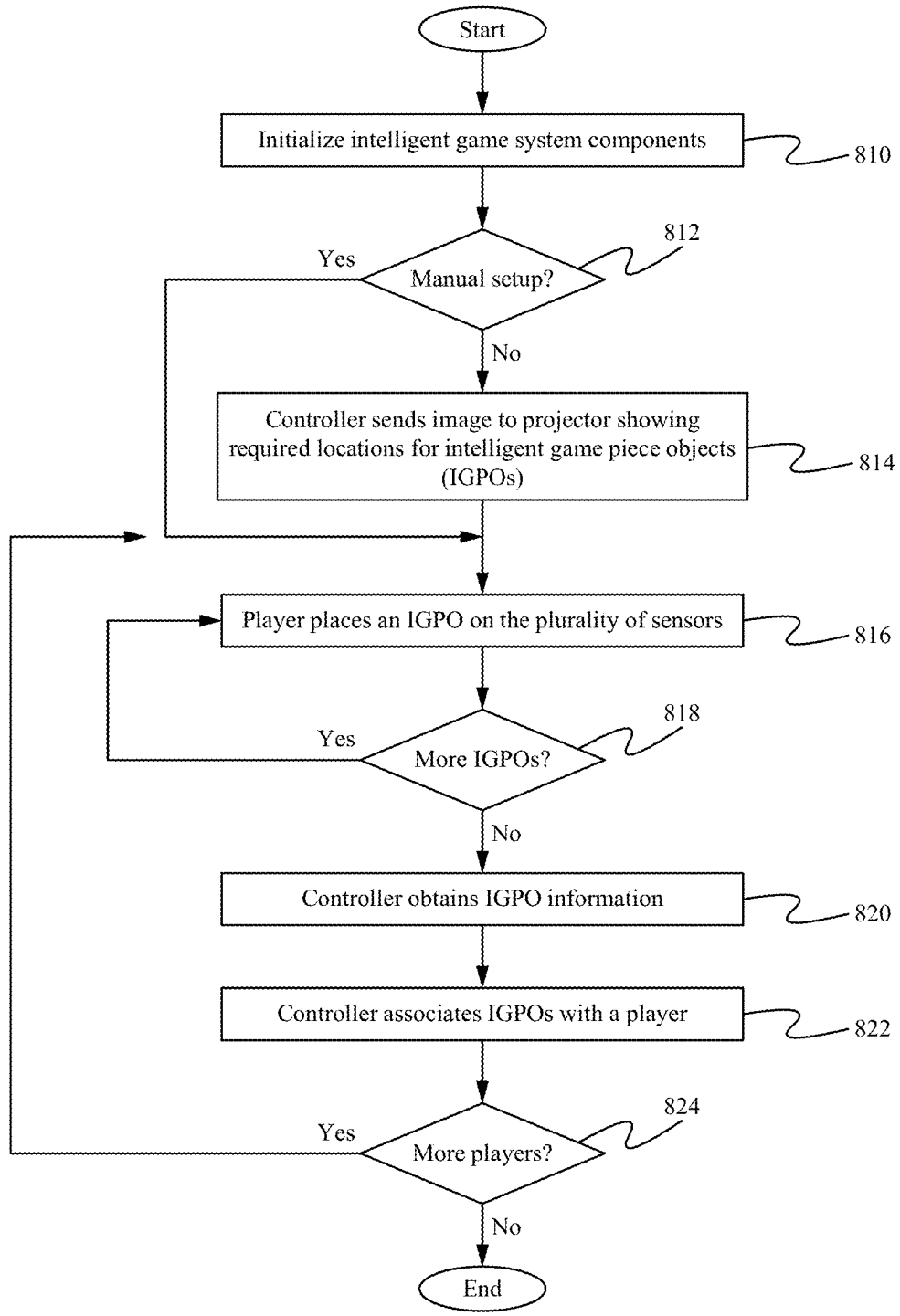
FIG. 8A illustrates a method of initializing an intelligent game system when starting a new game.

FIG. 8A illustrates a method of initializing game play for the start of a new game using an intelligent game system. At step 810, all intelligent game system components are initialized. At step 812, the user is presented with a decision whether they want to perform game piece setup manually, or automatically. If the user opts for automatic game piece setup, then at step 814 the controller sends an image to the projector to project onto the surface of the sensors, showing where the intelligent game piece objects are to be initially placed to begin game play. If the user opts for manual game piece setup, or following projection of the required game piece object locations for automatic game piece setup, then at step 816 the player(s) place intelligent game piece objects on individual sensor locations within the sensors. The placement of intelligent game piece objects onto the surface of the sensors continues until, at step 818, it is determined that no more game piece objects need to be placed. At step 820, the controller obtains intelligent game piece information from the intelligent game piece objects. At step 822, the intelligent game piece objects are associated with a player. At step 824, if another player's objects have not yet been placed, the process resumes at step 816, otherwise the process terminates.

Figure 8B:
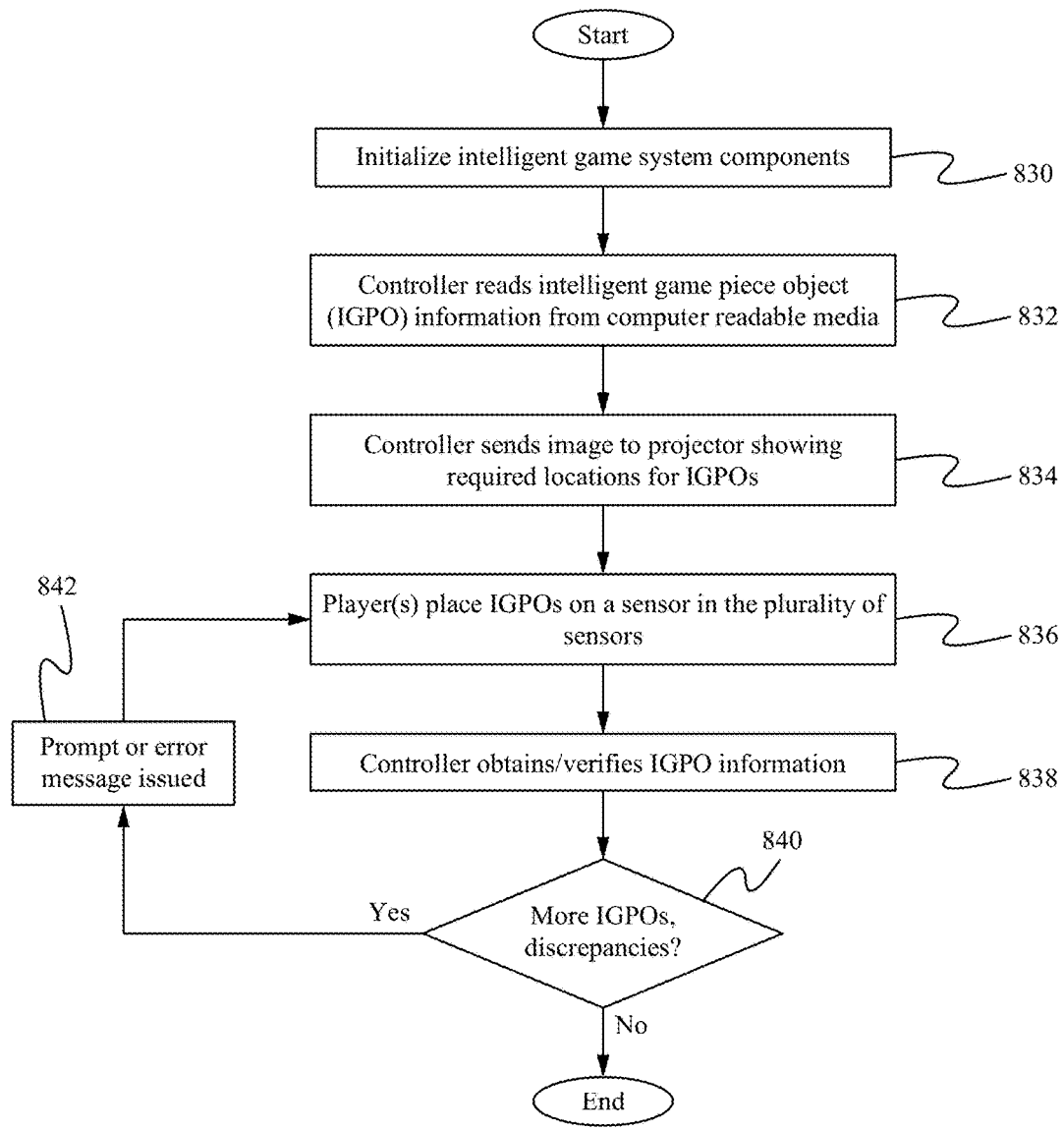
FIG. 8B illustrates a method of initializing an intelligent game system when resuming a game in progress using a computer readable media.

FIG. 8B illustrates a method of initializing game play for the resumption of a game in progress using an intelligent game system. At step 830, all intelligent game system components are initialized. At step 832, the controller reads intelligent game piece object information from a computer readable media. In some embodiments, the computer readable media is the nonvolatile memory on the intelligent game piece object. At step 834, the controller sends an image to the projector showing required locations for intelligent game piece objects to resume a previous game in progress. At step 836, a player places intelligent game piece objects on the sensors in the locations specified by the projected image. At step 838, the controller verifies the placement of intelligent game piece object(s). If it is determined at step 840 that there are more intelligent game piece objects to place, or that one or more intelligent game piece objects are placed on incorrect sensor(s), then a prompt or error message is issued and the process continues at step 836. One skilled in the art would recognize that the prompt or error message is able to be visual, displayed on the controller on via the projector, or audio, such as a spoken message, or any other relevant signal generated with the intelligent game system or the intelligent game piece objects. For example, an intelligent game piece object comprising a sound feature is able to direct the player to correct the intelligent game piece placement by a specific sound. An intelligent game piece object comprising a light feature is able to direct the player to correct the intelligent game piece placement by a specific sequence or pattern of illumination.

Figure 8C:
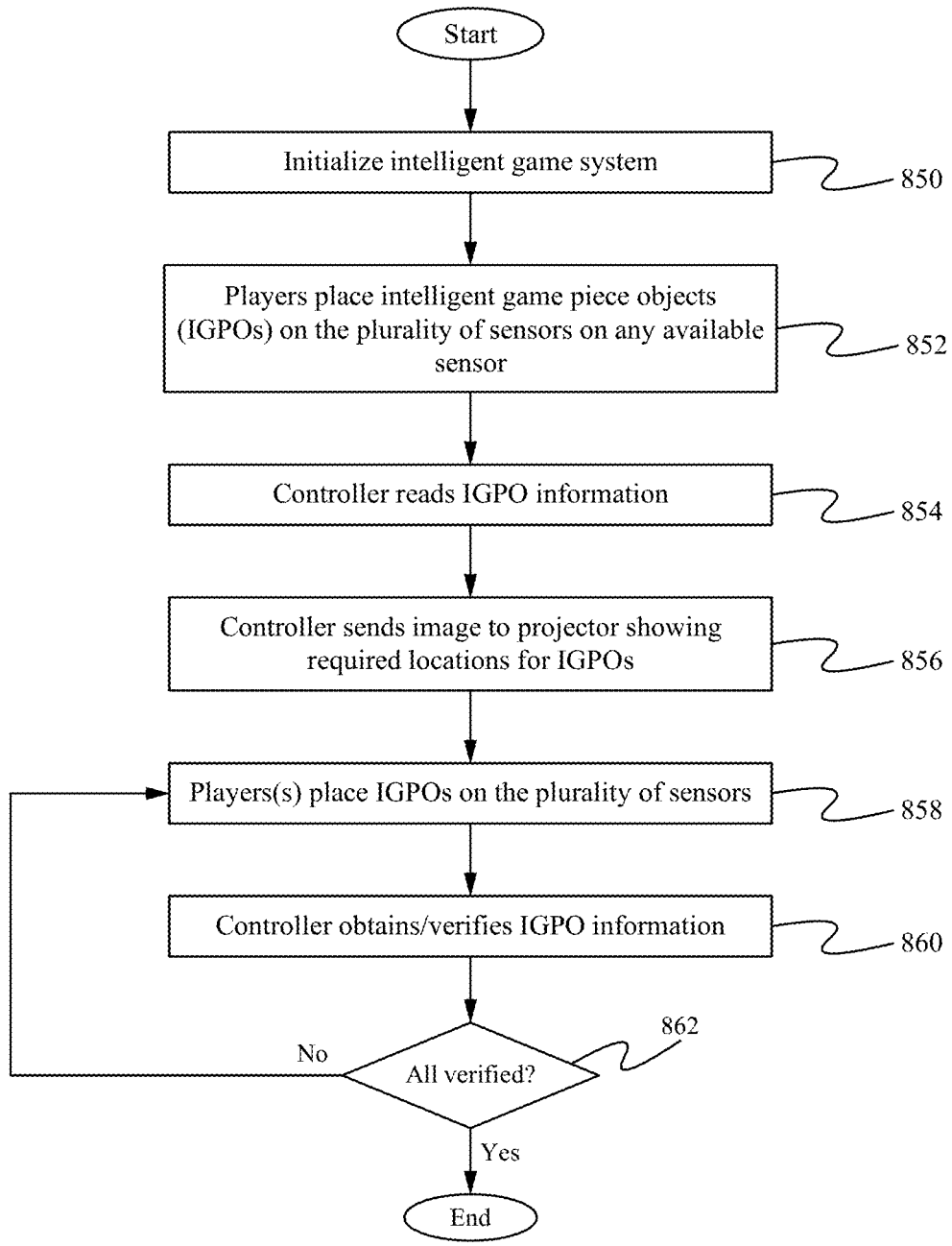
FIG. 8C illustrates a method of initializing an intelligent game system utilizing intelligent game piece object information stored within the intelligent game piece objects.

FIG. 8C illustrates a method of initializing game play for resumption of a game in progress using an intelligent game system according to some embodiments. At step 850, the intelligent game system hardware is initialized. Player(s) place intelligent game piece objects on the sensors at step 852, on any available sensor. Players are able to choose to place the intelligent game piece objects at, or near, where they remember them to be from the prior session of the game in progress. But, any available sensor will do. When the placement of intelligent game piece objects is completed, at step 854 the intelligent game system reads intelligent game piece object information from the intelligent game piece objects where the information comprises the unique identifier and sensor identifier stored in the intelligent game piece object during the prior session of the game in progress. At step 856, the controller sends an image to the projector showing required locations for the intelligent game piece objects. At step 858, player(s) then relocate intelligent game piece objects to the locations shown by the projected image. The controller obtains and verifies the placement of intelligent game piece objects at step 860. When the placement of all intelligent game piece objects has been verified, the process terminates at step 862.

Figure 8D:
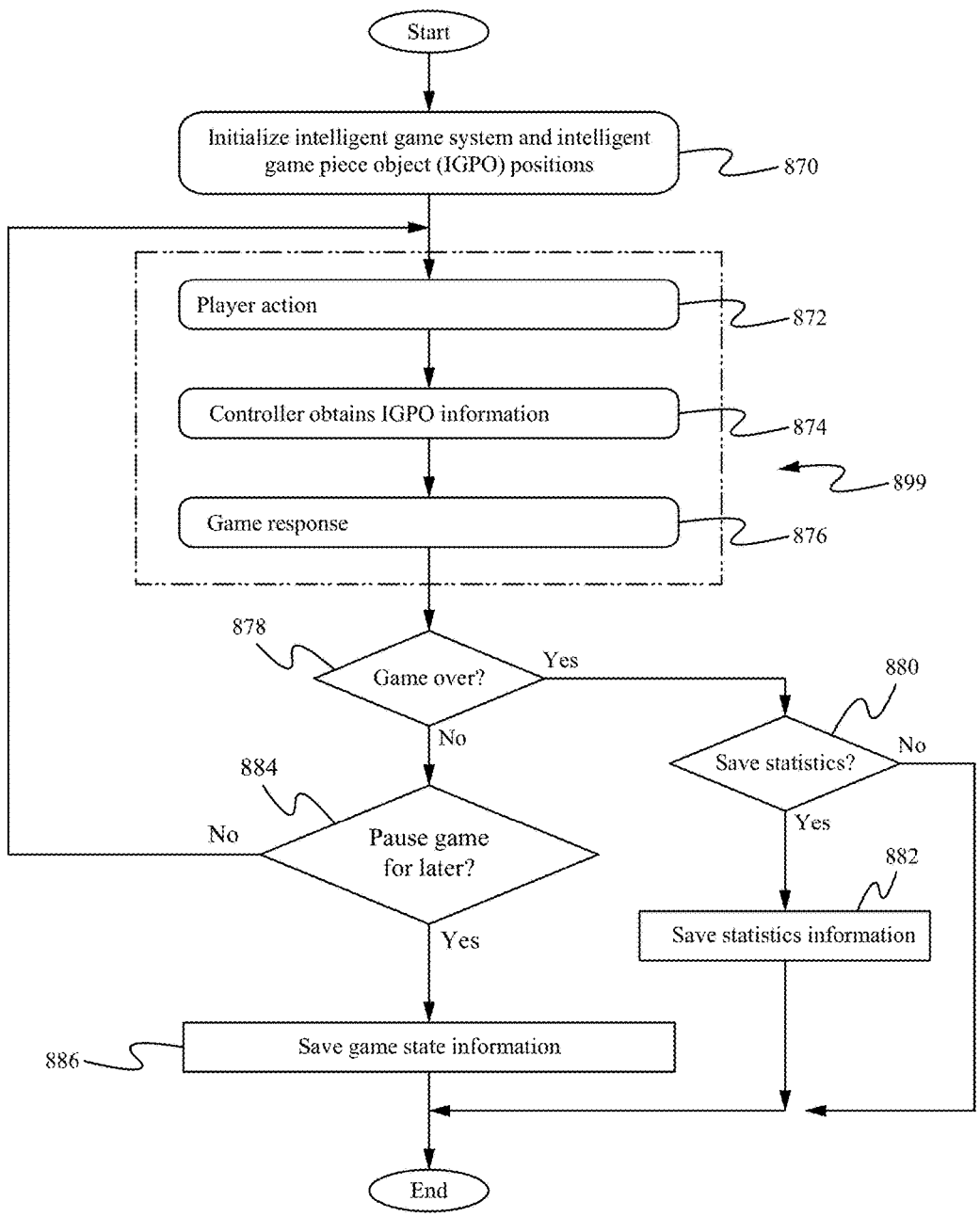
FIG. 8D illustrates an overview method of gameplay of a generic game according to some embodiments.

FIG. 8D illustrates an overview of game play of a generic game. The specific game logic, scoring, movement of players and other game specific-features is a function of the game application software, utilizing the intelligent game system and intelligent game piece object functionality. Step 899, shows the basic game engine, comprising player action, obtaining object information from intelligent game piece objects, and a game response. Starting the game at step 870, the game is initialized. Initialization of game play in an intelligent game system is able to be in accordance with FIGS. 8A through 8C, above. FIGS. 8A through 8C are illustrative of a process of game play initialization in an intelligent game system. At step 872, a player takes a player action. A player action is able to comprise the physical movement of an intelligent game piece object to another sensor in the sensors, or a player action is able to be an invocation of a game function or intelligent game piece object feature through any available input device in the intelligent game system. In some embodiments, a player action is able to be the failure to take an action within a defined time period. These player actions (and/or inaction) cause game events that are unique to each game and affect further game play. At step 874, the controller obtains intelligent game piece object information. At step 876, the game application software produces a response to the player action. In some embodiments, as described below the response comprises the controller adjusting the characteristic values of the object data based on the game events. Additionally, the response is able to include sound and/or graphics.

At step 878, if the game is over, then the method branches to step 880, where the user is prompted whether the intelligent game system is to save game statistical. At step 882, statistical information is saved. Such statistical game state or game event information comprises information such as scoring information, location of intelligent game piece objects, and current dynamic information for intelligent game piece objects such as the adjustments to the characteristic values of the object information of the intelligent game piece objects caused by the game play. In some embodiments, intelligent game piece object dynamic information comprises such items as weapon count, current stamina, injury statistics, accessory count and other game piece specific information. In an intelligent game piece object comprising nonvolatile memory, intelligent game piece-specific information is able to be stored within the intelligent game piece object. In some embodiments, all game play and intelligent game piece information is stored on a computer readable media. The computer readable media is able to be located within the controller, external to the controller, or is able to be a removable computer readable media. The statistical/game event information is also able to be transmitted via network, or by email, to a remote destination for later use. If the game is not over, then a player is able to opt to pause the game in progress for later play at step 884. If the player opts to pause the game, then game state information is saved at step 886, otherwise play continues at 872. Game state information comprises any, or all, of the information described above in step 882 where statistical/game event information is saved. In addition, if relevant, intelligent game piece object information indicating the identifier of the sensor at which each intelligent game piece object is presently positioned is stored. As with statistic or state information, the location of intelligent game piece objects is able to be stored in computer readable media in the controller, or a removable computer readable media, within nonvolatile storage within the intelligent game piece objects, or transferred by network to a remote server or by email.

It will be understood by those skilled in the art that the players are able to use intelligent game piece objects, or virtual game piece objects. Virtual game piece objects are projected onto the surface of the sensors. Thus, a virtual player is able to be, for example, the controller or a live game player accessing the intelligent game system via a network. Further, all players are able to be virtual players, such as for demonstrating a training mode or arcade mode where the game plays against itself, using virtual game piece objects to demonstrate game play or to attract players to the game by demonstrating its features and game play. Since the virtual players are mere images whose location is determined by the controller, intelligent game piece objects and virtual game piece objects are able to occupy the same sensor location.

Intelligent Terrain

Figure 9B:
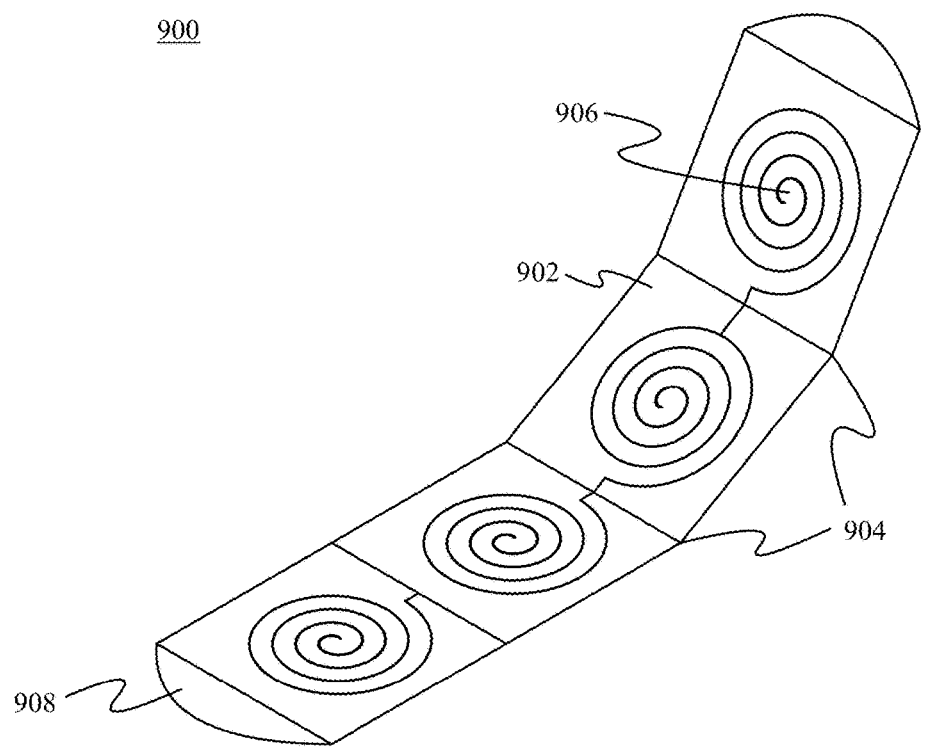
FIG. 9B illustrates a perspective view of a partially folded foldable three-dimensional terrain piece in accordance with some embodiments.
Figure 9C:
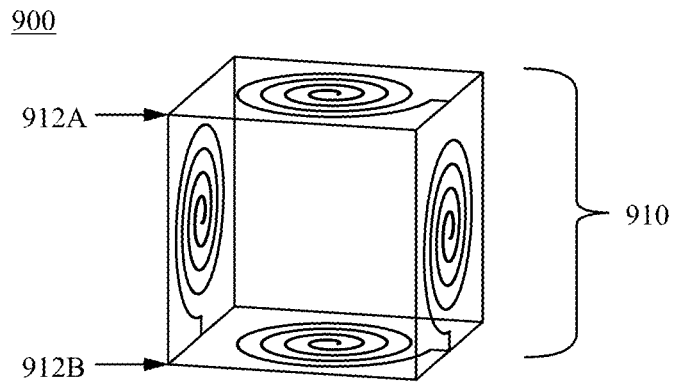
FIG. 9C illustrates a perspective view of a fully folded foldable three-dimensional terrain piece in accordance with some embodiments.
Figure 9D:
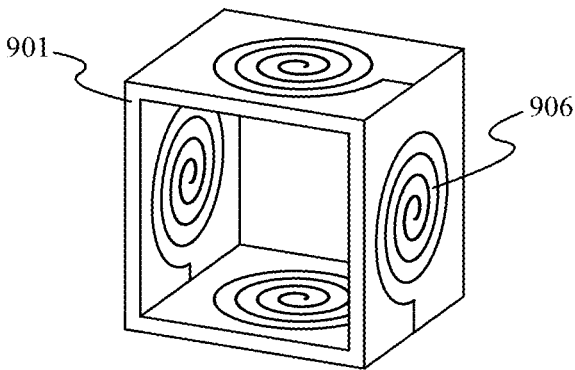
FIG. 9D illustrates a perspective view of a pre-formed three-dimensional terrain piece in accordance with some embodiments.

FIGS. 9A-9C illustrate foldable three-dimensional terrain 900 in accordance with some embodiments. The terrain 900, as shown in FIG. 9A, comprises a substantially flat substrate 902, one or more folding lines 904 and one or more sensors 906. Alternatively, the substrate 902 is not substantially flat. In some embodiments, as shown in FIGS. 9A-9C, the substrate 902 is configured in a rectangular shape. Alternatively, the substrate 902 is able to be a different shape. In some embodiments, the substrate 902 comprises plastic or paper. Alternatively, the substrate 902 comprises a combination of plastic, paper, wood or other material capable of forming the structure of a stable three-dimensional shape. In some embodiments, the foldable terrain 900 further comprises one or more fastening elements 908 for releasably fastening disconnected edges of the substrate 902 to each other. Alternatively, the fasteners 908 are configured to permanently fasten the terrain 900 together. In some embodiments, the fasteners 908 comprise extending tabs that are able to interlock or couple to each other or the substrate 902. Alternatively, the fasteners 908 are able to comprise other fastening methods such as glue or tape as are well known in the art. In some embodiments, as shown in FIG. 9D, the terrain 900''' is able to be a rigid mold 901 comprising one or more sensors 906. The pre-formed terrain 900''' being previously molded into the desired three-dimensional shape. The pre-formed terrain 900''' is able to comprise and combination of plastic, metal, wood, or other rigid material capable of being pre-formed. It should be noted that one skilled in the art would understand that because the terrain 900''' is molded or pre-formed, the terrain 900' does not require folding lines 904 or fastening elements 908. Alternatively, the terrain 900' comprises at least one folding line and/or fastening elements (not shown) allowing the terrain 900' to open using the folding line as a hinge and fasten closed into the three-dimensional shape using the fasteners.

The folding lines 904 are positioned on the substrate such that the substrate 902 is able to bend along the folding lines 904. In some embodiments, the position and dimension of the folding lines 904 is predetermined based on the desired three-dimensional shape 910 of the three-dimensional terrain 900. Alternatively, the folding lines 904 are positioned and dimensioned such that the substrate 902 is able to bend into a multitude of three-dimensional shapes. In some embodiments, the folding lines 904 comprise a thinner or weakened portion of the substrate 902 that permits the substrate to more easily bend along the folding lines 904 as shown in FIG. 9B. Alternatively, the folding lines 904 comprise a flexible area of the substrate 902 that allows the substrate 902 to bend along the folding lines 904. Alternatively, in some embodiments, the folding lines 904 represent edges of a plurality of discrete terrain pieces, which are able to be coupled together to form a desired three-dimensional shape. In such embodiments, the discrete terrain pieces 900 are able to be coupled together by one or more fasteners 908.

Figure 11:
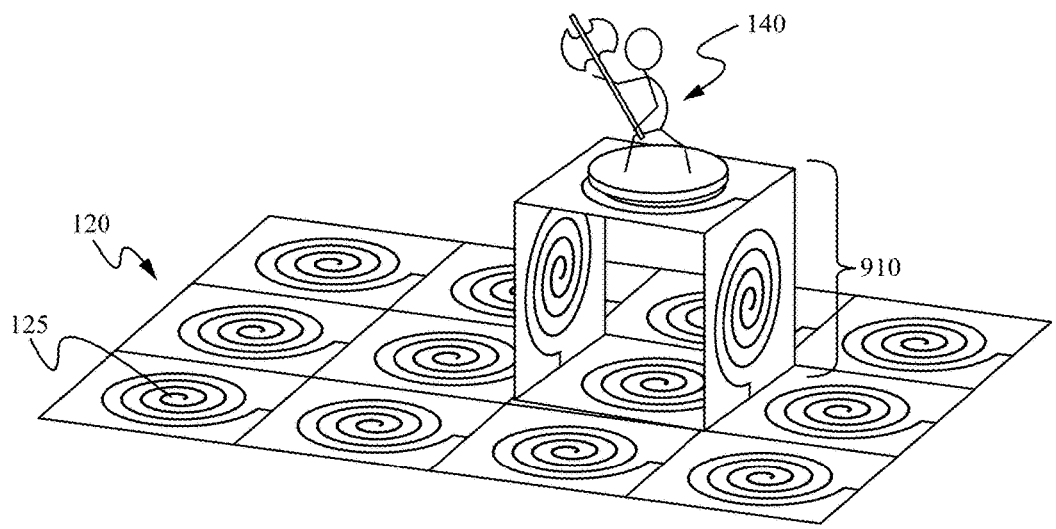
FIG. 11 illustrates a perspective view of a foldable three-dimensional terrain piece in use with a game board and a game piece in accordance with some embodiments.
Figure 12:
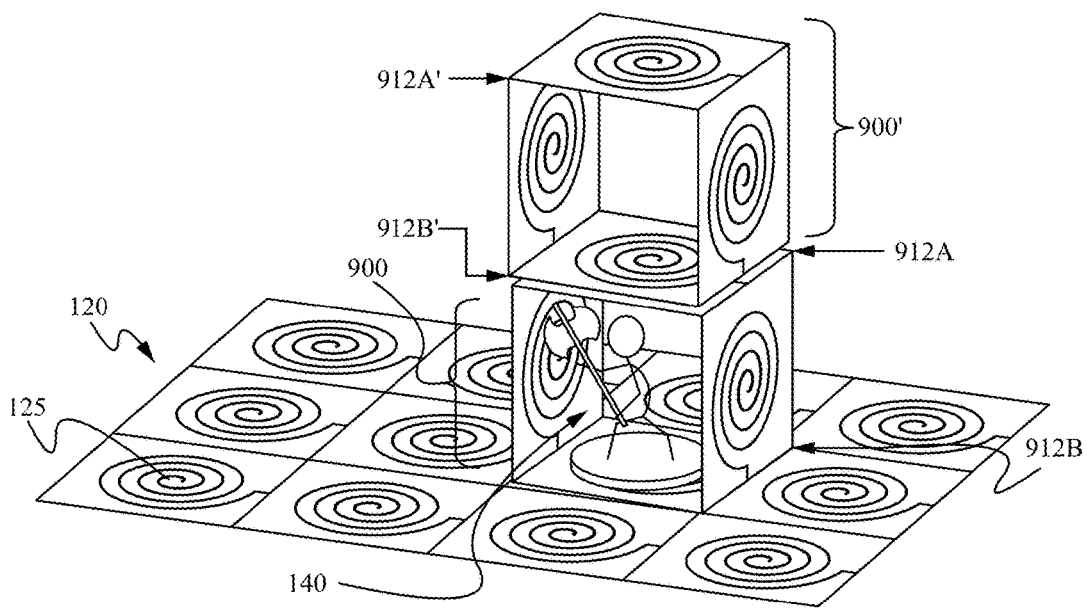
FIG. 12 illustrates a perspective view of two foldable three-dimensional terrain pieces in use with a game board and a game piece in accordance with some embodiments.

The sensors 906 are able to be substantially similar to the sensors 125, 265, 280, 285 described above in relation to FIGS. 2A, 2D, 2G and 2H. In particular, the sensors 906 are configured to sense one or more game pieces 140 when the game pieces 140 are positioned on top of one or more of the sensors 906. Accordingly, the sensors 906 are able to detect when a game piece 140 is on top of the terrain 900 as shown in FIG. 11, or within the terrain 900 as shown in FIG. 12. Further, in some embodiments, the sensors 906 are able to detect when another foldable three-dimensional terrain 900' is positioned on top of one or more of the sensors 906 as shown in FIG. 12. Although FIG. 12 only illustrates a single game piece 140 and single terrain 900' stacked on top of another terrain 900, it is understood that a number of terrains are able to be stacked along with a plurality of game pieces 140 on the various levels 912A, 912B, 912A', 912B'. As a result, the terrain 900 provides the advantage of being able to determine the position of game pieces 140 and/or other terrain 900 even if the game pieces 140 are located within the terrain 900 and therefore occluded or blocked from the view of an overhead camera. In some embodiments, the sensors 906 are positioned on the substrate 902 such that at least one sensor is located at each area on the terrain 900 where a game piece 140 could be placed during game play. Alternatively, the sensors 906 are able to be positioned anywhere on the substrate 902. In some embodiments, the sensors 906 are coupled together such that the sensors 906 are able to communicate with each other and/or a game board 120 sensor 125. Alternatively, one or more of the sensors 906 are isolated from the other sensors 906.

The three-dimensional shape 910 of the terrain 900 comprises one or more levels. Specifically, as shown in FIG. 9C, the three-dimensional shape 910 comprises two levels: a lower level 912B and an upper level 912A. Alternatively, the three-dimensional shape 910 is able to comprise a number of levels. In some embodiments, each level is positioned at a different elevation above the game board 120. Alternatively, one or more of the levels are positioned at the same elevation above the game board 120. In FIG. 9C, the lower level 912B is also an inner level as game pieces 140 positioned on lower level 912B would be positioned within the three-dimensional shape 910 and thus occluded from an overhead view of the game board 120. As described above, the sensors 906 are able to sense a game piece 140 positioned on the lower level 912B even though the game piece 140 is inside the terrain 900. It is understood that the three-dimensional shape 910 of the terrain 900 is able to have a number of levels, shapes and sizes in order to achieve the appearance and feel of the terrain needed for the game.

Figure 10:
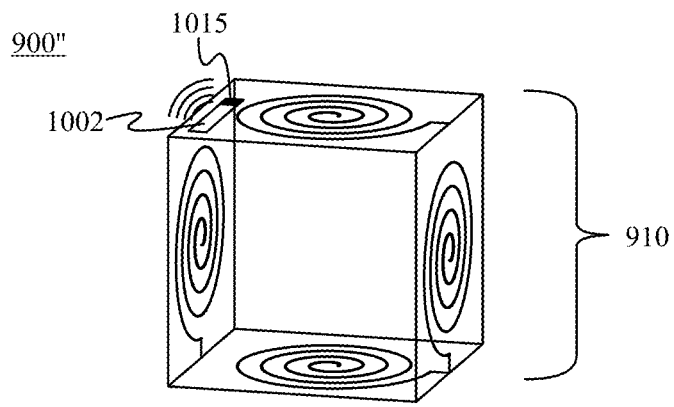
FIG. 10 illustrates a perspective view of an intelligent foldable three-dimensional terrain piece in accordance with some embodiments.

In some embodiments, as shown in FIG. 10, the terrain 900'' comprises one or more RFID tags 1002 and terrain object information including a unique terrain identifier and terrain characteristic values such that the terrain 900'' is intelligent terrain similar to the intelligent game piece objects 600 described above. Like the game piece objects 600, the unique terrain identifier is able to be a globally unique identifier such that each terrain piece 900 can be distinguished from every other terrain piece or other type of game piece. As a result, the intelligent terrain 900'' is able to have properties/characteristics and be uniquely identified by the controller 115 wherein game play is able to be adjusted based on the properties. For example, upon identifying the terrain 900'' using the terrain object information, the controller 115 is able to adjust the game play according to the dimensions of the terrain 900'' represented by character values in the object information of the terrain 900''. Thus, a warrior game piece 140 positioned within or on an intelligent terrain piece 900'' could be registered as unseen by nearby pieces or be given a tactical bonus when fighting with other pieces based on the position within or on the terrain 900''. In some embodiments, the terrain identifier is a unique identifier. In some embodiments, the intelligent terrain comprises an RFID tag for each of the sensors 906 on the terrain 900. The terrain object information is stored in a nonvolatile memory 1015 that is substantially similar to the nonvolatile memory 615 described above. The nonvolatile memory 1015 stores persistent terrain object information, similar to the object information illustrated in FIGS. 7A-7E, such as a unique identifier, a name, dimensions, strength, speed, special powers, light and/or audio processing algorithms and other object information. Again, it will be recognized by one skilled in the art that a wide variety of memory maps are able to be used, so long as minimum functionality includes a unique identifier for the intelligent terrain 900''. In some embodiments, the intelligent terrain 900'' comprises one or more of a processor/controller, an interface element such as a transceiver, an audio processor, audio distribution equipment, a light emitting source, one or more light transmitters, light diffusers, an opto-detector, batteries and power source contacts. It is noted that the connections and operation of these one or more elements of the intelligent terrain 900'' is substantially similar to the description corresponding to the same elements within the intelligent game piece object 600 described above with reference to FIGS. 6A-6C and therefore is not repeated here for the sake of brevity.

Figure 13:
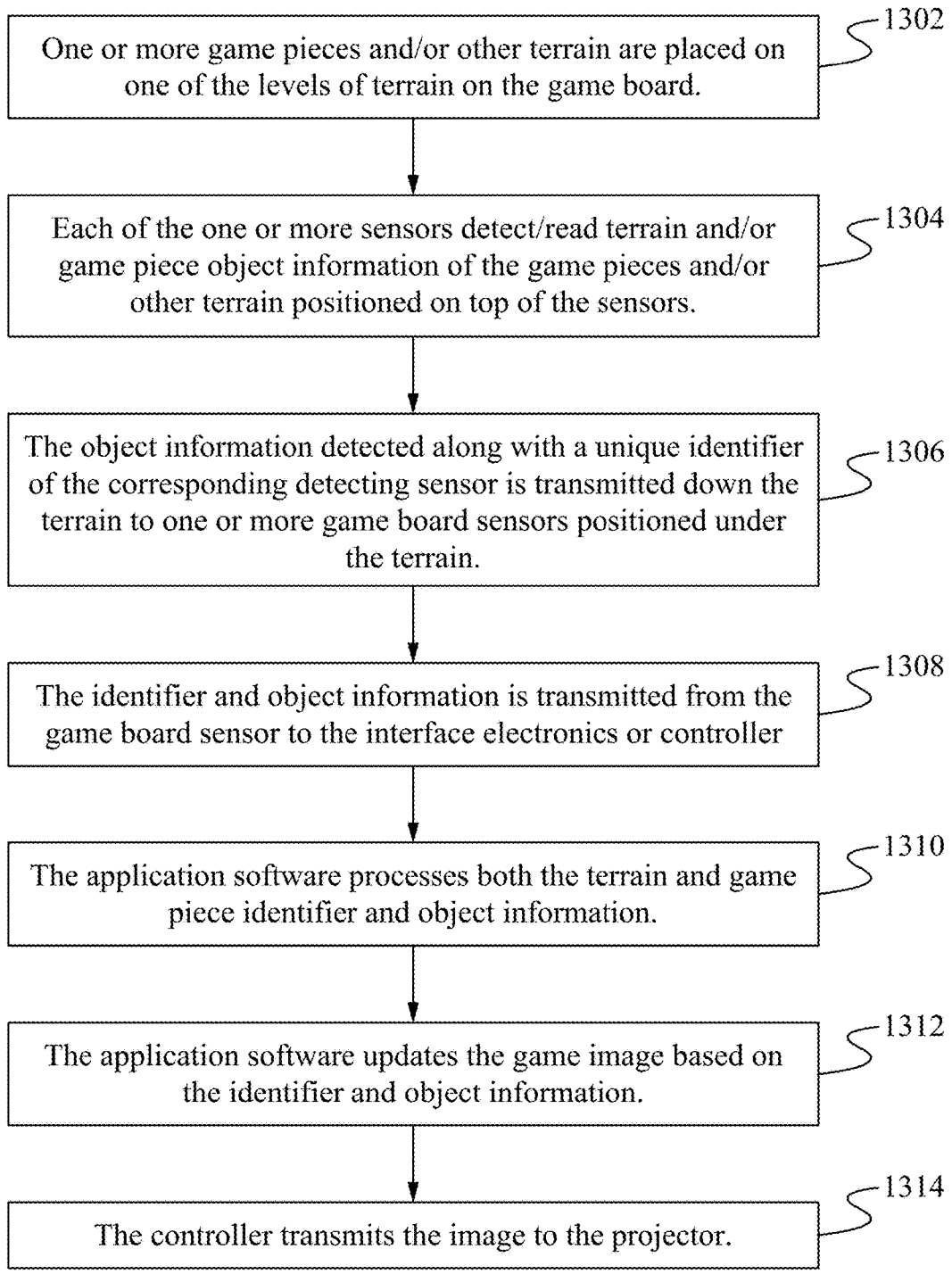
FIG. 13 illustrates a flow chart of detecting a game piece on a foldable three-dimensional terrain piece in accordance with some embodiments.

The operation of a foldable three-dimensional terrain 900 will now be discussed in reference to the flow chart illustrated in FIG. 13. It is understood that the operation of the three-dimensional terrain 900 is substantially similar to the operation of the intelligent game pieces 600 described above with regard to FIGS. 8A-8D, the majority of which is not repeated here for the sake of brevity. In operation, one or more game pieces 140 and/or other terrain 900' are placed on one of the levels 912A, 912B of terrain 900 on the game board 120 at the step 1302. Each of the one or more sensors 906 detect/read terrain and/or game piece object information of the game pieces 140 and/or other terrain 900' positioned on top of the sensors 906 at the step 1304. The object information detected along with a unique identifier of the corresponding detecting sensor is transmitted down the terrain 900 to one or more game board sensors 125 positioned under the terrain 900 at the step 1306. In some embodiments, if one or more of the terrain is intelligent terrain 900", the terrain object information is also transmitted to the corresponding game board sensor 125. Alternatively, the terrain object information is transmitted directly to the controller with a transceiver or other transmitting device. In some embodiments, if one or more of the terrains 900, 900', 900" are stacked, the upper terrain 900' transmits the identifier and object information to the immediately lower terrain 900' until a bottom terrain 900 is reached that is able to transmit the identifier and object information to the corresponding game board sensor 125. In this manner, regardless of the height of the stack of terrain 900, 900', the identifiers and object information is able to be transmitted to the game board sensors 125 below. In a similar manner, the controller is able to adjust the characteristic values of the object information of the terrain wherein the only difference is that the adjustment information is transferred in the opposite direction from the controller to the board sensors to the terrain pieces. The identifier and object information is transmitted from the game board sensor 125 to the interface electronics or controller at step 1308. The application software processes the terrain and game piece identifier and object information at the step 1310. The application software updates the game image based on the terrain and game piece identifier and object information at the step 1312. The controller transmits the image to the projector at the step 1314. As a result, the game play and image are able to be adjusted based on the object information received by the terrain 900, 900'. The core game features of an intelligent game system are performed in the application software. Such features include producing graphics and sound, scoring points for game play, and executing the game in accordance with the game rules. In some embodiments, executing the game includes adjusting the characteristic values of the object information of the terrain 900, 900' based on game state/game event information with the controller.

In operation, a system for putting intelligence into board and tabletop games including miniatures comprises a game play surface including sensors capable of identifying the location and unique identity of game pieces and terrain pieces on the game play surface. Additionally, the terrain pieces include sensors that are also capable of identifying the location and unique identity of game pieces and/or other terrain pieces on and/or within the surface of the terrain pieces. The terrain pieces are able to transfer this location and unique identity to a sensor positioned beneath them whether that sensor is a part of another terrain piece or the game board. Each sensor in the game play surface corresponds to a portion of an image to be displayed by an overhead projector onto the game play surface. The image to be displayed is adjusted based on the sensed position of the game and/or terrain pieces. Interface electronics coupled to the game play surface read the sensors of the game play surface including information transferred to the game play surface by the terrain pieces. Each sensor reading comprises an identifier of the sensor and at least an identifier of a game piece and/or terrain piece on the sensor, if a piece is present on the sensor. For each sensor in the game play surface, the interface electronics pass the sensor identifier and the identifier of any game and/or terrain piece on the sensor, to the controller. The controller comprises a computer readable media programmed with a game application software. The game application software receives the sensor identifier, game piece identifier and/or terrain piece identifier for each sensor and utilizes the information to maintain scoring of the game and provide enhanced game play features including adjusting the characteristic values of the game piece and/or terrain piece object information based on the game state/game event information.

The controller further comprises an interface for transmitting the game play image to an overhead projector such as a DLP® or LCD projector. In some embodiments, the interface of the controller is able to transmit game state, game event and/or object information to a remote storage device such as a central server. The controller further comprises an interface for transmitting sound to a sound system or speakers connected to the controller. Enhanced game play features include graphics projected onto the game play surface and sounds transmitted to the sound system or speakers to enhance the game playing experience. Game logic includes scoring, enabled by the controller's awareness of the location and identification of game pieces on the game play surface. Information gathered from the sensors comprising game state information or game play statistics, game event information and game piece information are able to be stored to a computer readable media within the controller, the game or terrain pieces, one or more servers, or a removable computer readable media, to enable users to resume a game in progress at a later time or on a different system and to maintain statistics of game play and statistics for individual game pieces.

Multi-Dimensional Game System

Figure 14:
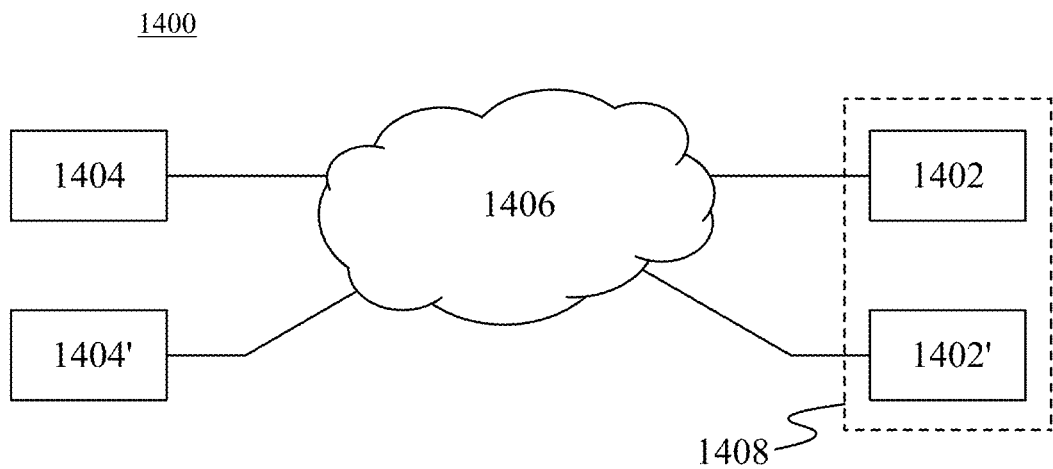
FIG. 14 illustrates a multi-dimensional game system in accordance with some embodiments.

FIG. 14 illustrates a high level diagram of a multi-dimensional game and game system 1400 in accordance with some embodiments. The multi-dimensional game system 1400 is able to be substantially similar to the Intelligent Game System 100 described above except for the differences described herein. Specifically, as shown in FIG. 14, the multi-dimensional game system 1400 comprises a virtual component 1402 and a physical component 1404 in communication with each other over a network 1406. In some embodiments, the network 1406 is a wireless network comprising one or more nodes (not shown). Alternatively, the network is a wired network or any combination of a wired network and a wireless network. The physical component 1404 and the virtual component 1402 are able to communicate with each other through the network 1406. In some embodiments, one or more additional physical components 1404' are in communication with the network 1406 such that the additional physical components 1404' are also in communication with the virtual component 1402. The additional physical components 1404' couple to the network 1406 at different nodes of the network 1406 (not shown). For example, two or more players in different geographical locations are still able to play the game 1400 together by each having the required physical components 1404, 1404' and coupling to the network 1406 and thereby the virtual component 1402 at the closest node within the network 1406 to their location. Alternatively, at least one of the additional physical components 1404' coupled to the network 1406 at the same node as the physical component 1404. In some embodiments, one or more additional virtual components 1402' are also in communication with the network 1406 such that the additional physical components 1404' are in communication with corresponding additional virtual components 1402'. For example, when multiple users are playing individual games 1400 over the same network. Alternatively, each physical component 1404, 1404' is able to communicate with every virtual component 1402, 1402'. For example, if a user from one location wishes to join another user's game the user is able to connect to the other user's virtual component 1402'. Also for example, a user from one location is able to invite another user to join their game such that the other user is able to connect to the user's virtual component 1402. In some embodiments, the virtual components 1402, 1402' are associated with each other such that together the virtual components 1402, 1402' form a seamless global virtual component 1408. For example, although users are able to establish individual virtual components 1402, 1402', the components are all incorporated in order to form a single global virtual component 1408 that is able to be accessible to all the users.

Physical Components

Figure 15B:
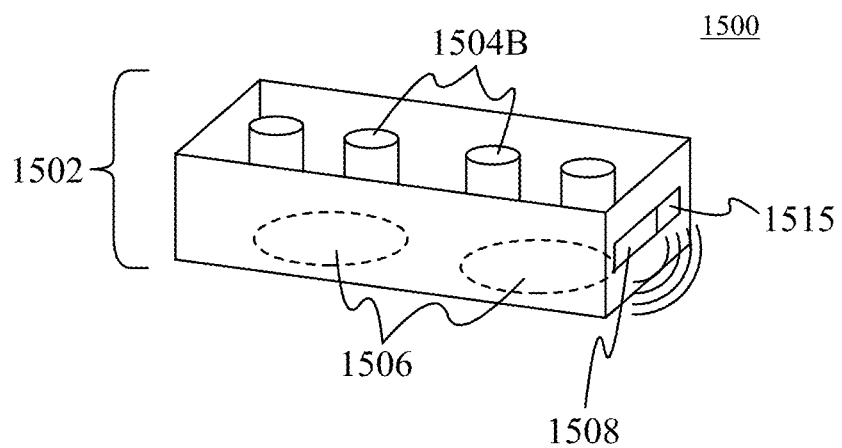
FIG. 15B illustrates a bottom perspective view of a block element in accordance with some embodiments.

In some embodiments, each physical component 1404, 1404' comprises the one or more sensors 125 coupled together as a part of a game board 120 as shown in FIGS. 1A-G. Also in some embodiments, one or more of the physical components 1404, 1404' further comprise one or more of the display device 99, the input/output (I/O) device 98, the interface electronics 115, a controller 110 having a processor (not shown), computer readable media 111, removable computer readable media 117, a projector 130, speakers 112, 113, and 114, interconnection cables 160 and 170, intelligent games piece objects 140 and 142, virtual game piece objects 144, and terrain 900 as shown in FIGS. 1A-G, 9A-9C, 11 and 12. Moreover, in some embodiments, one or more of the physical components 1404, 1404' further comprise one or more block elements 1500 as shown in FIGS. 15A and 15B. As used herein, the terms blocks or block elements refer to objects of any shape and composition as are well known in the art. In some embodiments, the display device 99 comprises a computer monitor. Alternatively, the display devices are able to comprise any combination of a television, computer monitor, cell phone, or other device capable of displaying video. In some embodiments, the I/O device 98 is able to comprise any combination of keyboards, microphones, cameras, mouses, monitors, displays, printers, modems, touchscreens, button interfaces and other devices. The display devices 99 are able to be in communication with the controller 110 and the I/O device 98 in order to receive video signals from the controller 110 to be displayed and to transmit user control signals received from the I/O device 98 to the controller 110 for processing by the processor. One skilled in the art will understand that the physical components 1404, 1404' are able to comprise any number of the above elements, depending upon such variables as the actual game being played and the number of game players. One skilled in the art will also recognize that one or more of the physical components 1404, 1404' are able to be incorporated into a single device.

Figure 16:
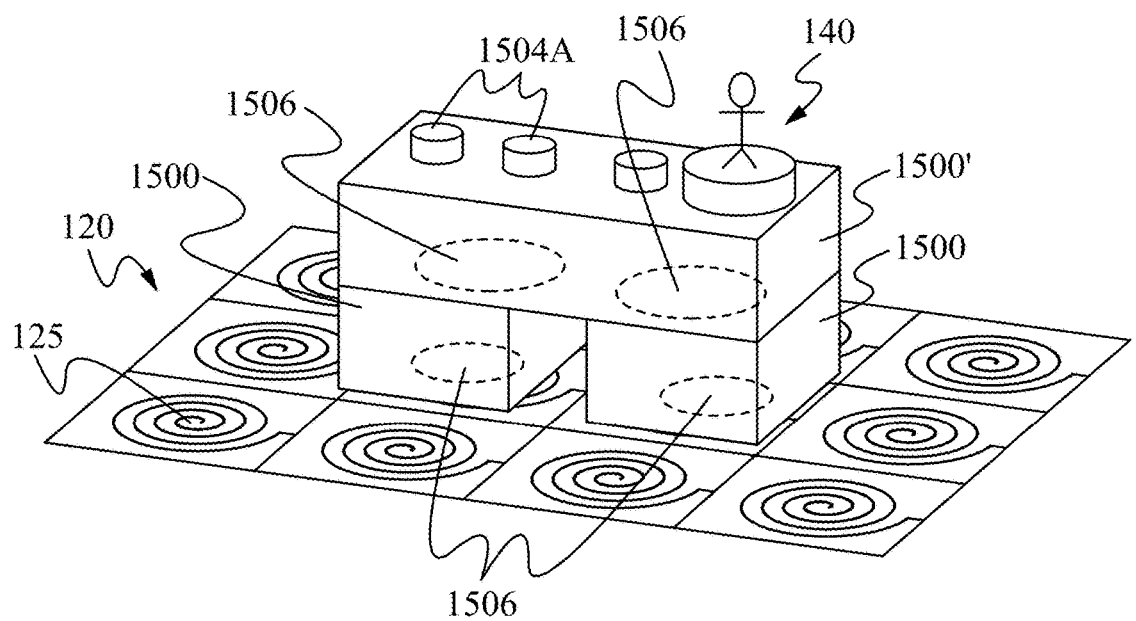
FIG. 16 illustrates a perspective view of a plurality of block elements coupled together in use with a game board and game piece in accordance with some embodiments.

FIGS. 15A and 15B illustrate a block element 1500 in accordance with some embodiments. The block element 1500 comprises a block body 1502, one or more coupling elements 1504A, 1504B and one or more sensors 1506. In some embodiments, the block elements 1500 comprise plastic. Alternatively, the block elements 1500 are able to comprise any combination of plastic, cardboard, paper, metal, glass, wood, or other material capable of forming a stable body. As shown in FIGS. 15A and 15B the block body 1502 is a rectangular prism. In some embodiments, the block elements 1500 are shaped substantially similar to LEGO® blocks as are well known in the art. Alternatively, the block body 1502 is able to be any shape and size. The one or more coupling elements comprise cylindrical studs 1504A and inwardly directed spaced ribs 1504B. The dimensions of the cylindrical studs 1504A and ribs 1504B are configured such that the studs 1504A are able to be inserted in or between the ribs 1504B and releasably held in place with a friction fit as shown in FIG. 16. Alternatively, the one or more coupling elements are able to comprise snap-fit elements, Velcro®, adhesives, magnets or other fasteners as are well known in the art. In some embodiments, the game board 120 including the one or more sensors 125 further comprises one or more coupling elements 1504A, 1504B such that the block elements 1500 are able to couple to the game board 120. Similarly, in some embodiments the intelligent games piece objects 140, 142 and or terrain 900 comprise one or more coupling elements 1504A, 1504B such that the block elements 1500, game board, intelligent game piece objects 140, 142 and terrain 900 are able to couple to each other. As a result, the block elements 1500 have the advantage of allowing a player of the multi-dimensional game to build any desired or required object simply by coupling a plurality of block elements 1500 together with the coupling elements 1504A, 1504B to form the desired or required object. For example, a user/player is able to construct a ship using a plurality of the block elements 1500 coupled together. Then, the user/player is able to utilize the ship during game play by putting game piece objects 140, terrain 900, and or other block elements 1500 within the ship and traverse water obstacles present on the game board 120.

The one or more sensors 1506 are able to be embedded within the body 1502 block element 1500. Alternatively, the sensors 1506 are able to be positioned anywhere on the block elements 1500. The sensors 1506 are able to be substantially similar to the sensors 125, 265, 280, 285, 906 described above in relation to FIGS. 2A, 2D, 2G, 2H, 9A-9C and 10-12. In particular, the sensors 1506 are configured to sense one or more game pieces 140 or terrain 900 when the game pieces 140 or terrain 900 are positioned on top of or proximate to one or more of the sensors 1506. Accordingly, the sensors 1506 are able to detect when a game piece 140 or terrain piece 900 is on top of the block elements 1500 as shown in FIG. 16. Further, in some embodiments, the sensors 1506 are able to detect when another block element 1500' is positioned on top of one or more of the sensors 1506 as shown in FIG. 16. Although FIG. 16 only illustrates a single game piece 140 and single block element 1500' stacked on or coupled to the top of other block elements 1500, it is understood that a number of game pieces 140, block elements 1500' or terrain 900 are able to be coupled to or stacked on the block elements 1500. As a result, the block elements 1500 provide the advantage of being able to determine the position of game pieces 140, terrain 900 and or other block elements even if the game pieces 140, terrain 900 or other block elements 1500 are occluded or blocked from the view of an overhead camera. This advantage is provided individually, or when the block elements 1500 are coupled together to form an object for use during game play. In some embodiments, the sensors 1506 are positioned in the block element 1500 such that at least one sensor is located at each area on the block element 1500 where a game piece 140, terrain 900, and or other block element 1500 could be placed during game play. Alternatively, the sensors 1506 are able to be positioned anywhere on the block elements 1500. In some embodiments, the sensors 1506 are coupled together such that the sensors 1506 are able to communicate with each other and/or a game board 120 sensor 125. Alternatively, one or more of the sensors 1506 are isolated from the other sensors 1506.

In some embodiments, the block element 1500 further comprises one or more RFID tags 1508 and block object information including a block identifier and characteristic values such that the block element 1500 is an intelligent block element similar to the intelligent game piece objects 600 and intelligent terrain 900" described above. As a result, the intelligent block element 1500 is able to have properties/characteristics and be uniquely identified by the controller 110 wherein game play is able to be adjusted based on the properties/characteristics. For example, upon identifying the block element 1500 using the block object information, the controller 110 is able to adjust the game play according to the dimensions of the block body 1502, which correspond to the identified block element 1500. Further, in some embodiments, the controller 110 is able to adjust the properties/characteristic values of a block 1500 based upon game event/game state information derived from the game play. In some embodiments, the block identifier is able to be a globally unique block identifier such that each block 1500 is able to be distinguished from other blocks, terrain, or game pieces based on the identifier of the block 1500. In some embodiments, the block element 1500 comprises an RFID tag 1508 for each of the sensors 1506 on the block element 1500. The block object information is stored in a nonvolatile memory 1515 that is substantially similar to the nonvolatile memory 1015, 615 described above. The nonvolatile memory 1515 stores persistent block object information, similar to the object information illustrated in FIGS. 7A-7E, such as a unique identifier and characteristics such as dimensions including a shape and size, a name, speed, strength, special powers, light and/or audio processing algorithms and other object information. Again, it will be recognized by one skilled in the art that a wide variety of memory maps are able to be used, so long as minimum functionality includes a unique identifier for the block element 1500. In some embodiments, the block elements 1500 comprise one or more of a processor/controller, an interface such as a transceiver, an audio processor, audio distribution equipment, a light emitting source, one or more light transmitters, light diffusers, an opto-detector, batteries and power source contacts. It is noted that the connections and operation of these one or more elements of the block element 1500 is substantially similar to the description corresponding to the same elements within the intelligent game piece object 600 described above with reference to FIGS. 6A-6C and therefore is not repeated here for the sake of brevity.

In operation, the physical components 1404, 1404' operate in substantially the same manner as described above with regard to the intelligent game piece objects 140, 142 and terrain 900 except for the differences described herein. Specifically, the computer readable media 111 and/or removable computer readable media 117 inserted within the controller 110 is further programmed with instructions to respond to changes in the block object information of a block element 1500, sensed by a sensor 125 within the game board 120. In some embodiments, game state/game event information is able to be transferred to block elements 1500 as block object information. One skilled in the art will recognize that programmed instructions comprise a software application which contains the logic, game rules, scoring, sound, graphics, and other attributes of game play for playing an interactive multi-dimensional game and adjusting the object information as disclosed herein. The application software processes the block object information received from the interface electronics 115 and transmits image information of a changing image to the projector 130. In some embodiments, the block elements 1500 transmit their block object information to the controller 110 via a wireless router 150 or directly to the controller 110 equipped with a wireless interface 116. In some embodiments, the controller 110 is able to process the block object information in order to determine the position and dimensions of the block elements 1500 for transmission to the projector 130 and/or display device 99.

Figure 17:
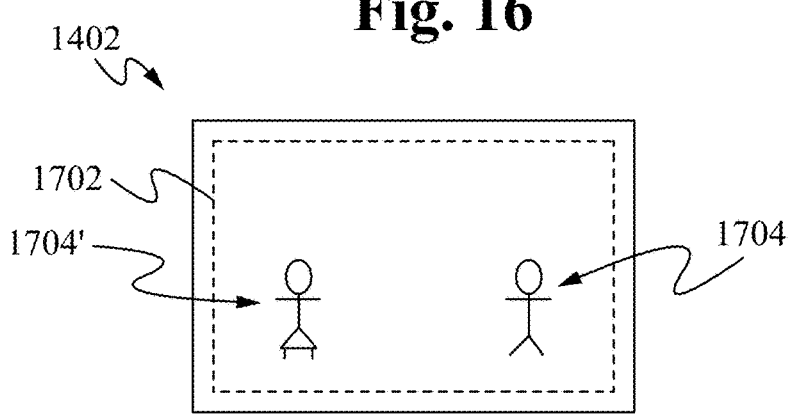
FIG. 17 illustrates a representation of a virtual component in accordance with some embodiments.

Virtual Components FIG. 17 illustrates a virtual component 1402, 1402' according to some embodiments. Each virtual component 1402, 1402' comprises at least one virtual environment 1702. In some embodiments, the virtual environment 1702 is a virtual three-dimensional environment that allows a user to virtually travel to different locations within the virtual environment 1702 and interact with virtual objects within the virtual environment 1702 as if the user was actually in the environment. For example, the virtual environment 1702 is able to be similar to a three-dimensional online computer game such as Second Life® where players utilize avatars to explore and interact with a virtual three-dimensional world. Alternatively, the virtual environment 1702 is a non-three-dimensional game such that the user interacts with images presented, but does not travel within a virtual three-dimensional space. For example, the virtual environment 1702 is able to be similar to a trivia game such as Jeopardy® where players answer questions proposed in the virtual environment 1702 by inputting answers to the questions. Alternatively, the virtual environment 1702 is able to comprise a website or any number of other virtual representations as are well known in the art. In some embodiments, the virtual environment 1702 incorporates a reward system that rewards users for completing tasks using the virtual component 1402, 1402' and or physical component 1404, 1404'. For example, the virtual environment 1702 could challenge a user to build a desired object with one or more block elements 1500 using the physical component 1404, 1404' with a reward associated with the challenge. Specifically, upon completion of the desired object, the sensors 125 of the physical component 1404, 1404' are able to transfer data representing an image of the object created to the virtual component 1402, 1402'. The virtual component 1402, 1402' is then able to determining if the image matches the desired object and reward the user with virtual money that is able to be used to unlock items or other elements within the virtual environment 1702. In some embodiments, the virtual money is able to be used to purchase items in the real world.

In some embodiments, the virtual environment 1702 further comprises one or more avatars 1704. The avatars 1704 are able to be virtual representations of users that are interacting with the virtual environment 1702. Alternatively, one or more of the avatars 1704 are able to be unassociated avatars such that the avatars 1704 do not represent users, but are rather a part of the virtual environment of the virtual component 1402, 1402'. In some embodiments, the avatars 1704 comprise an image of the user controlling the avatar 1704. Alternatively, the avatars 1704 are able to comprise any image or images. In some embodiments, the avatar image is able to be selected or created by the user controlling the avatar 1704. In some embodiments, the avatars 1704 are represented in the virtual environment 1702 from a third person perspective. Alternatively, the avatars 1704 are represented from a first person or other perspective as are well known in the art. In some embodiments, the avatars 1704 correspond with one or more of the intelligent game board pieces 140, terrain 900 and/or block elements 1500 of the physical component 1404. In such embodiments, when a user interacts with the avatar 1704 it is able to be reflected in the corresponding physical component 1404 through light, sound, movement or other actions. Similarly, in such embodiments, when a user interacts with a physical component 1404 any corresponding avatars 1704 are affected in the virtual environment 1702. For example, if an intelligent game piece object 140 is moved into water on the game board 120, the corresponding avatar 1704 is able to appear wet within the virtual environment 1702. Alternatively, the avatars 1704 are able to not correspond with the intelligent game board pieces 140, terrain 900 and/or block elements 1500 of the physical component 1404. In such embodiments, when a user interacts with the avatar 1704 it is able to be reflected in adjustments to the rules or game play of the physical component 1404 and/or in adjustments to the avatar 1704 itself or the virtual environment 1702. For example, if a user buys shoes from a solely virtual avatar 1704, the rules of the physical component 1404 are able to be adjusted such that the user's game piece is able to move farther per turn. Similarly, in such embodiments, when a user interacts with a physical component 1404 any solely virtual avatars 1704 are able to be affected in the virtual environment 1702. For example, if an intelligent game piece object 140 defeats another game piece object 140 representing a monster in the physical component 1404 the solely virtual avatars 1704 are able to reward the user in the virtual environment 1702 with money. In some embodiments, the virtual environment 1702 further comprises one or more additional avatars 1704'. The additional avatars 1704' are able to be virtual representations of users of the additional physical components 1404' that are interacting with the virtual environment 1702. For example, when two or more physical components 1404, 1404' are coupled to the same virtual component 1402, 1402' as described above, the users of the physical components 1404, 1404' are able to each have an avatar 1704, 1704' that is represented within the virtual environment 1702. As a result, the users of the avatar 1704 and additional avatars 1704' are able to interact with each other and the environment itself within the virtual environment 1702 via the respective avatars 1704, 1704'. Similar to above, in some embodiments, the additional avatars 1704' are able to have corresponding physical components 1404' wherein interactions with the associated avatar or components affect each other.

Figure 18:
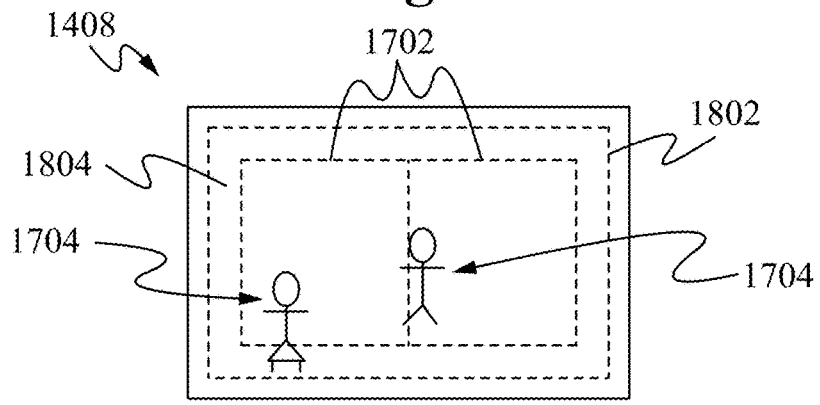
FIG. 18 illustrates a representation of a global virtual component in accordance with some embodiments.

FIG. 18 illustrates a global virtual component 1408 comprising each of the virtual components 1402, 1402' according to some embodiments. Alternatively, the global virtual component 1408 is only made up of a portion of the number of virtual components 1402, 1402'. The global virtual component 1408 comprises a global virtual environment 1802 including each of the virtual environments 1702 that correspond to the virtual components 1402, 1402'. As a result, the global virtual environment 1802 encompasses each of the virtual environments 1702 into a single seamless larger environment. Alternatively, the global virtual environment 1802 is only made up of a portion of the virtual environments 1702. In some embodiments, the global virtual environment 1802 further comprises one or more of the avatars 1704 and additional avatars 1704'. The avatars 1704 and additional avatars 1704' are able to interact and navigate from one virtual environment 1702 to another within the global virtual environment 1802 as if the virtual environments 1702 were a single environment. In some embodiments, the global virtual environment 1802 comprises additional virtual environment 1804 that is independent of the environment that comprises the virtual environment 1702.

In operation, the virtual environment 1702 and/or global virtual environment 1802 are generated by the controller 110. Specifically, the controller 110 is configured to read the computer readable media 111 and/or removable computer readable media 117 accessible to the controller 110 and generate the virtual environments 1702, 1802 based on the instructions found within the computer readable media 111, 117. Alternatively, any other method of generating the virtual environment as are well known in the art is contemplated. The virtual environment 1702, 1802 is then able to be transmitted from the controller 110 to the display device 99 which displays the virtual environment 1702, 1802 to a user on the display device 99. In some embodiments, the controller 110 further reads audio data from the computer readable media 111, 117 associated with the virtual environment 1702, 1802 and transmits the audio data to one or more of the speakers 112, 113, 114 for playing the audio to the user. While the virtual environment 1702, 1802 is being generated the controller 110 also receives data from the I/O devices 98 and adjusts the virtual environment 1702, 1802 based on the received I/O data. For example, as a user utilizes the I/O devices 98, the controller 110 causes the avatar 1704, 1704' to move or interact based on data received such that the user is able to interact with the virtual environment 1702, 1802. It should be noted that it is understood by one skilled in the art that any number of controllers 110, computer readable media 111, 117, display devices 99, I/O devices 98, speakers, 112, 113, 114 and other devices are able to be used to generate and control the virtual environment 1702, 1802.

In embodiments including multiple users and avatars 1704, 1704', the controller 110 dynamically adjusts the virtual environment 1702, 1802 based on part or all of the I/O data received from the various I/O devices 98 such as object information, game state/event information and/or other types of information. The controller 110 further is able to transmit virtual environment data from the virtual environment 1702, 1802 to the projector 130 for projecting images based on the status within virtual environment 1702, 1802 onto the game board 120 and other parts of the physical component 1404, 1404'. For example, if the virtual environment 1702, 1802 currently comprises a jungle with animals, the user's avatar 1704 and additional avatars 1704' from remote users, the projector 130 is able to project jungle images on the physical components 1404, 1404' including the avatars 1704, 1704' themselves. The position where the avatars 1704, 1704' and/or jungle images are projected on the physical component 1404, 1404' is able to correspond to their position within the virtual environment 1702, 1802.

In some embodiments, the controller 110 is configured to receive sensor data from the physical component 1404, 1404' such as sensor data including object information, terrain object information and block object information from the game board 120, intelligent game board pieces 140, terrain 900 and/or block elements 1500. The controller 110 is able to dynamically adjust the virtual environment 1702, 1802 based on the received sensor data. For example, if a sensor detects that a user moved a game piece object 140 onto a "portal" on the game board 120, the sensor data sent to the controller 110 is able to be used to adjust the virtual environment 1702, 1802 such that the corresponding avatar 1704 is transported to a different portion of the virtual environment 1702, 1802. As another example, if a user builds an object using block elements 1500, the controller 110 is able to receive the sensor information about the object and adjust the virtual environment 1702, 1802 by adding a virtual representation of the object to the virtual environment. In some embodiments, the controller 110 is configured to send virtual environment data to the physical components 1404, 1404'. In such embodiments, the controller is thereby able to adjust the characteristic values of the object information of the physical components 1404, 1404' based on user interactions or other changes in the virtual environment 1702, 1802. For example, the controller 110 is able to cause an intelligent game piece object 140 to light up, move, speak, gain strength, gain speed, or otherwise change in celebration based on completing a challenge within the virtual environment 1702, 1802. In this manner, the multi-dimensional game system provides the advantage of allowing a player to build physical objects using the building block elements 1500 and then use the physically built objects in the virtual world. As yet another example, a player could create a plane in the physical component that is then transferred to the virtual world and allows the player's avatar to traverse to the other side of a virtual canyon that was blocking a path in the virtual environment. Thus, a multi-dimensional experience is created that involves the three-dimensional world of the game board and the fourth dimensional experience of the virtual environment.

In some embodiments, the controller 110 is also able to relay I/O data, sensor data and/or other data over the network 1406 between physical components 1401 and additional physical components 1404'. For example, when a remote user moves a game piece 140 on the game board 120 of their additional physical component 1404', the controller 110 is able to receive the sensed movement and relay the new position of the game piece 140 to the projector 130 of the local physical component 1404, which then moves a projected image of the game piece 140 on the local game board to reflect the new position. In this manner, the multi-dimensional game system provides the advantage of allowing two remote players to interact on a physical game board despite not being in the same geographical location. Specifically, the positions of the remote player's pieces are able to be shown and moved on the game board by a projector projecting and moving images that represent the remote player's pieces on the game board as if the remote player were moving the pieces on the local game board.

Methods of Playing the Multi-Dimensional Board Game System

Figure 19:
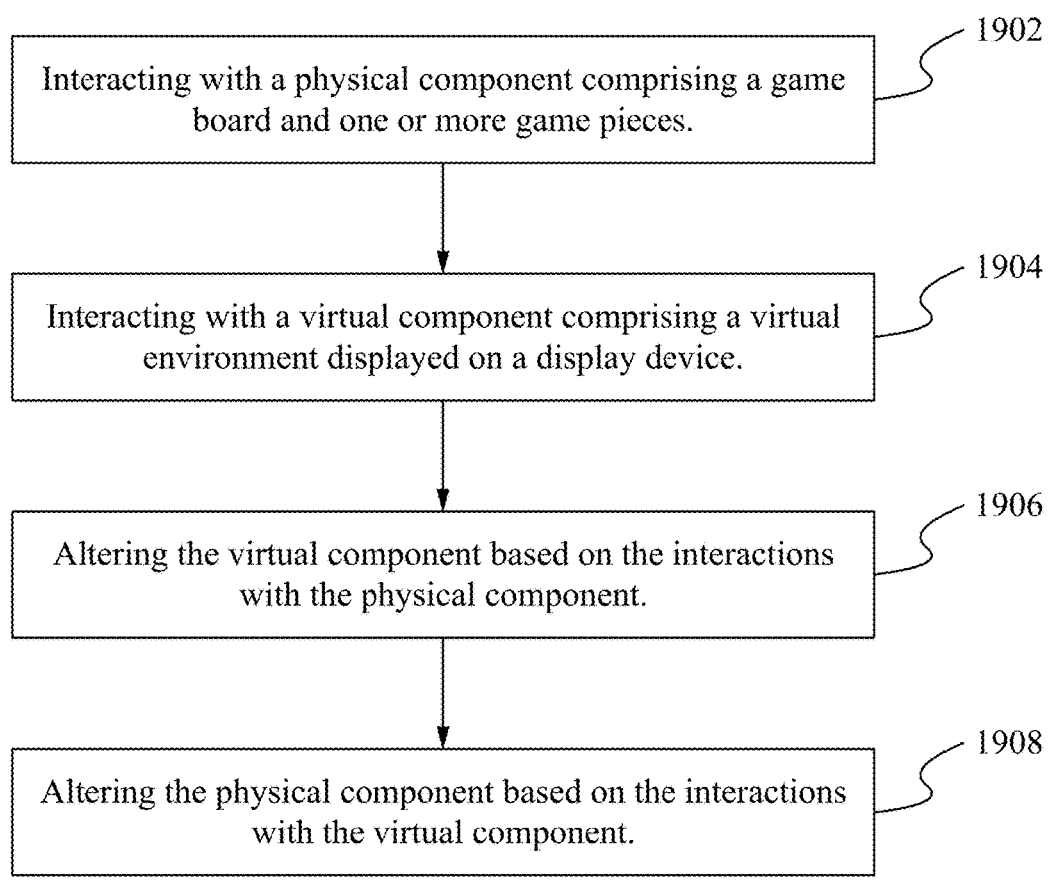
FIG. 19 illustrates a flow chart of playing the multi-dimensional game in accordance with some embodiments.

A method of playing the multi-dimensional board game according to some embodiments will now be discussed in reference to the flow chart illustrated in FIG. 19. It is understood that the methods of playing the multi-dimensional board game are substantially similar to the method of playing the intelligent board game described above with the additions included below. A user interacts with a physical component 1404 comprising a game board 120 and one or more game pieces 140 at the step 1902. A user interacts with a virtual component 1402 comprising a virtual environment 1702 displayed on a display device 99 at the step 1904. The virtual component 1402 is altered by the controller 110 based on the interactions with the physical component 1404 at the step 1906. The physical component 1404 is altered by the controller 110 based on the interactions with the virtual component 1402 at the step 1908. As a result, a user is able to physically interact with a game board 120 and game pieces 140 such that they are able to complete challenges in the virtual environment 1702. Further, within the same game the user is able to virtually interact with the virtual environment 1702 and such interactions are able to be reflected in the physical game play of the physical component. For example, completing tasks within the virtual environment 1702 with an avatar 1704 is able to increase characteristics such as strength, which is then reflected in the corresponding game piece 140 while using the physical components 1404. Thus, the multi-dimension game system is able to provide a multi-dimensional experience to the players.

In some embodiments, the interaction with the physical component 1404 comprises completing one or more virtual game events in the virtual environment 1702 by interacting with the game board 120 and one or more game pieces 140. In some embodiments, the virtual environment 1702 comprises an avatar 1704 controlled by the user. In some embodiments, the avatar 1704 corresponds to at least one corresponding game piece 140, terrain piece 900, block element 1500, group of block elements or other object used within the game. Alternatively, one or more of the avatars 1704 are able to not have physical representations among the physical components 1404. In some embodiments, the virtual environment 1702 comprises one or more additional avatars 1704' that are controlled by one or more additional users. In some embodiments, the alterations to the virtual component 1402 are based on the actions of the avatar 1704 within the virtual environment 1702 independent of the interactions of the user with the physical component 1404. In some embodiments, the alterations of the virtual environment 1702 are changes that affect the avatar 1704 and are based on user interactions with the corresponding game piece of the physical component. In some embodiments, alterations of the physical component 1404 are changes to the corresponding game piece based on user interactions with the avatar 1704 within the virtual environment 1702. Alternatively, alterations of the physical component 1404 are changes to the rules or other parts of the physical component 1404 based on user interactions with the avatar 1704 and/or the virtual environment 1702. In some embodiments, the additional users connect to the virtual environment 1702 from a different location than the user. Alternatively, one or more of the additional users are able to share the same physical components 1404 (e.g. game board) and/or connect to the virtual environment 1702 from the same location. In some embodiments, alterations to the physical component 1404 comprise projecting one or more images onto the game board 120 with a projection device, wherein at least one of the images correspond to the actions and or position of the avatar 1704 within the virtual environment 1702. In some embodiments, at least one of the images correspond to the actions and or position of at least one of the additional avatars 1704'. In some embodiments, alterations to the physical component 1404 comprise coupling one of more game blocks of the physical component 1404 to each other thereby forming one or more objects. In some embodiments, alterations to the virtual component 1402 comprise generating one or more virtual representations of at least one of the objects within the virtual environment 1702 such that the user is able to interact with the virtual representations in the virtual environment 1702.

Figure 20:
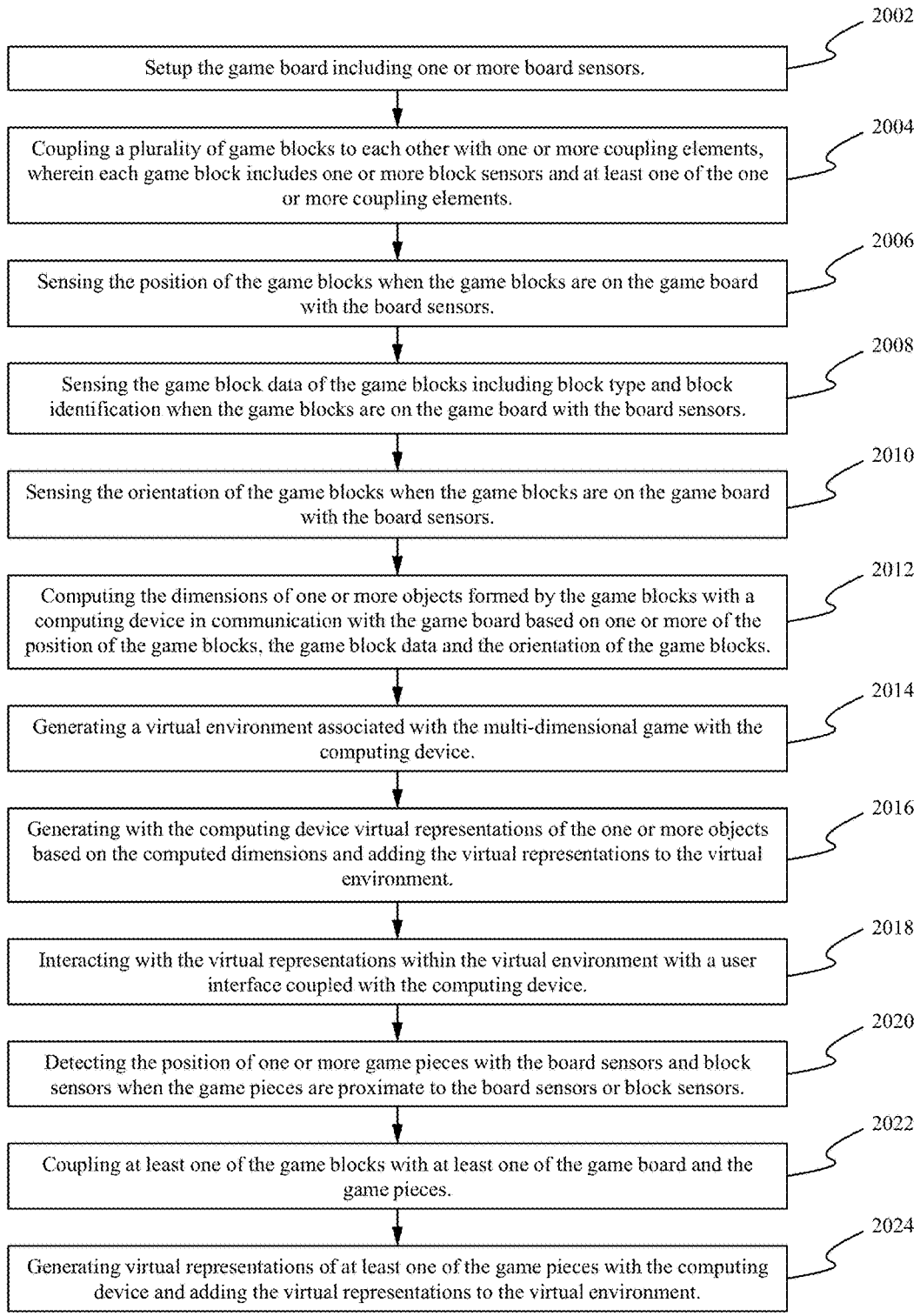
FIG. 20 illustrates a flow chart of playing the multi-dimensional game in accordance with some embodiments.

A method of playing the multi-dimensional board game according to some embodiments will now be discussed in reference to the flow chart illustrated in FIG. 20. A user sets up the game board 120 including one or more board sensors at the step 2002. A user couples a plurality of game blocks 1500 to each other with one or more coupling elements 1504A, 1504B, wherein each game block 1500 includes one or more block sensors 1506 and at least one of the one or more coupling elements 1504A, 1504B at the step 2004. The board sensors 125 sense the position of the game blocks 1500 when the game blocks 1500 are on the game board 120 at the step 2006. The board sensors 125 sense the block data of the game blocks 1500 including block type/characteristics and block identification when the game blocks 1500 are on the game board 120 at the step 2008. The board sensors 125 sense the orientation of the game blocks 1500 when the game blocks 1500 are on the game board 120 at the step 2010. In some embodiments, the position of the game blocks 1500 sensed by the board sensors 125 includes an elevation of the game blocks 1500 above the game board 120. A computing device in communication with the game board 120 computes the dimensions of one or more objects formed by the game blocks 1500 based on one or more of the position of the game blocks 1500, the game block data and the orientation of the game blocks 1500 at the step 2012. In some embodiments, at least one of the one or more objects comprises a plurality of the game blocks 1500 coupled together. The computing device generates a virtual environment 1702 associated with the multi-dimensional game at the step 2014. The computing device generates virtual representations of the one or more objects based on the computed dimensions and adding the virtual representations to the virtual environment 1702 at the step 2016. A user interacts with the virtual representations within the virtual environment 1702 using a user interface 98 coupled with the computing device at the step 2018. The board sensors 125 and/or block sensors 1506 detect the position of one or more game pieces 140 when the game pieces 140 are proximate to the board sensors 125 or block sensors 1506 at the step 2020. A user couples at least one of the game blocks 1500 with at least one of the game board 120 and the game pieces 140 at the step 2022. The computing device generates virtual representations of at least one of the game pieces 140 and adds the virtual representations to the virtual environment 1702 at the step 2024. In some embodiments, the computing device is a controller 110. As a result, a user is able to use the block elements 1500 to build a myriad of different objects not only for use with the game board 120, but also for use within the generated virtual environment 1702.

The multi-dimensional gaming system described herein has numerous advantages. Specifically, the combination of a virtual component 1402 with the physical component 1404 allows a player to enjoy the benefits of physical interaction with game pieces 140, terrain and block elements 1500, while adding a virtual dimension that allows the physical components to virtually travel to different places or times. Unlike, standard board games where any added virtual component is often limited to graphics that cannot be interacted with other than observation, the player of the game system is able to fully interact with a virtual world wherein the interactions affect the physical world as well. This, further allows the multi-dimensional game to be played by multiple players in different geographical locations as long as they are able to connect to the virtual component. Thus, though not in each other's physical presence, the players are still able to play a physical component 1404 of the game together. Moreover, the block elements 1500 of the game system provide the advantage of allowing players to create any object they can imagine by coupling the blocks together. This allows the user to not only utilize their creations with the physical game board 120 which can sense the object's position, it also allows the user to utilize the object in the virtual world. Thus, the virtual and physical elements are seamlessly incorporated allowing the users to have a multi-dimensional gaming experience. Accordingly, the multi-dimensional gaming system has numerous advantages over the prior art.

Dynamic Characteristic Tracking

Figure 21:
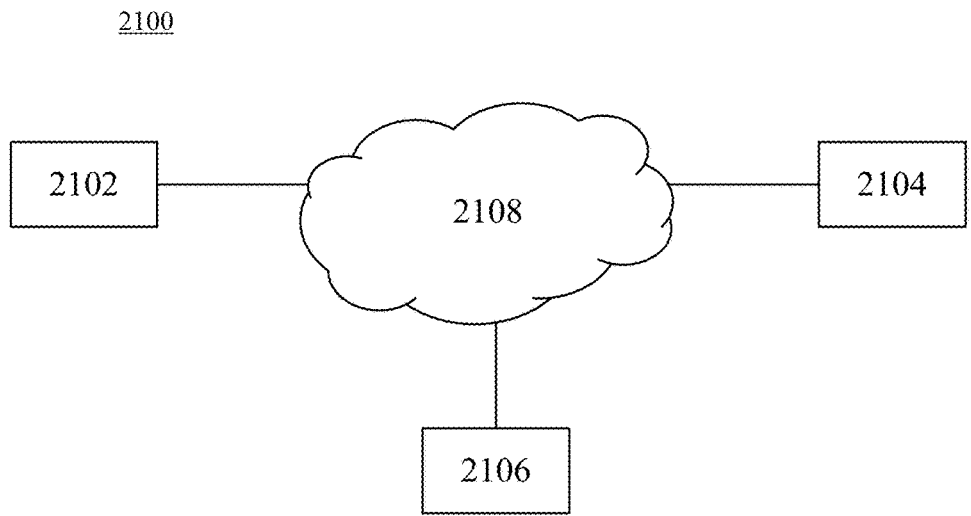
FIG. 21 illustrates a board game with dynamic characteristic tracking system in accordance with some embodiments.

FIG. 21 illustrates a board game system 2100 including dynamic characteristic tracking according to some embodiments. It is understood that although the following description is in reference to a single board game system 2100, multiple systems are conceived including multiple board games of different types, in different locations all capable of being connected over a network. The board game system 2100 is able to correspond to the intelligent gaming system 100, the multi-dimensional gaming system 1400, and/or other board game systems as are well known in the art. The board game system 2100 comprises board game objects 2102, one or more memory/storage elements 2104, and at least one controller/processor 2106, all of which are able to be coupled together over a network 2108. In some embodiments, one or more additional devices are able to be added to the system 2100 such as additional controllers, a display device, an input/output (I/O) device, a computer readable media, a removable computer readable media, a projector, one or more speakers, one or more interconnection cables or other gaming devices as are well known in the art. In some embodiments, the network 2108 is a wireless network. Alternatively, the network 2108 is able to comprise a wired network such as a USB network, or any combination of multiple or single, wired or wireless networks as are well known in the art. The game objects 2102 are able to comprise a game piece 140, a game board 120, a terrain piece 900, a block element 1500, and/or other objects used with board games as are well known in the art. As described above, the game objects 2102 are able to each have object information including a globally unique identifier. In some embodiments, the game objects 2102 each comprise interface electronics 620, 115 for transmitting the object information and receiving adjustments to the characteristic values of the object information from the controller 2106.

The one or more memory elements 2104 are able to comprise a nonvolatile memory. Alternatively, the one or more memory elements are able to comprise other types of memory as are well known in the art. In some embodiments, one or more of the memory elements 2104 are able to comprise one or more servers having a database or a set of distributed databases such as in cloud distributed database management systems. In some embodiments, the memory elements 2104 are able to be integrated with one or more of the board game objects 2102 such that the objects 2102 are able to store object information using the memory elements 2104. Alternatively, the memory elements 2104 are able to be integrated with both one or more of the board game objects 2102 and one or more servers (not shown) and/or other electronic devices capable of reading and writing stored data as are well known in the art.

In the case wherein one or more of the memory elements 2104 are integrated with one or more servers, the servers are able to store and dynamically track object information relating to some or all of the board game objects 2102 in the world. Specifically, controllers 2106 are able to upload any adjustments to the object information of the board game objects 2102 to the memory elements 2104 in the server for storage and tracking. In such embodiments, if the game objects 2102 only store their unique identifiers, the controller 2106 is able to perform the function of keeping track of the object information (and adjustments thereto during game play or otherwise) until the object information is able to be uploaded to the servers. Alternatively, if in addition to their unique identifier the game objects 2102 store at least a portion of their own characteristic values (e.g. if not all their object information and/or also the object information of other game objects 2102), the uploading is able to be in the form of synchronizing the object information stored on the servers with the adjusted object information stored on the objects 2102, or a combination of uploading and synchronization. This synchronizing is able to occur through the controller 2106 or directly between the game objects 2102 and the servers. Alternatively, the object information on the game objects 2102 and the object information on the servers is able to not be synchronized or only synchronized to the extent that the object information data overlaps. For example, in some embodiments, the game objects 2102 are able to store miniDNA data of the object information (as described in detail below) and the servers are able to store miniLife data of the object information (as also described in detail below) with minimal to no overlap in data content. As a result, to the extent that the data does not overlap, no synchronization is necessary.

In some embodiments, the uploading occurs as soon as possible when the servers and the objects 2102 and/or controller 2106 are connected. Alternatively, the uploading is able to occur periodically or on demand when the servers and the objects 2102 and/or controller 2106 are connected. In some embodiments, a user is able to access a webpage or other interface as are well known in the art associated with their game objects 2102 that displays the object information associated with the game object 2102. In some embodiments, the webpage or other interface is a part of the virtual component 1402 of the multi-dimensional board game 1400.

In the case where the memory 2104 is integrated with the game objects 2102, (but optionally not the servers or other devices), the uploading, downloading, and or synchronization is able to occur between the game objects 2102. For example, one or more designated game objects 2102 such as a game board 120, are able to take the same role as the servers such that the game board 120 stores the object information of all the objects 2102 in its memory 2104. Alternatively, every game object 2102 is able to act as a "designated" game object 2102 such that each game object 2102 stored and tracked the object information of some or all of the game objects 2102 within the system 2100. In such an embodiment, transfers would be a synchronization of the latest object information except in the case of a new object to the system 2100, which would require an initial download of all or some of the object information from the other objects 2102. In this case, similar to above, uploading, downloading and/or synchronizing of the object information is able to be performed as soon as possible, periodically and/or upon demand. Also similar to above, a user is able to access a webpage or other interface as are well known in the art associated with their game objects 2102 that displays the object information associated with the game object 2102. In some embodiments, the webpage or other interface is a part of the virtual component 1402 of the multi-dimensional board game 1400. In some embodiments, the stored object information on the memory devices 2104 is able to be encrypted (on the game objects, servers and/or other devices) in order to prevent the data from being cloned without authorization. In some embodiments, the encryption and/or identification (e.g. unique identifier) of the game objects is able to be based on the game object's unique characteristic values. Thus, the system 2100 is able to prevent a user from stealing the identity of a game object 2102 owned by another user.

In some embodiments, one or more previous versions of all or part of the object information is able to be saved/stored on the memory devices 2104 along with the current version. As a result, if the current data is corrupted or otherwise lost, a backup version of the data is able to be used. Further, a previous version of all or part of the object information is able to be used selectively by a user by selecting a type of game mode. For example, a user is able to select a default game play mode wherein the initial version of all of the object information is used during game play. Alternatively, a user is able to select only a portion (e.g. miniLife data) of the object information to be the default or previous settings/values. In such selective cases, the current version data is able to remain stored in the memory devices 2104. Alternatively, the current version or versions of the data is able to be reset/erased from the memory devices 2104 if a user desires to "start over" with the development of a game object 2102. In some embodiments, the frequency and/or number of previous versions saved is set by a user to be at a selected interval and/or on demand. Alternatively, the frequency and/or number of previous versions saved is able to be preset and/or occur automatically for each game object 2102.

In some embodiments, two or more different game object profiles having distinct characteristic values are able to be developed and toggled between when using a game object 2102. For example, a game object 2102 having a initial set of characteristic values is able to have a first profile wherein the user of the game object makes choices within and outside of the game that develop the character values (e.g. miniDNA and/or miniLife data) of the game object into a villain. Contrarily, a user is able to create a second profile of the same game object that develops the character values of the game object into a hero. Further, this branching from a common set of characteristic values into different profiles with different adjusted characteristic values is able to take place from the initial set of characteristic values (e.g. no adjustment has taken place) or from a later set of characteristic values (e.g. after the characteristic values of an object have already been at least partially adjusted. As a result, a user is able to develop multiple differing and globally unique profiles for the same game object and select which profile to use for any one gaming session such that only that profile is adjusted based on the game play and only characteristic values from that profile are used to affect the game play. Indeed, it should be noted that while only a single branch is discussed herein, it is contemplated that multiple profile branches are possible including branches of other branches (e.g. a hero branch, a villain branch and a second villain branch off of the hero branch profile or villain branch profile). Additionally, similar to as described above, each of the profiles is able to have save points that allow recovery of the profile from errors and/or optional game play using prior versions of the selected profile. Thus, the dynamic tracking system 2100 is able to ensure that not all of the object information is lost due to corruption and to provide the options of resetting a game object or playing a game with a previous version of one or more profiles of all or part of the game object information for a game object 2102.

Types of Dynamic Tracking Object Information

In some embodiments, the object information and/or characteristic values are able to be divided into one or more types that are treated differently based during and outside of game play. In particular, in some embodiments the object information and/or characteristic values are able to be grouped into two types: miniDNA data and miniLife data. MiniDNA data comprises innate characteristics or traits of a game object 2102. Examples of traits or characteristics that are able to be included as miniDNA are values for strength, intelligence, speed, agility, flexibility, courage, height, and/or other traits or characteristics as are well known in the art. Other examples of traits or characteristics that are able to be included as miniDNA are equations that define the rate at which or the ability of a game object 2102 to increase/decrease the above values (e.g. strength, intelligence, speed) and/or changes to said rates/abilities. For example, miniDNA for a particular game object 2102 is able to comprise a current/initial strength of 7 units out of 10 units, a rate of strength increase/decrease of 0.5 units per 100 experience, and an increase/decrease to the "rate of strength increase/decrease" of 0.01 units per 25 experience. Thus, the miniDNA is able to describe the current strength value/trait of a game object 2102 as well as the potential ability of the object 2102 to increase or decrease that current value. Indeed, it is contemplated that any number of levels of "rate of change" per trait are able to be incorporated into the miniDNA. Alternatively, the miniDNA is able to be limited to static current/initial values. As a result, the miniDNA data is able to be used to adjust the game play of the board game system 2100 for the associated game object 2102.

MiniLife data comprises a catalog of events that have occurred during the "life" of a game object 2102. Examples of events that are able to be included as miniLife data are in-game and out-of-game events such as battles, the meeting other game objects 2102, enemies/friends made, skills learned, the passage of "in-game time," the passage of "out-of-game time," and/or other in or out of game events as are well known in the art. Thus, miniLife data is able to describe a record of the events that have occurred in the game object's lifetime. Thus, similar to miniDNA data, miniLife data is able to be used to adjust the game play of the board game system 2100 for the associated game object 2102. For example, if the miniLife data indicates that in a previous event a game object 2102 attacked another game object or character in the game, the behavior of said other game object or character is able to be adjusted such that the other game object or character hides from the game object 2102 when approached.

In some embodiments, the adjustment of the object information and/or characteristic values is dependent on the type of data (e.g. miniDNA data or miniLife data). Specifically, in some embodiments, some or all miniDNA data is able to be static such that neither in game play nor out of game play is able to affect the values of the miniDNA data. Alternatively, the miniDNA is able to be semi-adjustable such that only specific circumstances enable the miniDNA data to be adjusted. In some embodiments, the specific circumstances comprise connecting or accessing of the game object or game object user with a specified outlet or software, the location of the game object, the age of the game object, the type of board game, the type of event, the settings selected by a user of the game system and/or other factors as are well known in the art. For example, only when the game object 2102 is located in specified portions of the game board or virtual game environment (e.g. mutation areas) is the miniDNA able to be adjusted based on the in-game or out-of-game events including, but not limited to the events stored in the miniLife data (e.g. the passage of time, injuries, finding an item, reading a book with a new skill). Alternatively, the miniDNA is able to be fully-adjustable such that all in-game and out-of-game events are able to adjust the miniDNA data. Similarly, some or all of miniLife data is able to be static, semi-adjustable or fully-adjustable. In some embodiments, the adjustments to the miniDNA are able to comprise the addition of new traits or skills learned/acquired and/or the elimination of one or more previously available traits. Similarly, in some embodiments, the adjustments to the miniLife are able to comprise the addition of new types of events and/or the removal of one or more previously stored events (e.g. amnesia). The elimination or removal of miniDNA and/or miniLife traits/events are able to be temporary or permanent. Similarly, the additions of new events and/or traits are able to be temporary or permanent. Thus, the characteristic tracking game system 2100 is able to create globally unique game objects 2102 that grow through experiences similarly to real life individuals.

Dynamic Tracking Game Object Replacement

Furthermore, in some embodiments, the system 2100 is able to provide the advantage of replacing lost game objects 2102. Specifically, if a game object 2102 is lost, a user may be able to download the object information that corresponded to the lost game object into a new or different game object 2102 thereby associating the characteristic values or "experience" of the lost object with the new object and that new object's unique identifier. This replacement downloading is able to be from the servers or from another game object 2102. In some embodiments, the replacement downloading is able to be offered as a part of a subscription service or for a fee. As a result, the dynamic tracking system 2100 also provides the benefit of the ability to replace damaged or lost game objects without losing their built up characteristic values or "experience." Thus, a user does not need to worry about losing a valuable game object after investing time and effort into developing the value of the game object.

Accordingly, the dynamic tracking system 2100 described herein provides the advantage of allowing characteristics of a uniquely identifiable game object 2102 to be tracked and stored by the system 2100 during and in between game play such that the characteristics of the game object "develop" over time creating a truly unique game object 2102. Specifically, the object information (stored in the memory elements 2104 on the game objects 2102 and/or the servers) is then able to be accessed by any game object 2102 or controller 2106 coupled to the network 2108. As a result, object information for each of the game objects 2102 is able to be accessed for use both during and outside of game play.

Dynamic Tracking Controller/Processor

In some embodiments, the controller 2106 is substantially similar to the controllers 110, 610 described in relation to the intelligent game board system 100 and multi-dimensional game system 1400. The controller 2106 is able to be integrated with one or more of the game board objects 2102, the one or more servers, or other electronic devices as are well known in the art. Further, the controller 2106 is able to comprise permanent computer readable media 111 integrated with the controller 2106 and/or removable computer readable media 117 that is removably inserted within the controller 110. In some embodiments, the controller 2106 comprises at least one program including one or more in-game algorithms and one or more out-of-game algorithms. The one or more programs including the algorithms are able to be stored on the computer readable media 111, 117 and are used to dynamically track and adjust the characteristic values of the game objects 2102 stored on the memory elements 2104.

The in-game algorithms define rules for adjusting the characteristic values based on the characteristic values/object information itself, game event data, state data, statistic data or other data caused by player actions (or inaction) during game play. In some embodiments, this data is caused by player actions (or inaction) in a virtual component of a multi-dimensional board game 1400. For example, in a baseball board game, if a player causes a game object 2102 to successfully steal a base, the in-game algorithm will cause the controller 2106 to adjust the characteristic values of the game object 2102 such that the value of the number of stolen bases is incremented and the speed attribute value is increased. As another example, if the game object 2102 is a game board 120 for a fantasy game, a game event that occurs in the virtual component such as rain is able to cause the controller 2106 to decrease a traction value of the characteristic values of the game object 2102 based on the in-game algorithm (and/or the stored traction decrease rate). Furthermore, the exact adjustments caused by these in-game algorithms are able to vary from game type to game type depending on the rules of the game and from game object to game object.

The out-of-game algorithms define rules for adjusting the object information and/or characteristic values based on external events that occur outside of game play. In some embodiments, the out-of-game events are also able to occur in a virtual component of a multi-dimensional board game 1400. For example, regarding a game object 2102 used for a baseball game, hiring a virtual trainer or buying a trainer game object 2102 from the virtual component outside of game play is able to trigger an external event that causes the controller 2106 to lower an injury value (or increase the rate at which the injury value lowers) of the characteristic values of the game object 2102 such that an injury suffered by the game object 2102 is able to "heal" (or heal faster) as time passes. As another example, if the game object 2102 is a terrain piece such as a baseball stadium, an external event such as the passing of a period of time outside of game play is able to trigger an external event that causes the controller 2106 to lower a field conditions value of the characteristic values such that future game play utilizing the baseball stadium terrain will have an increased chance of errors occurring. As with the in-game algorithms, the out-of-game algorithms are able to vary based on game type and game object 2102. For example, an injury or base stealing algorithm (in-game or out-of-game) is able to take into consideration the unique identifier of the game object 2102. As a result, two duplicate "babe ruth" game objects 2102 with matching characteristic values are able to be adjusted differently by the algorithms based on their differing unique identifiers. Alternatively, two duplicate "babe ruth" game objects 2102 with differing characteristic values (based on prior in game or out of game adjustments) are able to be adjusted differently by the algorithms based on their differing characteristic values. Alternatively, unique in-game and/or out-of-game algorithms are able to be assigned to each or a plurality of the game objects. All of these characteristic value adjustments are able to be tracked and stored in the memory elements 2104. Accordingly, the dynamic tracking system 2100 described herein provides the advantage of allowing even physically identical game pieces 2102 to age or react differently to game play and outside of game play as if they were truly distinct individuals.

Method of Playing a Board Game with Dynamic Characteristic Tracking

Figure 22:
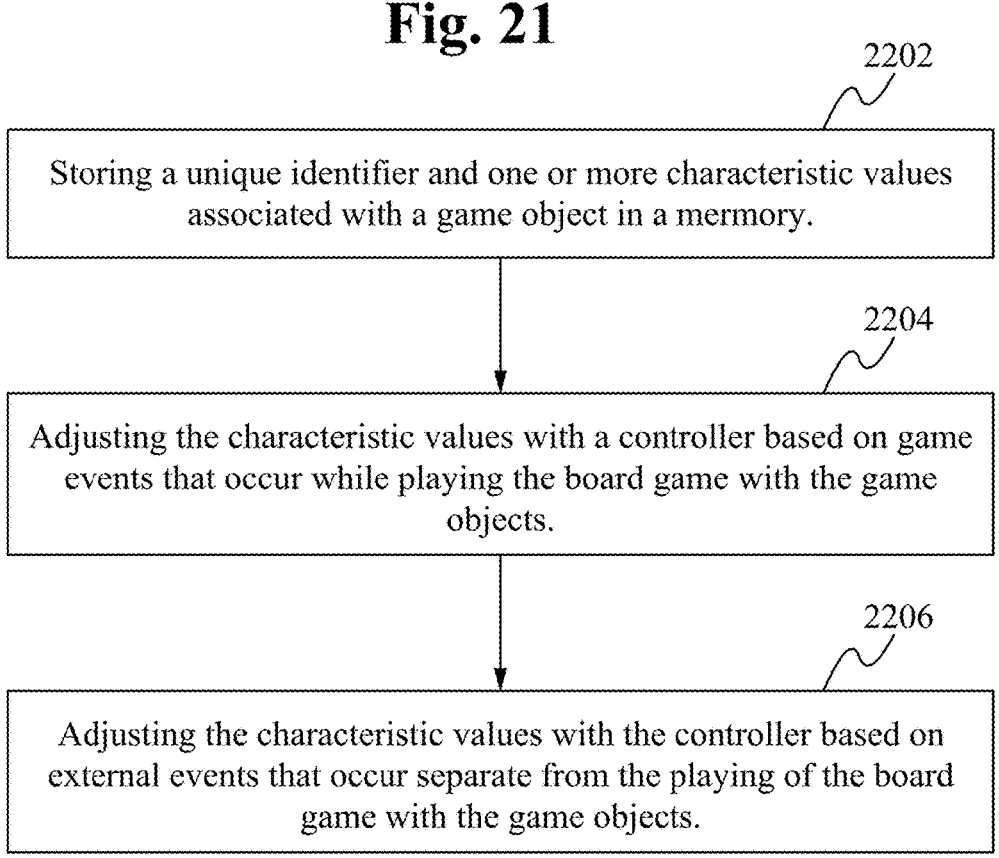
FIG. 22 illustrates a flow chart of playing a board game with dynamic characteristic tracking in accordance with some embodiments.

A method of playing the board game with dynamic characteristic tracking according to some embodiments will now be discussed in reference to the flow chart illustrated in FIG. 22. It is understood that the method of playing a board game with dynamic characteristic tracking is able to be combined with the other methods described herein in reference to the flow charts illustrated in FIGS. 4, 5, 8A-D 13, 19 and 20. A unique identifier and one or more characteristic values associated with a game object are stored in a memory at the step 2202. In some embodiments, the memory is integrated with one or more of the game objects and/or one or more servers. In some embodiments, the part of the memory integrated with the game object stores the miniDNA data of the characteristic values and the part of the memory integrated on one or more servers stores the miniLife data of the characteristic values. In some embodiments, the one or more of the game objects each comprise an interface for coupling to the servers. In some embodiments, the interface comprises a universal serial bus. One or more of the characteristic values are adjusted with a controller based on game events that occur while playing the board game with the game objects at the step 2204. In some embodiments, the miniDNA data is set as static data or semi-adjustable data and the miniLife data is set as fully-adjustable data. In some embodiments, the controller is integrated with one or more of the game objects. One or more of the characteristic values are adjusted with the controller based on external events that occur separate from the playing of the board game with the game objects at the step 2206. In some embodiments, one or more of the characteristic values (e.g. miniLife data, miniDNA data) are defined as static, semi-adjustable or fully-adjustable such that the static characteristic values are not adjusted based on the game events, the semi-adjustable characteristic values are only adjusted by the game events and/or external events if predetermined conditions are met and the fully-adjustable characteristic values are adjusted based on all the game and/or external events.

In some embodiments, the characteristic values affect the way the board game is played with the game objects to which they correspond. In some embodiments, a user is able to adjust the game mode of the board game such that a specified version of the characteristic values is used to affect the game play and/or a specified portion of the characteristic values are ignored such that the values do not affect game play. For example, a user is able to select a "DNA only" mode wherein only the miniDNA data is used to affect game play. As another example, a user is able to select a prior version of all or a portion of the characteristic values be used during game play (e.g. the initial miniDNA values). Additionally, in some embodiments, a user is able to select a game mode such that the events that occur during the game cannot affect the characteristic values of the game object. For example, if a user desires to have "exhibition" games, but does not want the results of the games to affect the development of a game object's characteristic values the user is able to select an exhibition game mode wherein the events will not be used to adjust the characteristic values of the game object. In some embodiments, the user is able to switch the game object between two or more profiles with distinct characteristic values such that only the selected profile is affected by and affects the game play. For example, if a user develops a first profile wherein the object is a hero and a second profile wherein the same game object is a villain, the user is able to select before the playing of each game which profile is to be used for the object during game play. In some embodiments, the game object is selected from a group consisting of a game piece, a terrain piece and a game board. In some embodiments, the characteristic values stored on the servers are synchronized with the characteristic values stored on the game objects if the associated unique identifiers match. Alternatively, the characteristic values stored on the game objects are synchronized with the characteristic values stored on other game objects if the associated unique identifiers match. In some embodiments, one or more of the unique identifiers and the associated characteristic values are downloaded from one or more of the game objects and/or the servers to a new game object. In some embodiments, the adjustments are altered based on the unique identifier such that different game objects are adjusted differently based on the same external events and/or game events. In some embodiments, one or more of the object information is encrypted and/or uniquely identified based on the game object's unique characteristic values.

The dynamic system tracking described herein has numerous advantages. Specifically, the tracking allows a user to individually develop their game objects (and/or one or more profiles for each game object) such that each game object is distinct from every other game object based on their experiences/game events that occur during game play, as well as due to external events. As a result, the dynamic tracking described herein provides the advantage of allowing even physically identical game pieces 2102 to age or react differently to game play and outside of game play as if they were truly distinct individuals. One game object 2102 (and/or game object profile) might be prone to injury while another identical object might never be injured based on their differing unique identifiers when combined with the in game and out of game events they encounter. Additionally, these unique traits in the form of miniDNA data and experiences in the form of miniLife data, defined in the object information of the game objects, are able to be restored to a new game piece if lost or damaged by downloading the stored object data from tracking servers or other game objects. Similarly, the object information of a game object is able to be reset if a user wants to start over and create another unique game object. Thus, the board game with dynamic tracking system described herein provides the benefit of a board game with game objects whose development reflects not merely experiences within a single playing of the game, but instead includes experiences from every previous game play as well as out of game experiences allowing each object to obtain a unique value.

Board Game System with Visual Based Game Object Tracking and Identification

Figure 23:
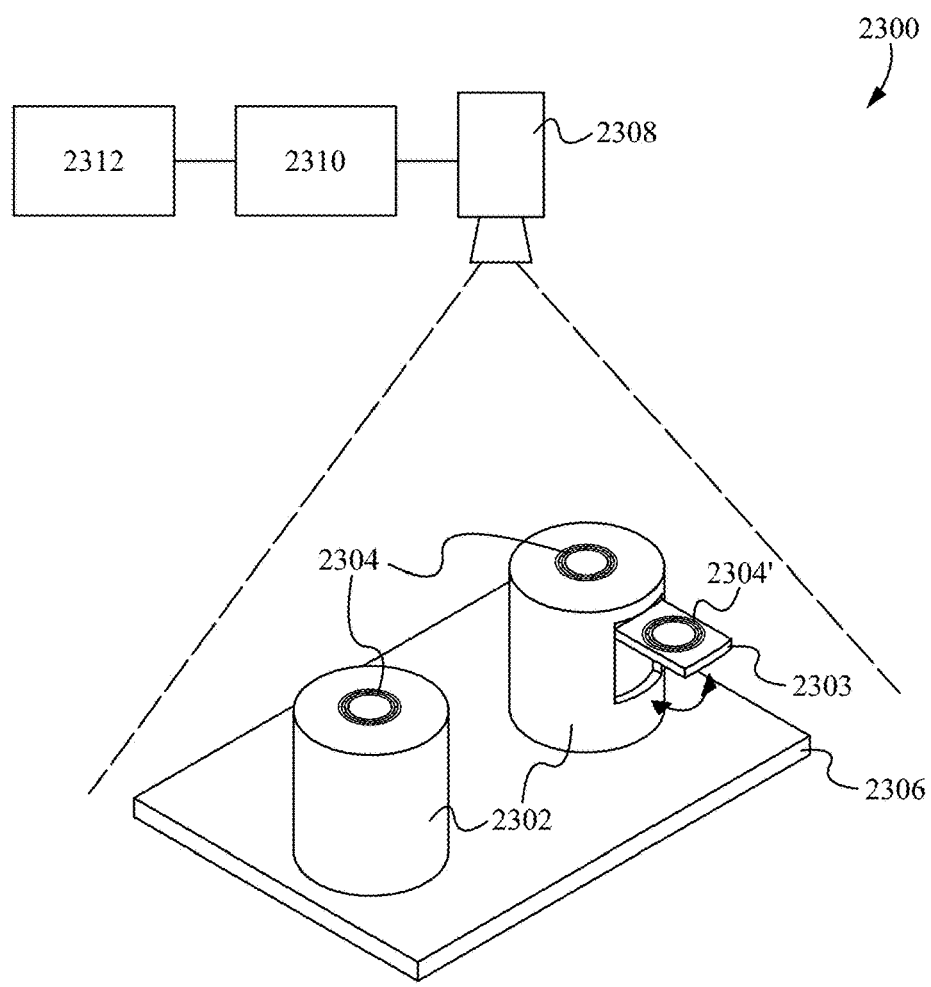
FIG. 23 illustrates a board game system with game object identification and location tracking in accordance with some embodiments.

FIG. 23 illustrates a board game system 2300 with visual based game object tracking and identification in accordance with some embodiments. The board game system 2300 is able to be substantially similar to the Intelligent Game System 100, the multi-dimensional game system 1400 and/or the board game system 2100 described above except for the differences described herein. Specifically, as shown in FIG. 23, the board game system 2300 comprises one or more game objects 2302 each having a visual marker 2304, a game board 2306, one or more cameras 2308, one or more processing elements 2310 and one or more memory devices 2312. In some embodiments, the game board 2306 is able to be omitted. In some embodiments, one or more of the game board 2306, the processing elements 2310, memory devices 2312 and/or cameras 2308 are able to be incorporated into a single device. Alternatively, one or more of the game board 2306, the processing elements 2310, memory devices 2312 and/or cameras 2308 are able to be electrically coupled via one or more wired or wireless networks. In some embodiments, the cameras 2308 are positioned above the game board 2306 facing downward such that the cameras 2308 are able to view the upward facing surfaces of the game objects 2302. Alternatively, the cameras 2308 are able to be positioned in other locations such that the cameras 2308 are able to view the surface of one or more of the game objects 2302. In some embodiments, the processing elements 2310 and memory devices 2312 are able to be substantially similar to the processing/controlling elements and memory/storage devices described herein. Alternatively, the processing elements 2310 and memory devices 2312 are able to comprise other processing/controlling and memory/storage devices as are well known in the art.

The memory devices 2312 are able to store a table or memory map that associates identification data (e.g. a unique identifier of a game object) of the visual markers 2304 with one or more characteristic values corresponding to the game objects 2302. By doing so, the memory devices 2312 enable the processing elements 2310 to match the identification data viewed on the visual markers 2302 with the identifiers stored in the table in order to determine the characteristic values that correspond to the game object 2302 having the visual marker 2304. Thus, the processing elements 2310 are able to adjust the game and/or the game object 2302 based on the determined characteristic values of that game object 2302. In some embodiments, the table/memory map is able to be substantially similar to the memory map described in reference to FIGS. 7A-7E and the identification data of the visual markers 2304 is able to be substantially similar to the unique identifiers described herein. Similarly, in some embodiments, the characteristic values are able to be substantially similar to the object information, block object information or other characteristic values described herein.

The game objects 2302 are able to be substantially similar to the game objects described above in relation to FIGS. 1-22 except for the differences described herein. In particular, the game objects 2302 each have a body including a visual marker 2304 that uniquely identify the associated game object 2302. In some embodiments, the visual marker 2304 is positioned on a upward facing surface of the game object 2302 such that the visual marker 2304 is visible to the cameras 2308. Alternatively, the visual marker 2304 is able to be positioned on other portions of the surface of the game objects 2302. In any case, the position of the visual marker 2304 on the surface of the game objects 2302 enables the processing elements 2310 to determine the location and identity of the game objects 2302 by analyzing images of the visual markers 2304 on the game objects 2302 input by the cameras 2308. This location and identification data is then able to be used by the processing elements 2310 adjust, modify or otherwise enhance the game play of the board game system 2300. In some embodiments, one or more of the game objects 2302 are able to have multiple visual markers 2304 positioned on an upper and/or otherwise facing surfaces of their body such that the ability of the cameras 2308 to view at least one of the markers 2304 is increased. In some embodiments, one or more of the game objects 2302 comprise one or more appendages 2303 each having an appendage visual marker 2304' that uniquely identifies the appendage 2303. As a result, in the same manner that the processing elements 2310 determine the identity and location of the game objects 2302, the processing elements 2310 are able to determine the identity and position of the appendages 2303 via the appendage visual markers 2304'.

In some embodiments, the determined positions of the game objects 2302 and/or appendages 2303 are determined relative to the game board 2306, relative to other game objects 2302, or both. For example, the system 2300 is able to determine that a first game object 2302 is in the top left corner of the game board 2306 and/or that the first game object 2302 is five units south of a second game object 2302. Further, in some embodiments, one or more of the appendages 2303 are able to move with respect to the game object 2302 of which they are a part. For example, as shown in FIG. 23, an "arm" appendage 2303 of a game object 2302 is able to be extended out from the body of the game object 2302. Thus, as described above, the system 2300 is able to determine that the appendage 2303 is pointed toward or above the top left corner of the game board 2306 and/or that the appendage 2303 is extended out from the game object 2302. Again, all this location and identification information is able to be used by the processing elements 2310 to enhance or otherwise affect the game play of the board game system 2300. Additionally, it should be noted that the visual based tracking and identification system 2300 is able to be used in combination with the RFID tracking system described above and/or other tracking systems well known in the art.

Figure 24A:
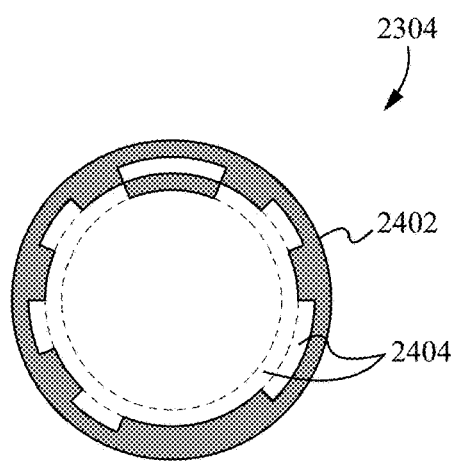
FIG. 24A illustrates an up close view of a visual marker in accordance with some embodiments.
Figure 24B:
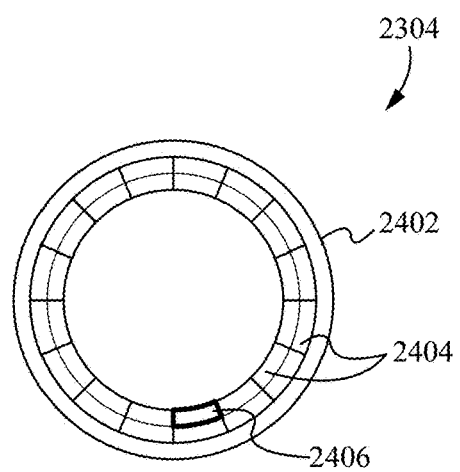
FIG. 24B illustrates an up close view of an outline of the rings and segments of a visual marker in accordance with some embodiments.

FIG. 24A illustrates a close up view of a visual marker 2304, 2304' and FIG. 24B illustrates a close up view of an outline of the sections of a visual marker 2304, 2304' according to some embodiments. As shown in FIG. 24A, the visual marker 2304, 2304' comprises an outer ring 2402 and one or more inner rings 2404, wherein the outer ring 2402 and the inner rings 2404 form substantially concentric circles. Although in FIG. 24A only two inner rings 2404 are illustrated, any number of inner rings 2404 are contemplated. The outer ring 2402 surrounds the inner rings 2404 with a solid uninterrupted edge forming a circle and is able to be used to locate the visual markers 2304 within the images captured by the cameras 2308. Specifically, the circle formed by the edge of the outer ring 2402 is able to be used by the processing elements 2310 to locate the visual markers 2304 by scanning the images for circles. In particular, in some embodiments the circles of the outer rings 2402 are located by the processing elements using an edge detection filter and/or a circle detection algorithm. For example, an edge detection filter is able to "highlight" the edges of the outer rings 2402 that form the circles and the circle detection algorithm is able to then locate the highlighted circles within the image. In some embodiments, the outer ring 2402 has a preselected diameter such that the processing elements 2310 are able to more easily distinguish the outer rings 2402 from other circles within the images. In some embodiments, the edge of the outer ring 2402 is able to form other shapes that are then searched for when locating the visual markers 2304.

As shown in FIG. 24B, the inner rings 2404 comprise a plurality of subsections 2406 that represent the data that identifies the game object 2302 and/or appendage 2303 that the visual marker 2304, 2304' is located on. Each subsection 2406 has a specified size that depends on the diameter of the inner ring 2404 of which the subsection 2406 is a part. In some embodiments, each inner ring 2404 comprises sixteen subsections 2406. Alternatively, one or more of the rings 2404 are able to have different numbers of subsections 2406. In order to visually represent the identifier or identification data of the visual marker 2304, each of the subsections 2406 are able to be filled in with color or left blank (e.g. black or white) forming a binary pattern or bar code. Thus, by reading this circular bar code the processing elements 2310 are able calculate a unique identifier of the game object 2302 and/or other data associated with the game object 2302 having the visual marker 2304. Alternatively, any combination of a bar code and/or other forms of visually representing the identification data are able to be used within the outer ring 2402 as are well known in the art.

In some embodiments, one or more of the inner rings 2404 are able to indicate an angle or starting point of the data represented by the segments 2406 of the inner rings 2404. This angle/starting point indicates at what point or segments 2406 of the rings 2404 the processing elements 2310 should begin with when inputting the binary code. Additionally, this angle/starting point is able to indicate the orientation of the visual marker 2304 and/or game object 2302 with respect to the camera(s) that captures the image, the game board 2306 and/or other game objects 2302. Further, in some embodiments, the one or more rings 2404 that indicate the angle or starting point are each at a preselected distance from the outer ring 2402 such that the processing elements 2310 are able to identify these angle indicating rings 2404. For example, the processing elements 2310 are able to always observe the innermost of the inner rings 2404 in order to determine the angle or starting point. Alternatively, the one or more rings 2404 that indicate the angle or starting point are able to be identified by other visual indicators such as a preselected segment pattern or binary code that is not used for another purpose. As a result, the board game system 2300 is able to quickly read/input the identification data of the visual markers 2304 regardless of their orientation on the images. Further, the board game system 2300 is able to determine the orientation of the game objects 2302 and utilized the orientation data to enhance or otherwise affect the game play of the board game. It should also be noted that the identification data and/or other data represented on the visual markers 2304 is able to be substantially similar to the other unique identifiers and associated characteristic values described herein.

A Method of Locating and Identifying Game Objects

Figure 25:
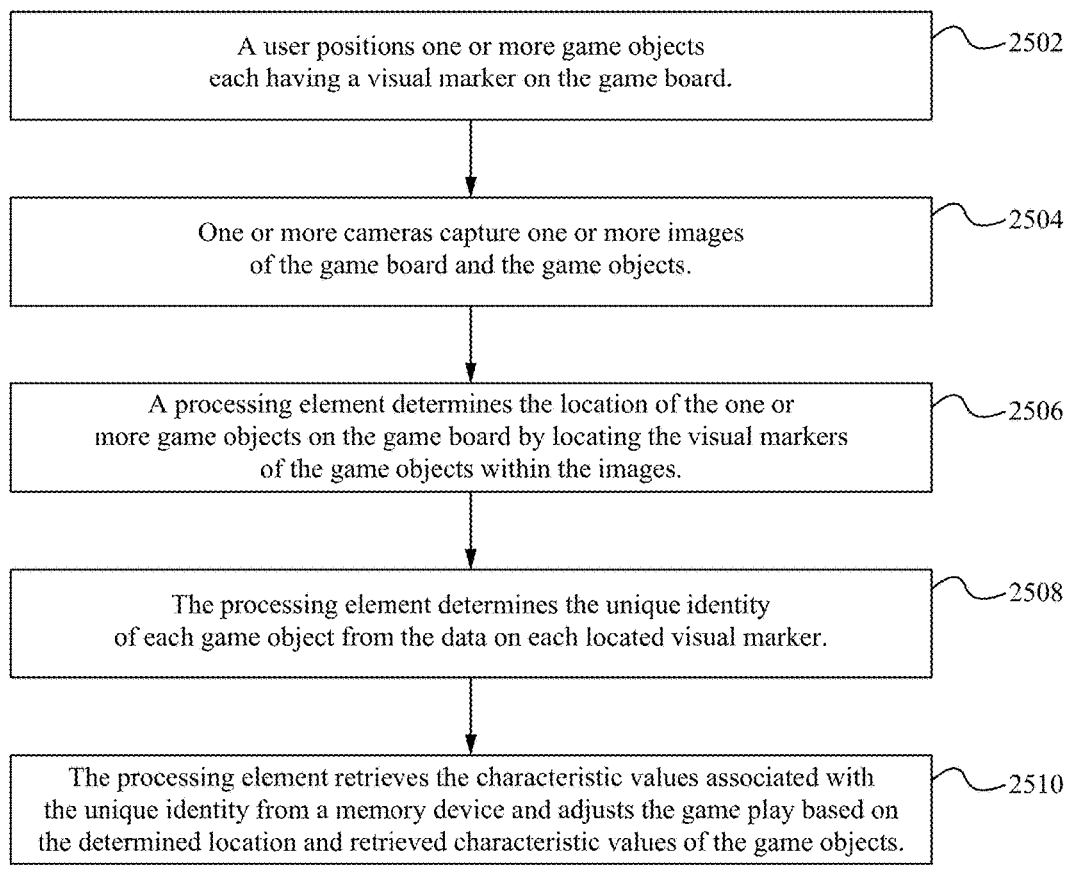
FIG. 25 illustrates a flow chart of playing a board game system with game object identification and location tracking in accordance with some embodiments.

A method of locating and identifying game objects according to some embodiments will now be discussed in reference to the flow chart illustrated in FIG. 25. It is understood that the method of locating and identifying game objects is able to be combined with one or more of the other methods described herein in reference to the flow charts illustrated in FIGS. 4, 5, 8A-D 13, 19, 20 and 22. A user positions one or more game objects each having a visual marker on the game board at the step 2502. One or more cameras capture one or more images of the game board and the game objects at the step 2504. A processing element determines the location of the one or more game objects on the game board by locating the visual markers of the game objects within the images at the step 2506. In some embodiments, the location of the one or more game objects is determined relative to the position of one or more other game objects. Alternatively, the location of the one or more game objects is determined relative to the game board. In some embodiments, the processing device locates an outer ring of each visual marker of each game object using an edge detection algorithm and/or circle detection algorithm on the images of the game board. For example, the images are able to be filtered using a Canny or Canny-Deriche edge detection algorithm/filter and/or transformed by a Hough circle algorithm/transform. The processing element determines the unique identity of each game object from the data on each located the visual marker at the step 2508. In some embodiments, determining the unique identity comprises detecting a starting point or angle indicated by one or more inner rings of the visual marker and processing the data represented by the rings based on the detected starting point. In some embodiments, the processor determines the orientation of one or more of the game objects based on the detected angle. In some embodiments, the processing element determines the location and identity of one or more second visual markers on one or more of the game objects, wherein the second visual markers represent the location and identity of a second portion or appendage of the one or more of the game objects. In some embodiments, the second portion or appendage is able to move with respect to the remainder of the game object such that the processing device is able to track the movement of the second portion based on the location of the second visual marker on the second portion/appendage. The processing element retrieves the characteristic values associated with the unique identity from a memory device and adjusts the game play based on the determined location and retrieved characteristic values of the game objects at the step 2510. In some embodiments, the processing element adjusts the game play based on the determined orientation of the game objects. As a result, the method is able to track both the location and identity of the game objects and adjust the game play accordingly thereby enhancing the gaming experience.

The board game system using visual based game object identification and tracking described herein has numerous advantages. Specifically, the system has a reduced cost when compared to other tracking systems required more hardware. Further, due to this requirement of less hardware, the system is able to be easily upgraded via software upgrades compared to other tracking systems wherein the hardware is not able to be upgraded (without buying new equipment) and thus is able to become quickly outdated. Moreover, the visual based system does not require a grid or other resolution limiting element enable the system to produce an extremely accurate resolution when determining the location of the game objects. Finally, due to the simplicity of design and less computations required, the processing elements are able to perform faster thereby enhancing the response time and overall game play experience.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications are able to be made in the embodiment chosen for illustration without departing from the spirit and scope of the invention as defined by the claims. Furthermore, as used herein the terms game or board game are able to refer to tabletop games or any other type of game including physical game objects.

What is claimed is:

1. A game object for playing a board game, the game object comprising:
   a. a single body having a top surface;
   b. a first unique visual object marker positioned on the top surface, wherein the first unique visual object marker comprises a first series of concentric rings that represent first data that uniquely identifies the game object; and
   c. a second unique visual object marker positioned on the body, wherein the second unique visual object marker comprises a second series of concentric rings that represent second data.

2. The game object of claim 1 wherein the first visual object marker comprises one or more inner rings representing the data and an outer ring that surrounds the inner rings and enables a processing device to locate and identify the game object on a game board.

3. The game object of claim 2 wherein one of the inner rings of the first visual object marker indicates a preselected side of the game object such that the orientation of the game object is able to be determined based on the angle of the one of the inner rings relative to a camera.

4. The game object of claim 3 wherein the one of the inner rings of the first visual object marker indicate the starting point of the data represented in the inner rings of the first visual object marker.

5. The game object of claim 1 wherein the second visual object marker is positioned on one or more second portions of the body.

6. The game object of claim 5 wherein the body comprises one or more appendages comprising the second portions of the body such that a processing device is able to locate and identify the appendages of the body based on the location of the second visual object marker.

7. The game object of claim 6 wherein at least one of the appendages is able to move with respect to the remainder of the body such that the processing device is able to track the movement of the at least one of the appendages based on the location of the second visual object marker on the appendage.

8. The game object of claim 1 wherein the game object is selected from a group consisting of a game piece, a terrain piece and a game board.

9. The game object of claim 1 wherein the first data is associated with characteristic values of the game object that affect the way the board game is played with the game object.

10. The game object of claim 1 wherein the unique identification of the game object provided by the first data is global such that the game object is able to be distinguished from all other game objects associated with the board game.

11. A game object for playing a board game, the game object comprising:
   a body having a top surface and comprising a figurine character coupled to a flat base, wherein the figurine character includes a least one appendage; and
   a unique visual object marker positioned on the top surface, wherein the unique visual object marker comprises a series of concentric rings that represent first data that uniquely identifies the game object; and
   a memory storing characteristic values associated with the unique identifier, the characteristic values including one or more base values describing gameplay characteristics of the game object and one or more metrics that indicate how the base values are adjusted based on gamplay with the game object.

12. The game object of claim 11 wherein the visual object marker comprises one or more inner rings representing the data and an outer ring that surrounds the inner rings and enables a processing device to locate and identify the game object on a game board.

13. The game object of claim 12 wherein one of the inner rings of the visual object marker indicates a preselected side of the game object such that the orientation of the game object is able to be determined based on the angle of the one of the inner rings relative to a camera.

14. The game object of claim 13 wherein the one of the inner rings of the visual object marker indicate the starting point of the data represented in the inner rings of the visual object marker.

15. The game object of claim 11 wherein the game object comprises one or more additional visual markers such that the visual marker is positioned on the top surface of a first portion of the body and the additional visual markers are able to be positioned on one or more second portions of the body.

16. The game object of claim 15 wherein the body comprises one or more appendages comprising the second portions of the body such that a processing device is able to locate and identify the appendages of the body based on the location of the additional visual markers.

17. The game object of claim 16 wherein at least one of the appendages is able to move with respect to the remainder of the body such that the processing device is able to track the movement of the at least one of the appendages based on the location of the second visual object marker on the appendage.

18. The game object of claim 11 wherein the game object is selected from a group consisting of a game piece, a terrain piece and a game board.

19. The game object of claim 11 wherein the data is associated with the characteristic values of the game object that affect the way the board game is played with the game object.

20. A game object for playing a board game, the game object comprising:
a body having a top surface; and
a first unique visual object marker positioned on the top surface, wherein the first unique visual object marker comprises a series of concentric rings that represent first data that uniquely identifies the game object: and
a memory storing characteristic values associated with the first data, the characteristic values including one or more base values describing gameplay characteristics of the game object and one or more metrics that indicate how the base values are adjusted based on gamplay with the game object.

21. The game object of claim 20 further comprising as second unique visual object marker positioned on the body, wherein the second unique visual object marker comprises a second series of concentric rings that represent second data.

* * * * *